US010986540B2

(12) United States Patent
Bor Yaliniz et al.

(10) Patent No.: US 10,986,540 B2
(45) Date of Patent: Apr. 20, 2021

(54) NETWORK SLICE PROVISIONING AND OPERATION

(71) Applicant: HUAWEI TECHNOLOGIES CO., LTD., Shenzhen (CN)

(72) Inventors: Remziye Irem Bor Yaliniz, Ottawa (CA); Chengchao Liang, Ottawa (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/243,771

(22) Filed: Jan. 9, 2019

(65) Prior Publication Data
US 2019/0223055 A1 Jul. 18, 2019

Related U.S. Application Data

(60) Provisional application No. 62/617,133, filed on Jan. 12, 2018.

(51) Int. Cl.
*H04W 28/26* (2009.01)
*H04L 12/24* (2006.01)
(Continued)

(52) U.S. Cl.
CPC ........ *H04W 28/26* (2013.01); *G06F 9/45558* (2013.01); *H04L 41/0893* (2013.01);
(Continued)

(58) Field of Classification Search
CPC .............. H04W 72/0493; H04W 48/16; H04L 41/0893; H04L 41/5054; H04L 41/5051;
(Continued)

(56) References Cited

U.S. PATENT DOCUMENTS

2014/0086177 A1   3/2014   Adjakple et al.
2017/0141973 A1   5/2017   Vrzic
(Continued)

FOREIGN PATENT DOCUMENTS

CN    106341832 A    1/2017
CN    107222318 A    9/2017
(Continued)

OTHER PUBLICATIONS

"Study on management and orchestration of network slicing for next generation network", IEEE, Jan. 4, 2018 (Year: 2018).*
(Continued)

*Primary Examiner* — Omer S Mian

(57) ABSTRACT

There is provided a method and network management function for allocating a slice instance of a communications network. The method includes obtaining, by a management function, requirements for the slice instance and checking, by the management function, a feasibility of the slice instance requirements in view of one or more of network resources and network capabilities. The method further includes preparing, by the management function, a network environment for the slice instance in view of the slice instance requirements and commissioning, by the management function, the slice instance. The method may additionally or alternatively include terminating, modifying and/or deactivating the slice instance.

17 Claims, 31 Drawing Sheets

(51) Int. Cl.
*H04W 76/18* (2018.01)
*G06F 9/455* (2018.01)
*H04W 8/22* (2009.01)
*H04W 48/16* (2009.01)
*H04W 48/20* (2009.01)
*H04W 72/04* (2009.01)
*H04W 80/10* (2009.01)

(52) U.S. Cl.
CPC ...... *H04L 41/0896* (2013.01); *H04L 41/5006* (2013.01); *H04W 8/22* (2013.01); *H04W 48/16* (2013.01); *H04W 48/20* (2013.01); *H04W 72/0493* (2013.01); *H04W 76/18* (2018.02); *H04W 80/10* (2013.01); *G06F 2009/45595* (2013.01)

(58) Field of Classification Search
CPC . H04L 41/0896; G06F 9/5077; G06F 9/45558
See application file for complete search history.

(56) References Cited

U.S. PATENT DOCUMENTS

| | | | |
|---|---|---|---|
| 2017/0303259 | A1 | 10/2017 | Lee et al. |
| 2018/0041578 | A1* | 2/2018 | Lee .................. H04L 47/70 |
| 2018/0359337 | A1* | 12/2018 | Kodaypak ........... H04W 72/048 |
| 2019/0386878 | A1* | 12/2019 | Chou .................. H04L 41/0893 |
| 2020/0221347 | A1* | 7/2020 | Dowlatkhah ......... H04W 28/16 |

FOREIGN PATENT DOCUMENTS

| | | |
|---|---|---|
| EP | 3247169 A1 | 11/2017 |
| WO | 2016048430 A1 | 3/2016 |
| WO | 2017032280 A1 | 3/2017 |
| WO | 2017063708 A1 | 4/2017 |

OTHER PUBLICATIONS

3GPP TS 28.531 V0.2.0 (Dec. 2017);3rd Generation Partnership Project;Technical Specification Group Services and System Aspects;Telecommunication Management;Provisioning of network slicing for 5G networks and services (Release 15);total 13 pages.
3GPP TR 28.801 V15.1.0 (Jan. 2018);3rd Generation Partnership Project;Technical Specification Group Services and System Aspects;Telecommunication management;Study on management and orchestration of network slicing for next generation network (Release 15);total 75 pages.
3GPP TR 28.801 V15.0.0 (Sep. 2017),3rd Generation Partnership Project;Technical Specification Group Services and System Aspects;Telecommunication management;Study on management and orchestration of network slicing for next generation network(Release 15),total 78 pages.
"Telecommunication Management; Provisioning of network slicing for 5G networks and services"; 3GPP TS 28.531 V0.1.0 (Oct. 2017).
"Telecommunication management; Study on management and orchestration of network slicing for next generation network"; 3GPP TR 28.801 V15.0.0 (Sep. 2017).
Huawei, "pCR 28.531 Add use case and requirements of network slice instance creation", 3GPP TSG SA WG5 (Telecom Management) Meeting #115 S5-175119, Oct. 16-20, 2017, Busan, Korea, 4 pages.
Ericsson, "pCR TR 28 801 Use case and requirements for NSS capability exposure", 3GPP TSG SA WGS (Telecom Management) Meeting #112 S5-171759, Mar. 27-31, 2017, Guilin (China), 4 pages.

* cited by examiner

NETWORK SLICE PROVISIONING AND OPERATION

CROSS-REFERENCE TO RELATED APPLICATIONS

This application claims the benefit of U.S. Provisional Application Ser. No. 62/617,133 titled "NETWORK SLICE PROVISIONING AND OPERATION" filed on Jan. 12, 2018, which is incorporated by reference herein in its entirety.

TECHNICAL FIELD

The present disclosure relates to wireless communications and particular embodiments or aspects relate to slice instances and mechanisms to provision and operate a slice instance in accordance therewith.

BACKGROUND

The demand for wireless resources in terms of bandwidth and throughput is ever-increasing. One approach under consideration to meet this increasing demand is through virtualization of networks, in which network resources and functionality are downloaded into one or more existing network nodes or points of presence (PoP) to provide a dynamic service level capability for a particular customer service provider and its end-users, as and when appropriate.

In some approaches, a customer may subscribe with a mobile network operator (MNO) to be provided one or more so-called virtual network "slices" of network resources. Typically each network slice is dynamically allocated to provide certain relatively isolated and/or homogeneous (in kind and level) services to a class of devices of relatively homogeneous end-users or subscribers of the customer, such as a utility and its remotely-located smart meters. In some examples, a plurality of the customer's end-users may make up a user group of the customer.

From the perspective of the customer, it has obtained a separate telecommunications network for its service(s), while from the perspective of the MNO offering such service capability, the MNO's network resources and network functions (NFs) are shared with other virtual networks (VNs) in a manner substantially transparent to the customer and its end-users.

In network slicing, multiple VNs utilize a shared physical network infrastructure. The network functionality of a particular slice may be implemented by downloading and instantiating as a virtual NF (VNF), certain network functionality from cloud-based resources to one or more existing PoPs. A given PoP may have downloaded and instantiated thereon one or more than one VNF, each corresponding to one or more than one slice. When the functionality is no longer appropriate, the corresponding VNF may be terminated or deactivated or modified to reflect more appropriate functionality.

Typically, a MNO designs or develops a given network slice and deploys an instance of it (network slice instance "NSI"). An NSI is generally considered to extend across the extent (end-to-end) of the physical network. In some examples, an NSI may be considered to comprise one or more network slice subnet instances (NSSI) that are each deployed by the download and instantiation of one or more VNFs corresponding to the design of the network slice subnet. Eventually operators of the NSI and/or NSSI as the case may be, use control plane (CP) 108 functions (CPFs) to deliver traffic over the deployed NSSI(s) and/or NSI (generically "NS(S)Is"). In some examples, the NS(S)I may be referred to as a managed NS(S)I ("MNS(S)I").

The Third Generation Partnership Project (3GPP), in its Technical Report (TR) 28.801, and in particular, clause 7.9.1 thereof, has described the provision of different types of services, including a network slice as a service (NSAAS) (clause 7.9.1.3) and network slice subnet as a service (NS-SAAS) (clause 7.9.1.4).

In 3GPP Technical Specification (TS) 28.531, a use case for creation of an NSI is described.

Further:

the following table illustrates an example use case that has been described for the creation of an NSSI:

| Use case stage | Evolution/Specification | <<Uses>> Related Use |
|---|---|---|
| Goal | Create a new network slice subnet instance or use an existing network slice subnet instance to satisfy the network slice subnet related requirements | |
| Actors and Roles | NSSMF manages the network slice subnet instance NFVO manages the NS instance. | |
| Telecom resources | Network Slice Subnet instance Network Service instance | |
| Assumptions | Network slice subnet instance includes the network function which is virtualized. | |
| Pre-conditions | NSST has been already on-boarded and available in NSSMF. | |
| Begins when | NSSMF receives network slice subnet related requirements, the NSST Id is included in the network slice subnet related requirements. | |
| Step 1 (M) | Baed on the network slice subnet related requirements received, NSSMF decides to create a new NSSI or reuse an existing NSSI. | |
| Step 2 (M) | If reuses an existing network slice subnet instance, NSSMF may trigger to modify the existing network slice subnet instance to satisfy the network slice subnet related requirements. Use case is completed go toe "Ends when". Otherwise NSSMF triggers to create a new NSSI, the following steps are needed. | |

-continued

| Use case stage | Evolution/Specification | <<Uses>> Related Use |
|---|---|---|
| Step 3 (O) | If the required NSSI contains constituent NSSI(s) managed by another NSSMF, the first NSSMF derives the requirements for the constituent NSSI(s) and sends it to the second NSSMF which manages the constituent NSSI(s). The first NSSMF receives the constituent NSSI information from the second NSSMF and associates the constituent NSSI(s) with the required NSSI. | |
| Step 4 (M) | Based on the network slice subnet related requirements received and NSST, NSSMF determines the NS related requirements (i.e. information about the target NSD and additional paraeterization for the specific NS to instantiate, see clause 7.3.3. in ETSI GS NFV-IFA013[3]. | |
| Step 5 (M) | Based on the NS related requirements, NSSMF triggers corresponding NS instance request to NFVO with Os-Ma-nfvo interface as described in clause 6.4.3 in TS 28.525 [2]. | TS 28.525][2] Clause 6.4.3 NS instance use cases |
| Step 6 (M) | NSSMF associates the NS instance with corresponding network slice subnet instance. | |
| Step 7 (M) | NSSMF triggers to configure the NSSI constituents. Editor's NOTE: how NSSMF configures the NSSI constituents is FFS. | |
| Step 8 (M) | NSSMF notify the NSMF with the NSSI information (e.g. NSSI Id). | |
| Ends when | All the steps identified above are successfully completed. | |
| Exceptions | One of the steps identified above fails. | |
| Post-conditions | A NSSI is ready to satisfy the network slice subnet related requirements. | |
| Traceability | REQ-NSM_NSSMF-FUN-3, REQ-NSM_NSSMF-FUN-4, REQ-NSM_NSSMF-FUN-5, REQ-NSM_NSSMF-FUN-6, REQ-NS_NSSMF-FUN-7 | | the following table illustrates an example use case that has been described for the activation of an NSSI:

the following table illustrates an example use case that has been described for the deactivation of an NSSI:

| Use case stage | Evolution/Specification | <<Uses>> Related Use |
|---|---|---|
| Goal | To transit the state of an existing network slice subnet instance from inactive to active. Then all constituents of the network slice subnet instance are active and ready for supporting user traffic. | |
| Actors and Roles | NSSMF manages the network slice subnet instance TN Manager managers transport network | |
| Telecom resources | Network slice instance Network slice subnet instance Transport network | |
| Assumptions | N/A | |
| Pre-conditions | An NSSI has already been created and it is inactive. | |
| Begins when | NSSMF decides to activate an NSSI based on the received network slice subnet related request or pre-defined policies. | |
| Step 1 (M) | NSSMF identifies inactive constituents (e.g. NSSI, NF) of the NSSI and decides to activate those constituents. | |
| Step 2 (M) | If the constituent of NSSIS is managed directly by NSSMF, NSSMF activates the NSSI constituent directly. | |
| Step 3 (M) | If an NSSI constituent is another NSSI managed by other NSSMF, NSSMF requests other NSSMF to activate the constituent NSSI. | |
| Step 4 (M) | If an NSSI constituent is an NF managed by NF manager, the NSSMF request NF manager to activate the NF (e.g. activate the device in sleep mode, turn on the ports). | |
| Step 5 (M) | If there exists transport network within the NSSI and it needs to be activated, NSSMF sends the transport network related request to TN manager indicating that the TN part is necessary to be active for supporting the NSSI. | |
| Step 6 (M) | NSSMF receives response indicating that NSSI constituents and TN part are all activated. | |
| Step 7 (M) | NSSMF sets the state of the network slice subnet instance as active. | |
| Ends when | All the steps identified above are successfully completed. | |
| Exceptions | One of the steps identified above fails. | |
| Post-conditions | An NSSI has been activated and ready for supporting user traffic. | |
| Traceability | REQ-NSM_NSSM_F-FUN-X, REQ-NSM_NSSMF-FUN-Y | |

| Use case stage | Evolution/Specification | <<Uses>> Related Use |
|---|---|---|
| Goal | To transit the state of an existing network slice subnet instance from active to inactive. Then the network slice subnet instance cannot support user traffic. | |
| Actors and Roles | NSSMF manages the network slice subnet instance TN Manager managers transport network | |
| Telecom resources | Network slice subnet instance Transport network | |
| Assumptions | N/A | |
| Pre-conditions | an NSSI has already been created and activated. | |
| Begins when | NSMF decides to deactivate an NSSI based on the received network slice subnet related request or pre-defined policies. | |
| Step 1 (M) | NSSMF identifies the NSSI constituents that need to be deactivated. | |
| Step 2 (M) | If the constituent of NSSI is managed directly by NSSMF, NSSMF deactivates the NSSI constituent directly. | |
| Step 3 (M) | If an NSSI constituent is another NSSI managed by other NSSMF, NSSMF request other NSSMF to deactivate the constituent NSSI. | |
| Step 4 (M) | If an NSSI constitutent is an NF managed by NF manager, NSSMF request NF manager to deactivate the NF to stop its operation. | |
| Step 5 (M) | If there exists transport network within the NSSI and it needs to be deactivated, NSSMF sends the transport network related request to TN manager indicating that the TN part can stop supporting the NSSI. | |
| Step 6 (M) | NSSMF receives response indicating that NSSI constituents and TN part are deactivated or not deactivated for some reasons, e.g. share constituents cannot be deactivated. | |
| Step 7 (M) | NSSMF sets the state of the network slice subnet instance as inactive. NSSMF records the states of all constituents and TN part associated to the NSSI according to the results of step 6. | |
| Ends when | All the steps identified above are successfully completed. | |
| Exceptions | One of the steps identified above fails. | |
| Post-conditions | A network slice subnet instance has been deactivated and cannot support user traffic. | |
| Traceability | REQ-NSM_NSSMF-FUN-X, REQ_NSM_NSSMF-FUN-Y | |

35 the following table illustrates an example use case that has been described for the termination of an NSSI:

| Use case stage | Evolution/Specification | <<Uses>> Related Use |
|---|---|---|
| Goal | To terminate an existing NSSI to satisfy the network slice subnet related request. | |
| Actors and Roles | NSSMF manages the network slice subnet instance NFVO manages the NS instance TN Manager manages transport network. | |
| Telecom resources | Network slice subnet instance Network service instance Transport network | |
| Assumptions | Network slice subnet instance includes the network function which is virtualized. | |
| Pre-conditions | N/A | |
| Begins when | NSSMF receives network slice subnet related request indicating that an existing NSSI is no longer needed for an NSI. The NSSI ID is included in the network slice subnet related request. | |
| Step 1 (M) | Based on the network slice subnet related request, NSSMF decides to terminate an existing NSSI if it is not necessary any longer. | NSSI modification use case |
| Step 2 (M) | Otherwise, NSSMF may trigger to modify the NSSI. The use case is completed, go to "ends when". | NSSI deactivation use case |
| Step 3 (M) | For NSSI constituents of the the NSSI to be terminated, NSSMF identifies the corresponding NSSI constituent related request. | |
| Step 4 (M) | If there exists constituent NSSI managed by other NSSMF, NSSMF sends constituent NSSI related request to other NSSMF indicating that the constituent NSSI is not necessary for the NSSI to be terminated. | |
| Step 5 (M) | If there exists NS instance associated with the NSSI to be terminated, NSSMF disassociates the NS instance with the NSSI and may trigger corresponding NS instance related | TS 28.525 [2] Clause 6.4.3 NS instance use cases |

-continued

| Use case stage | Evolution/Specification | <<Uses>> Related Use |
|---|---|---|
| | request to NFVO with Os-Ma-nfvo interface as described in clause 6.4.3 in TS 28.525 [2]. | |
| Step 6 (M) | If there exists transport network within NSSI to be terminated, NSSMF sends the transport network related request to TN manager indicating that the TN part is not necessary to support the NSSI to be terminated. | |
| Step 7 (M) | NSSMF notifies its consumer of the NSSI termination information. | |
| Ends when | All the steps identified above are successfully completed. | |
| Exceptions | One of the steps identified above fails. | |
| Post-conditions | The NSSI has been terminated. | |
| Traceability | REQ-NSM_NSSMF-FUN-X | | the following table illustrates an example use case that has been described for the creation of an NSI:

| Use case stage | Evolution/Specification | <<Uses>> Related Use |
|---|---|---|
| Goal | To create a new network slice instance or use existing network slice instance to satisfy the network slice related requirements. | |
| Actors and Roles | NSMF manages the network slice instance<br>NSSMF managers the network slice subnet instance<br>TN Manager manages transport network | |
| Telecom resources | Network slice instance<br>Network slice subnet instance<br>Transport network | |
| Assumptions | N/A | |
| Pre-conditions | NST has already been on-boarded and available in NSMF. | |
| Begins when | NSMF receives the network slice related requirements, the information indicating whether the requested NSI could be shared may be included in the network slice related requirements. | |
| Step 1 (M) | If there is information indicating the requested NSI can be shared and if an existing available NSI can be used, NSMF decides to use the existing NSI. Modification of the existing NSI may be needed to satisfy the network slice related requirements. Use case is completed go to "Ends when". Otherwise, NSMF trigger to create a new NSI, the following steps are needed to create a new NSI. | |
| Step 2 (M) | NSMF derives network slice subnet related requirements and transport network related requirements (e.g. latency, bandwidth) from network slice related requirements. | |
| Step 3 (M) | For each network slice subnet related requirements, NSMF sends network slice subnet related requirements to NSSMF to request a NSSI. | Network slice subnet creation use case |
| Step 4 (M) | NSMF receives the information of NSSI(s) (e.g. NSSI Id, service access point information of NSSI, external connection point information of NSSI). | |
| Step 5 (M) | NSMF sends the transport network related requirements to (e.g. external connection point, latency and bandwidth) to TN Manager. | |
| Step 6 (M) | NSMF receives the response from TN Manager. | |
| Step 7 (M) | NSMF associates the NSSI(s) with the corresponding NSI and triggers to establish the relationship between service access points of NSSI(s). | |
| Ends when | All the steps identified above are successfully completed. | |
| Exceptions | One of the steps identified above fails. | |
| Post-conditions | An NSI is ready to satisfy the network slice related requirements. | |
| Traceability | REQ-NSM_NSSMF-FUN-1, REQ-NSM_NSSMF-FUN-2, REQ-NSM_NSMF-FUN-3, REQ-NSM_NSMF-FUN-4. | | the following table illustrates an example use case that has been described for the activation of an NSI:

| Use case stage | Evolution/Specification | <<Uses>> Related Use |
|---|---|---|
| Goal | To transit the state of an existing network slice instance from inactive to active. Then the network slice instance is ready to provide communication services. | |
| Actors and Roles | NSMF manages the network slice instance NSSMF manages the network slice subnet instance | |
| Telecom resources | Network slice instance Network slice subnet instance | |
| Assumptions | N/A | |
| Pre-conditions | An NSI has already been created and it is inactive. | |
| Begins when | NSMF decides to activate an NSI based on the received network slice related request or pre-defined policies. | |
| Step 1 (M) | NSMF identifies inactive NSSI associated with the NSI and NSMF requests NSSMF to activate the NSSI. | Network slice subnet activation use case |
| Step 2 (M) | NSMF receives response from NSSMF indicating that NSSI is activated. | |
| Step 3 (M) | NSMF sets the state of the NSI as active. | |
| Ends when | All the steps identified above are successfully completed. | |
| Exceptions | One of the steps identified above fails. | |
| Post-conditions | An NSI has been activated and ready for providing communication services. | |
| Traceability | REQ-NSM_NSMF-FUN-X, REQ-NSM_NSSMF-FUN-X, REQ-NSM_NSSMF-FUN-Y | | the following table illustrates an example use case that has been described for the modification of an NSI:

| Use case stage | Evolution/Specification | <<Uses>> Related Use |
|---|---|---|
| Goal | To modify an existing network slice subnet instance to satisfy the new network slice subnet related requirements. | |
| Actors and Roles | NSSMF manages the network slice subnet instance. | |
| Telecom resources | Network slice subnet instance Network service instance Network slice subnet management function | |
| Assumptions | N/A | |
| Pre-conditions | N/A | |
| Begins when | NSSMF receives the new sets of network slice subnet related requirements and decides to modify an existing NSSI (e.g., changing capacity, changing topology). | |
| Step 1 (M) | If the new network slice subnet related requirements can be satisfied, NSSMF identifies the NSSI constituent(s) (e.g., constituent NSSI(s), NF(s)) as well as the transport network within the NSSI that need to be modified, and generates new sets of requirements for the NSSI constituent(s) and transport network. If the new network slice subnet related requirements couldn't be satisfied, NSSMF reports to the corresponding consumer(s). The use case is completed, go to "Ends when". | Network slice subnet instance modification use case |
| Step 2 (M) | If some constituents of the NSSI are shared with other NSSI(s), NSSMF checks whether the modification of the NSSI constituents may negatively impact other NSSIs sharing those NSSI constituents. If there is negative impact, NSSMF may re-generates the modification requirements, or NSSMF may decide not to modify the NSSI, the use case is completed, go to "Ends when". | |
| Step 3 (M) | If there exist constituent NSSI managed by other NSSMF that needs to be modified, NSSMF sends the new set of requirements for the constituent NSSI to other NSSMF. | Network slice subnet instance modification use case |
| Step 4 (M) | If there exist NS instance(s) associated with the NSSI to be modified, NSSMF triggers corresponding NS instance request to NFVO indicating that the NS instance needs to be modified. | |
| Step 5 (M) | If the transport network within the NSSI needs to be modified, NSSMF sends the new sets of transport network requirements (e.g., latency, bandwidth) to TN Manager directly or indirectly (e.g., via MANO). | |
| Step 6 (M) | NSSMF may receive the response from other management functions, and NSSMF may notify its consumer that the NSSI is modified. | |

-continued

| Use case stage | Evolution/Specification | <<Uses>> Related Use |
|---|---|---|
| Ends when | All the steps identified above are successfully completed. | |
| Exceptions | One of the steps identified above fails. | |
| Post-conditions | The NSSI is modified | |
| Traceability | REQ-NSM_NSSMF-FUN-X | | the following table illustrates an example use case that has been described for the deactivation of an NSI:

| Use case stage | Evolution/Specification | <<Uses>> Related Use |
|---|---|---|
| Goal | To transit the state of an existing network slice instance from active to inactive. Then the network slice instance cannot provide communication services. | |
| Actors and Roles | NSMF managers the network slice instance NSSMF manages the network slice subnet instance | |
| Telecom resources | Network slice instance Network slice subnet instance | |
| Assumptions | N/A | |
| Pre-conditions | An NSI has already been created and it is active. | |
| Begins when | NSMF decides to deactivate an NSI based on the received network slice related request or pre-defined policies. | |
| Step 1 (M) | NSMF may trigger the NSI to stop serving users or it may trigger the traffic migration to other NSIs to make sure there is not any traffic on the intended NSI. | |
| Step 2 (M) | For NSSI associated with the NSI, NSMF requests NSSMF to deactivate the NSSI | Newtork slice subnet deactivation use case |
| Step 3 (M) | NSMF receives response from NSSMF indicating that the NSSI is deactivated or not deactivated for some reasons. | |
| Step 4 (M) | NSMF sets the state of the NSI as inactive, NSMF records the state of NSSI as active or inactive according to the response in step 3. | |
| Ends when | All the steps identified above are successfully completed. | |
| Exceptions | One of the steps identified above fails. | |
| Post-conditions | An NSI has been deactivated and cannot provide communication services. | |
| Traceability | REQ-NSM_NSMF-FUN-X, REQ-NSM_NSSMF-FUN-X, REQ-NSM_NSSMF-FUN-Y | | the following table illustrates an example use case that has been described for the termination of an NSI:

| Use case stage | Evolution/Specification | <<Uses>> Related Use |
|---|---|---|
| Goal | To terminate an existing network slice instance which is no longer needed | |
| Actors and Roles | NSMF manages the network slice instance NSSMF manages the network slice subnet instance | |
| Telecom resources | Network slice instance Network slice subnet instance | |
| Assumptions | N/A | |
| Pre-conditions | N/A | |
| Begins when | NSMF receives the network slice related request indicating that an existing NSI is no longer needed to support particular service. The NSI ID is included in the network slice related request. | |
| Step 1 (M) | Based on the network slice related request, NSMF decides to terminate an existing NSI if it is not necessary any longer. Otherwise, NSMF may trigger to modify the NSI. The use case is completed, go to "Ends when". | NSI modification use case |
| Step 2 (M) | If the NSI to be terminated is in active state, NSMF de-activates the NSI. Then the NSI to be terminated is inactive. NOTE: The solution for NSI de-activation is studied in other clauses. | NSI de-activation use case |
| Step 3 (M) | NSMF identifies the network slice subnet related request for the NSSI of the NSI and sends the request to the NSSMF indicating that the NSSI is no longer needed for the NSI to be terminated. NSSMF may decide to terminate or modify the NSSI based on the request. | |

-continued

| Use case stage | Evolution/Specification | <<Uses>> Related Use |
|---|---|---|
| | Editor's note: whether NSMF can directly request NSSMF to terminate an NSSI is FFS. | |
| Step 4 (M) | NSMF receives the response from NSSMF. | |
| Step 5 (M) | NSMF notifies its consumer of the NSI termination information. | |
| Ends when | All the steps identified above are successfully completed. | |
| Exceptions | One of the steps identified above fails. | |
| Post-conditions | The NSI has been terminated. | |
| Traceability | REQ-NSM_NSMF-FUN-X | |

However, the detailed procedures and interfaces that would be called for in provisioning NS(S)Is have not been described.

Such detailed procedures would conceivably describe network conditions, including without limitation, exposure and/or specific policies), service types, slice and service lifecycles and/or other relevant factors. In some examples, the procedures may vary based on factors, including without limitation, service type and exposure levels between network entities, the service customer and the service provider.

With reference to FIG. 11, it will be generally understood that slice provisioning can include four lifecycle phases, namely, preparation 1110, commissioning 1130, operation 1140 and decommissioning 1150. In the preparation phase 1110, the NS(S)I may be designed 1111, the network environment prepared 1112 and the NS(S)I may be on-boarded 1113 onto a PoP. In the commissioning phase 1130, the NS(S)I may be created 1131. In some examples, the NS(S)I may be a modified form of a previously-created NS(S)I. During the operation phase 1140, the NS(S)I may be activated 1141 and eventually deactivated 1145. Between activation 1141 and deactivation 1145, the management functions may supervise 1142 and report 1143 on the operation of the NS(S)I. In some examples, between activation 1140 and deactivation 1145, the NS(S)I may be operationally modified 1144. In the decommissioning phase 1150, the NS(S)I may be terminated 1151.

In the present disclosure, the term "provisioning" is understood to encompass the combination of the preparation and commissioning phases.

Accordingly, there may be a need for a mechanism to provision and operate a network slice instance that is not subject to one or more limitations of the prior art.

This background is intended to provide information that may be of possible relevance to the present invention. No admission is necessarily intended, nor should be construed, that any of the preceding information constitutes prior art against the present invention.

SUMMARY

It is an object of the present disclosure to obviate or mitigate at least one disadvantage of the prior art.

According to a first aspect, there is provided a method for allocating a slice instance of a communications network. The method includes obtaining, by a management function, requirements for the slice instance and checking, by the management function, a feasibility of the slice instance requirements in view of one or more of network resources and network capabilities. The method further includes preparing, by the management function, a network environment for the slice instance in view of the slice instance requirements and commissioning, by the management function, the slice instance.

According to another aspect there is provided a method for checking a request for a slice instance of a communications network. The method includes obtaining, by a management function, requirements for the slice instance and checking, by the management function a feasibility of the slice instance requirements in view of one or more of network resources and network capabilities. Checking the feasibility of the slice requirements includes determining whether the request is viable.

According to another aspect there is provided a method for handling a slice instance of a communication network. The method includes obtaining, by a management function, a trigger to terminate the slice instance or a network slice subnet instance thereof, wherein the management function is responsible for the slice instance. The method further includes terminating the slice instance, constituents of the slice instance or the network slice subnet instance thereof. Optionally in the method, terminating the slice instance or the NSSI comprises: receiving a slice instance termination request; transmitting a response to the slice instance termination request; and invoking one or more procedures for terminating one or more of: the slice instance; the constituents of the slice instance; and the NSSI. Optionally the method further comprises releasing resources, held by one or more constituent entities, used in supporting the slice instance. Optionally the method further comprises: receiving a slice instance termination request; making a determination of whether or not to satisfy the slice instance termination request; upon determination that the slice instance termination request is to be satisfied, invoking one or more procedures for terminating the slice instance; upon determination that the slice instance termination request is to be unsatisfied, modifying the slice instance instead of terminating the slice instance.

According to another aspect there is provided a method for modifying a slice instance of a communication network. The method includes receiving a request to modify the slice instance during an operation phase thereof. The method further includes modifying the slice instance in accordance with the request. Optionally in the method, the slice instance modification triggers modification of a network slice subnet instance (NSSI) thereof. Optionally the method further comprises making a determination of a feasibility of modification of the slice instance, and modifying the slice instance only when the determination indicates that modifying the slice instance is feasible. Optionally the method further comprises subsequently transmitting a response indicative that the request is feasible, or indicative that the slice instance has been modified in accordance with the request.

According to another aspect there is provided a method for discovering network resources for supporting a slice instance of a communications network. The method includes obtaining, by a network slice subnet management function, information from one or more constituent management entities, one or more NSSMFs or both. Optionally the method further comprises requesting openness from the one or more constituent management entities prior to obtaining the information. Optionally in the method, discovering network resources is performed prior to allocating the slice instance, or wherein discovering network resources is performed during said allocating the slice instance.

According to another aspect there is provided a method for supporting provisioning of a slice instance of a communications network, wherein the slice instance includes a network slice subnet instance. The method includes discovering resources and/or capabilities of the network and deriving requirements for the slice instance. The method further includes checking a feasibility of the slice instance requirements in view of the network resources and/or capabilities. Optionally the method further comprises by a network slice subnet management function (NSSMF), initiating deactivation of: the slice instance; one or more constituent network slice subnet instances (NSSIs) thereof; or both the slice instance and the one or more constituent NSSIs. Optionally in the method terminating the slice instance triggers termination or deactivation of the one or more constituent NSSIs. Optionally in the method at least one of the constituent NSSIs is managed by a management entity other than the NSSMF, and wherein deactivation of said at least one of the constituent NSSIs comprises transmitting a deactivation request from the NSSMF to the management entity other than the NSSMF.

According to another aspect there is provided a method for handling a slice instance of a communications network, wherein the slice instance includes a network slice subnet instance. The method includes receiving a trigger to deactivate the slice instance, one or more constituent network slice subnet instances thereof, or both the slice instance and the one or more constituent NSSIs. The method further includes making a determination of whether or not to perform a deactivation in response to the trigger. The method further includes, upon determination to perform the deactivation, initiating deactivation of the slice instance, the one or more constituent NSSIs thereof or both the slice instance and the one or more constituent NSSIs. The method further includes, upon determination to refrain from performing the deactivation, modifying instead of deactivating the slice instance, the one or more constituent NSSIs thereof or both the slice instance and the one or more constituent NSSIs. Optionally the method further comprises receiving a request to modify a network slice subnet instance (NSSI) associated with the slice instance; making a determination of feasibility of the request to modify the NSSI; modifying the NSSI in accordance with the request when the determination indicates that modifying the NSSI is feasible; and when the determination indicates that modifying the NSSI is feasible, transmitting a response indicative that the request is feasible, or indicative that the NSSI has been modified in accordance with the request. Optionally in the method the NSSI modification triggers modification of one or more of: a further constituent NSSI of the NSSI; and a constituent network function (NF) instance supporting the NSSI. Optionally the method further comprises providing by the management function to a subscribed customer, one or more of resources of the network, the capabilities of the network and associated templates. Optionally in the method the capabilities of the network includes the service types the network can provide.

According to some aspect there is provided a network management function which includes a processor and a non-transient memory for storing machine-readable and machine executable instructions. The instructions, when executed by the processor, cause the network management function to carry out one or more of the methods defined herein.

Embodiments have been described above in conjunction with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Example embodiments of the present disclosure will now be described by reference to the following figures, in which identical reference numerals in different figures indicate identical elements and in which:

FIG. 31 is a flow chart illustrating an example of a method for.

Figure 1:
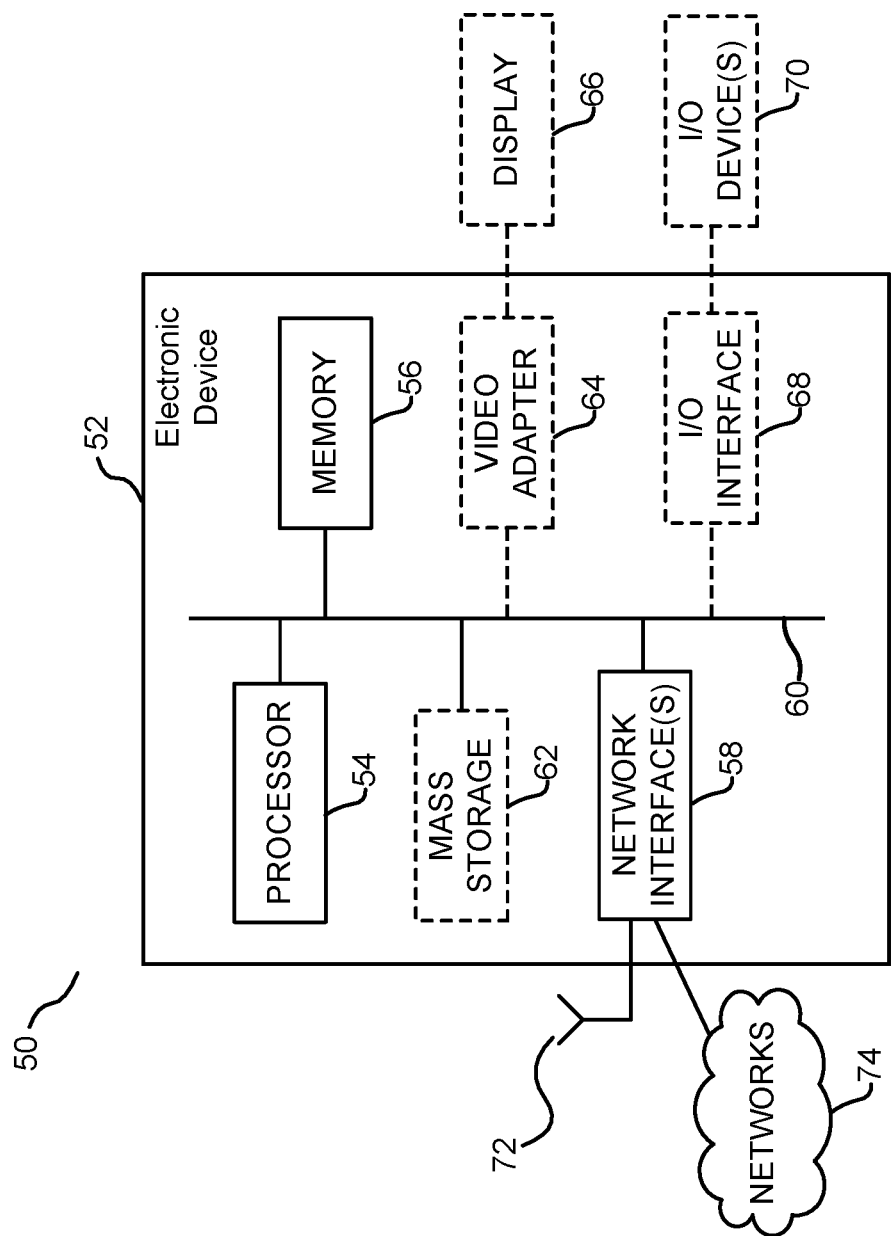
FIG. 1 is a block diagram of an electronic device within a computing and communications environment 50 that may be used for implementing devices and methods in accordance with representative embodiments of the present disclosure.

In the present disclosure, for purposes of explanation and not limitation, specific details are set forth in order to provide a thorough understanding of the present disclosure. In some instances, detailed descriptions of well-known devices, circuits and methods are omitted so as not to obscure the description of the present disclosure with unnecessary detail.

Accordingly, the system and method components have been represented where appropriate by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

DESCRIPTION

FIG. 1 is a block diagram of an electronic device (ED) 52 illustrated within a computing and communications environment 50 that may be used for implementing the devices and methods disclosed herein. In some embodiments, the ED 52 may be an element of communications network infrastructure, such as a base station (for example a NodeB, an evolved Node B (eNodeB or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or Public Land Mobility Network (PLMN). In other embodiments, the ED 52 may be device that connects to the network infrastructure over a radio interface, such as a mobile phone, smart phone or other such device that may be classified as a User Equipment (UE). In some embodiments, the ED 52 may be a Machine Type Communications (MTC) device (also referred to as a machine-to-machine (m2m) device), or another such device that may be categorized as a UE despite not providing a direct service to a user. In some references, an ED 52 may also be referred to as a mobile device, a term intended to reflect devices that connect to a mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The ED 52 typically includes a processor 54, such as a Central Processing Unit (CPU) and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed outline).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The ED 52 may also include one or more network interfaces 58, which may include at least one of wired network interface and a wireless network interface. As illustrated in FIG. 1, a network interface 58 may include a wired network interface to connect to a network 74, and also may include a radio access network interface 72 for connecting to other devices over a radio link. When ED 52 is a network infrastructure element, the radio access network interface 72 may be omitted for nodes or functions acting as elements of the PLMN other than those at the radio edge (e.g. an eNB). When ED 52 is infrastructure at the radio edge of a network 74, both wired and wireless network interfaces may be included. When ED 52 is a wirelessly connected device, such as a UE, radio access network interface 72 may be present and it may be supplemented by other wireless interfaces such as WiFi network interfaces. The network interfaces 58 allow the ED 52 to communicate with remote entities such as those connected to network 74.

The mass storage 62 may comprise any type of non-transitory storage device configured to store data, programs and other information and to make the data, programs and other information accessible via the bus 60. The mass storage 62 may comprise, for example, one or more of a solid state drive, hard disk drive, a magnetic disk drive or an optical disk drive. In some embodiments, mass storage 62 may be remote to ED 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed outline) provide interface to couple the ED 52 to external input and output devices. Examples of input and output devices include a display 66 coupled to the video adapter 64 and an I/O device 70 such as a touch-screen coupled to the I/O interface 68. Other devices may be coupled to the ED 52, and additional or fewer interfaces may be utilized. For example, a serial interface such as a Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, ED 52 may be a stand-alone device, while in other embodiments ED 52 may be resident within a data center. A data center, as will be understood in the art, is a collection of computing resources (typically in the form of services) that can be used as a collective computing and storage resource. Within a data center, a plurality of services can be connected together to provide a computing resource pool upon which virtualized entities can be instantiated. Data centers can be interconnected with each other to form networks consisting of pooled computing and storage resources connected to each other by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network 74) can be divided between different sub-networks, in some cases in the form of a resource slice. If the resources across a number of connected data centers or other collection of nodes are sliced, different network slices can be created.

Figure 2:
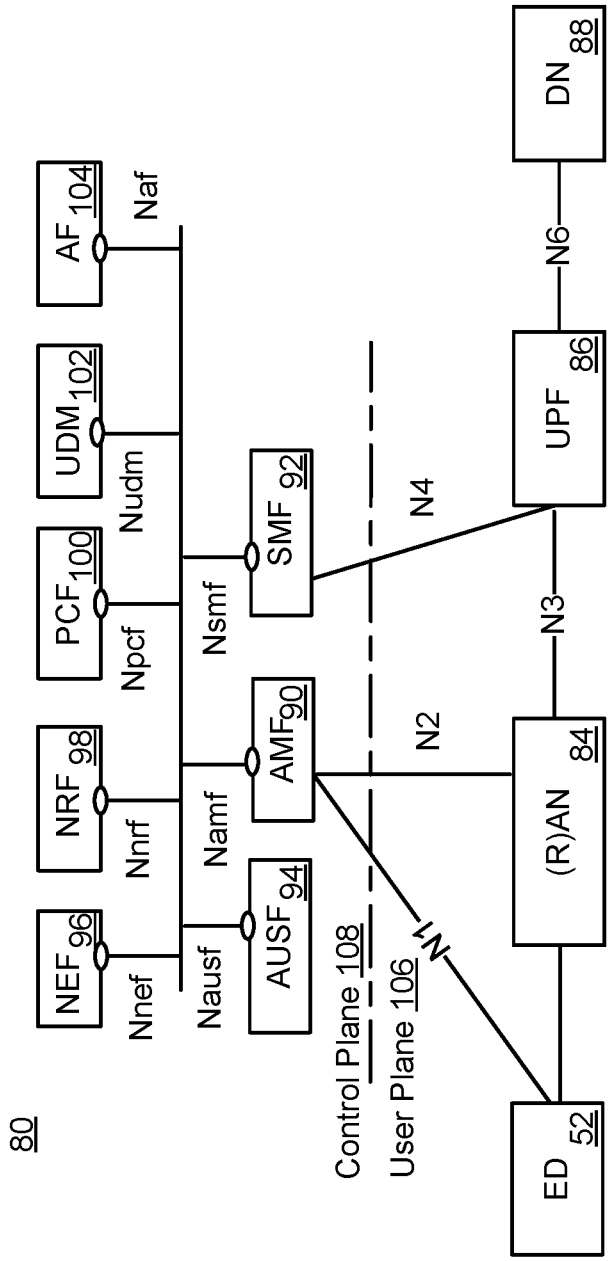
FIG. 2 is a block diagram illustrating a service-based view of a system architecture of a 5G Core Network.

FIG. 2 illustrates a service-based architecture 80 for a 5G or Next generation Core Network (5GCN/NGCN/NCN). This illustration depicts logical connections between nodes and functions, and its illustrated connections should not be interpreted as direct physical connection. ED 50 forms a radio access network connection with a (Radio) Access Network node (R)AN 84, which is connected to a User Plane (UP) Function (UPF) 86 such as a UP Gateway of a network interface such as an N3 interface. UPF 86 connected to a Data Network (DN) 88 over a network interface such as an N6 interface. DN 88 may be a data network used to provide an operator service, or it may be outside the scope of the standardization of the Third Generation Partnership Project (3GPP), such as the Internet, a network used to provide third party service, and in some embodiments DN 88 may represent an Edge Computing network or resources, such as a Mobile Edge Computing (MEC) network. ED 52 also connects to the Access and Mobility Management Function (AMF) 90. The AMF 90 is responsible for authentication and authorization of access requests, as well as mobility management functions. The AMF 90 may perform other roles and functions as defined by the 3GPP Technical Specification (TS) 23.501. In a service-based view, AMF 90 can communicate with other functions through a service-based interface denoted as Namf. The Session Management Function (SMF) 92 is an NF that is responsible for the allocation and management of IP addresses that are assigned to a UE as well as the selection of a UPF 86 (or a particular instance of a UPF 86) for traffic associated with a particular session of ED 52. The SMF 92 can communicate with other functions, in a service-based view, through a service-based interface denoted as Nsmf. The Authentication Server function (AUSF) 94 provides authentication services to other NFs over a service-based Nausf interface. A Network Exposure Function (NEF) 96 can be deployed in the network to allow servers, functions and other entities such as those outside a trusted domain to have exposure to services and capabilities within the network. In one such example, the NEF 96 can act much like a proxy between an application server outside the illustrated network and NFs such as the Policy Control Function (PCF) 100, the SMF 92 and the AMF 90, so that the external application server can provide information that may be of use in the setup of the parameters associated with a data session. The NEF 96 can communicate with other NFs through a service-based Nnef network interface. The NEF 96 may also have an interface to non-3GPP functions. A Network Repository Function (NRF) 98, provides network service discovery functionality. The NRF 98 may be specific to the PLMN or network operator, with which it is associated. The service discovery functionality can allow NFs and UEs connected to the network to determine where and how to access existing NFs, and may present the service-based interface Nnrf. PCF 100 communicates with other NFs over a service-based Npcf interface, and can be used to provide policy and rules to other NFs, including those within the control plane (CP) 108. Enforcement and application of the policies and rules is not necessarily the responsibility of the PCF 100, and is instead typically the responsibility of the functions to which the PCF 100 transmits the policy. In one such example the PCF 100 may transmit policy associated with session management to the SMF 92. This may be used to allow for a unified policy framework with which network behaviour can be governed. A Unified Data Management Function (UDM) 102 can present a service based Nudm interface to communicate with other NFs, and can provide data storage facilities to other NFs. Unified data storage can allow for a consolidated view of network information that can be used to ensure that the most relevant information can be made available to different NFs from a single resource. This can make implementation of other NFs easier, as they do not need to determine where a particular type of data is stored in the network. The UDM 102 may be implemented as a UDM Front End (UDM-FE) and a User Data Repository (UDR). The PCF 100 may be associated with the UDM 102 because it may be involved with requesting and providing subscription policy information to the UDR, but it should be understood that typically the PCF 100 and the UDM 102 are independent functions. The PCF 100 may have a direct interface to the UDR. The UDM-FE receives requests for content stored in the UDR, or requests for storage of content in the UDR, and is typically responsible for functionality such as the processing of credentials, location management and subscription management. The UDR-FE may also support any or all of authentication credential processing, user identification handling, access authorization, registration/mobility management, subscription management and Short Message Service (SMS) management. The UDR is typically responsible for storing data provided by the UDM-FE. The stored data is typically associated with policy profile information (which may be provided by PCF 100) that governs the access rights to the stored data. In some embodiment, the UDR may store policy data, as well as user subscription data which may include any or all of subscription identifiers, security credentials, access and mobility related subscription data and session related data. Application Function (AF) 104 represents the non-data plane also referred to as the non-user plane) functionality of an application deployed within a network operator domain and within a 3GPP-compliant network. The AF 104 interacts with other core NFs through a service-based Naf interface, and may access network capability exposure information, as well as provide application information for use in decisions such as traffic routing. The AF 104 can also interact with functions such as the PCF 100 to provide application-specific input into policy and policy enforcement decisions. It should be understood that in many situations the AF 104 does not provide network services to other NFs, and instead is often viewed as consumer or user of services provided by other NFs. An application outside the 3GPP network can perform many of the same functions as AF 104 through the use of NEF 96.

ED 52 communicates with NFs that are in the UP 106, and the CP 108. The UPF 86 is a part of the CN UP 106 (DN 88 being outside the 5GCN). (R)AN 84 may be considered as a part of a UP, but because it is not strictly a part of the CN, it is not considered to be a part of the CN UP 106. AMF 90, SMF 92, AUSF 94, NEF 96, NRF 98, PCF 100 and UDM 102 are functions that reside within the CN CP 108, and are often referred to as CP Functions (CPFs). AF 104 may communicate with other functions within CN CP 108 (either directly or indirectly through the NEF 96), but is typically not considered to be a part of the CN CP 108.

Those skilled in the art will appreciate that there may be a plurality of UPFs 86 connected in series between the (R)AN 84 and the DN 88, and as will be discussed with respect to FIG. 3, multiple data sessions to different DNs can be accommodated through the use of multiple UPFs in parallel.

Figure 3:
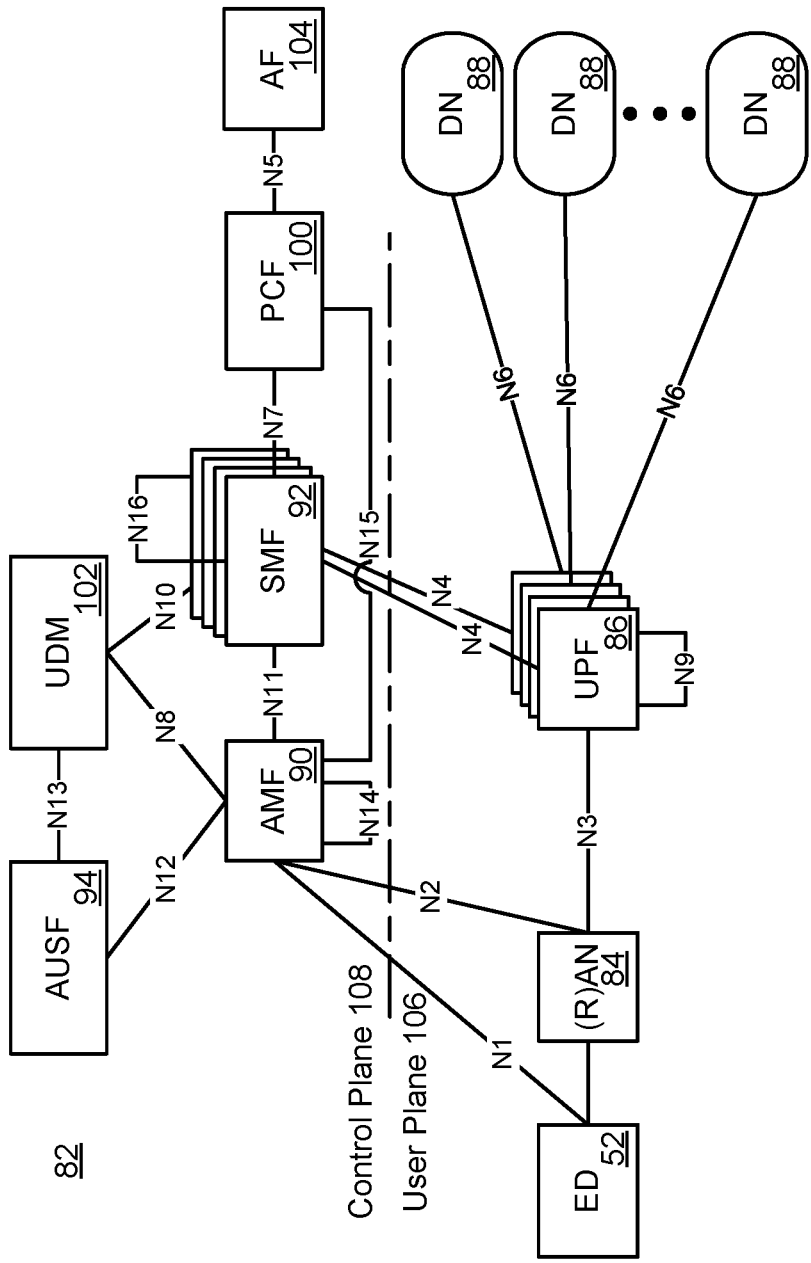
FIG. 3 is a block diagram illustrating the system architecture of a 5G Core network as shown in FIG. 2 from the perspective of reference point connectivity.

FIG. 3 illustrates a reference point representation of a 5GCN architecture 82. For the sake of clarity, some of the NFs illustrated in FIG. 2 are omitted from this figure, but it should be understood that the omitted functions and those not illustrated in either FIG. 2 or FIG. 3) can interact with the illustrated functions.

ED 52 connects to both (R)AN 84 (in the UP 106) and AMF 90 (in the CP 108). The ED-to-AMF connection is an N1 connection. (R)AN 84 also connects to the AMF 90, and does so over an N2 connection. The (R)AN 84 connects to a UPF function 86 of an N3 connection. The UPF 86 is associated with a PDU session, and connects to the SMF 92 over an N4 interface to receive session control information. If the ED 52 has multiple PDU sessions active, they can be supported by multiple different UPFs 86, each of which is connected to an SMF 92 over an N4 interface. It should be understood that from the perspective of reference point representation, multiple instances of either an SMF 92 or an UPF 86 are considered as distinct entities. The UPFs 86 each connect to a DN 88 outside the 5GCN over an N6 interface. SMF 92 connects to the PCF 100 over an N7 interface, while the PCF 100 connects to an AF 104 over an N5 interface. The AMF 90 connects to the UDM 102 over an N8 interface. If two UPFs 86 in UP 106 connect to each other, they can do so over an N9 interface. The UDM 102 can connect to an SMF 92 over an N10 interface. The AMF 90 and SMF 92 connect to each other over an N11 interface. An N12 interface connects the AUSF 94 to the AMF 90. The AUSF 94 can connect to the UDM 102 over an N13 interface. In networks in which there is a plurality of AMFs 90, they can connect to each other over an N14 interface. The PCF 100 can connect to an AMF 90 over the N15 interface. If there is a plurality of SMFs 92 in the network, they can communicate with each other over an N16 interface.

It should also be understood that any or all of the functions and nodes, discussed above with respect to the architectures 80 and 82 of the 5GCN, may be virtualized within a network, and the network itself may be provided as network slice of a larger resource pool, as will be discussed below.

Figure 4:
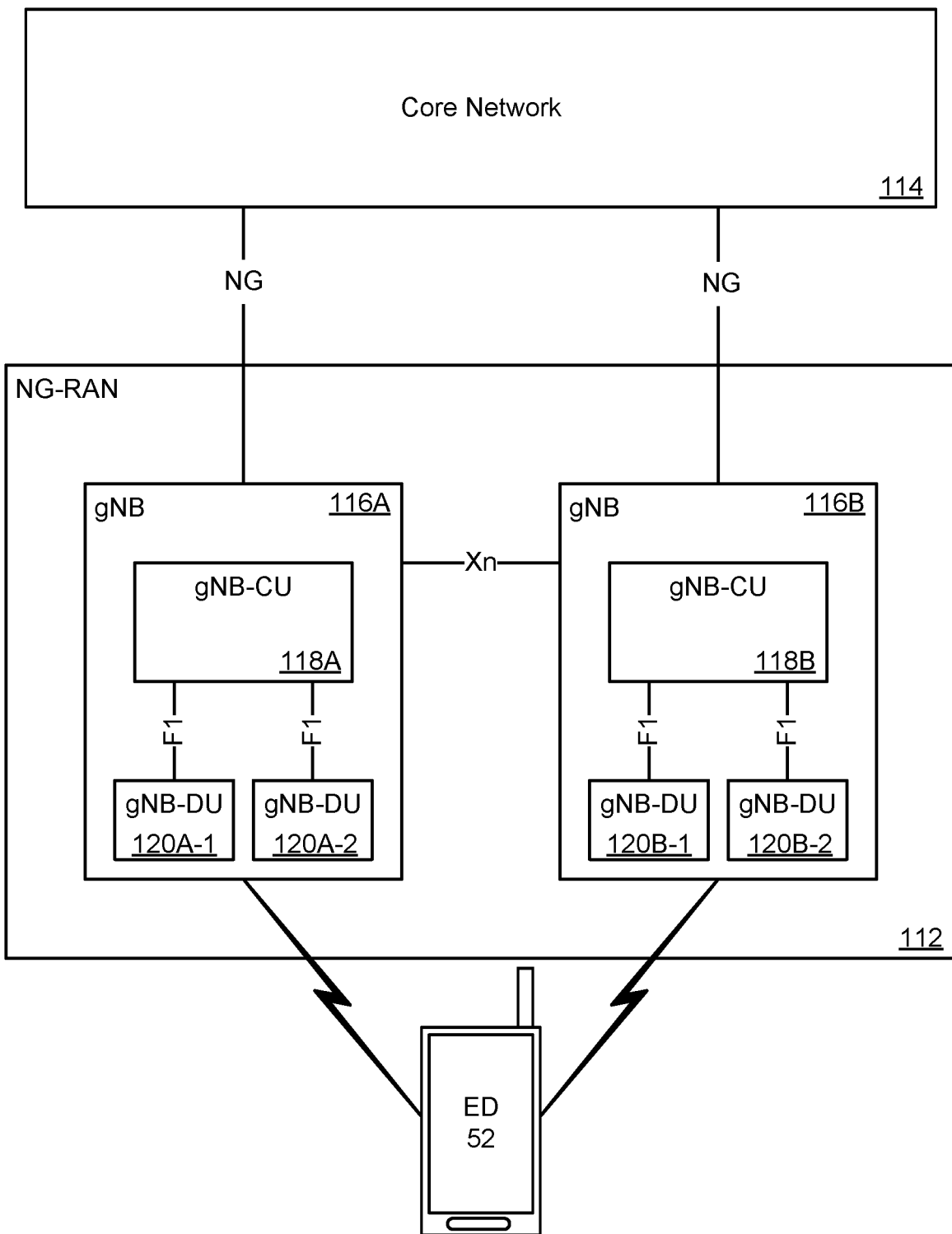
FIG. 4 is a block diagram illustrating an architecture of a 5G Radio Access network architecture.

FIG. 4 illustrates a proposed architecture 110 for the implementation of a Next Generation Radio Access network (NG-RAN) 112, also referred to as a 5G RAN. NG-RAN 112 is the radio access network that connects an ED 52 to a CN 114. Those skilled in the art will appreciate that CN 114 may be the 5GCN (as illustrated in FIG. 2 and FIG. 3). In other embodiments, the CN 114 may be a 4G Evolved Packet Core (EPC) network. Nodes with NG-RAN 112 connect to the 5G CN 114 over an NG interface. This NG interface can comprise both the N2 interface to a CP 108 and an N3 interface to a UPF 86 as illustrated in FIG. 2 and FIG. 3. The N3 interface can provide a connection to a CN UPF. NG-RAN 112 includes a plurality of radio access nodes that can be referred to as a gNB. In the NG-RAN 112, gNB 116A and gNB 116B are able to communicate with each other over an Xn interface. Within a single gNB 116A, the functionality of the gNB may be decomposed into a Centralized Unit (gNB-CU) 118A and a set of distributed units (gNB-DU 120A-1 and gNB-DU 120A-2, collectively referred to as 120A). gNB-CU 118A is connected to a gNB-DU 120A over an F1 interface. Similarly gNB 116B has a gNB-CU 118B connecting to a set of distributed units gNB-DU 120B-1 and gNB-DU 120B-2, collectively referred to as 120B). Each gNB DU may be responsible for one or more cells providing radio coverage within the PLMN.

The division of responsibilities between the gNB-CU and the gNB-DU has not been fully defined at this time. Different functions, such as the radio resource management functionality may be placed in one of the CU and the DU. As with all functional placements, there may be advantages and disadvantages to placement of a particular NF in one or the other location. It should also be understood that any or all of the functions discussed above with respect to the NG-RAN 112 may be virtualized within a network, and the network itself may be provided as network slice of a larger resource pool, as will be discussed below.

Figure 5:
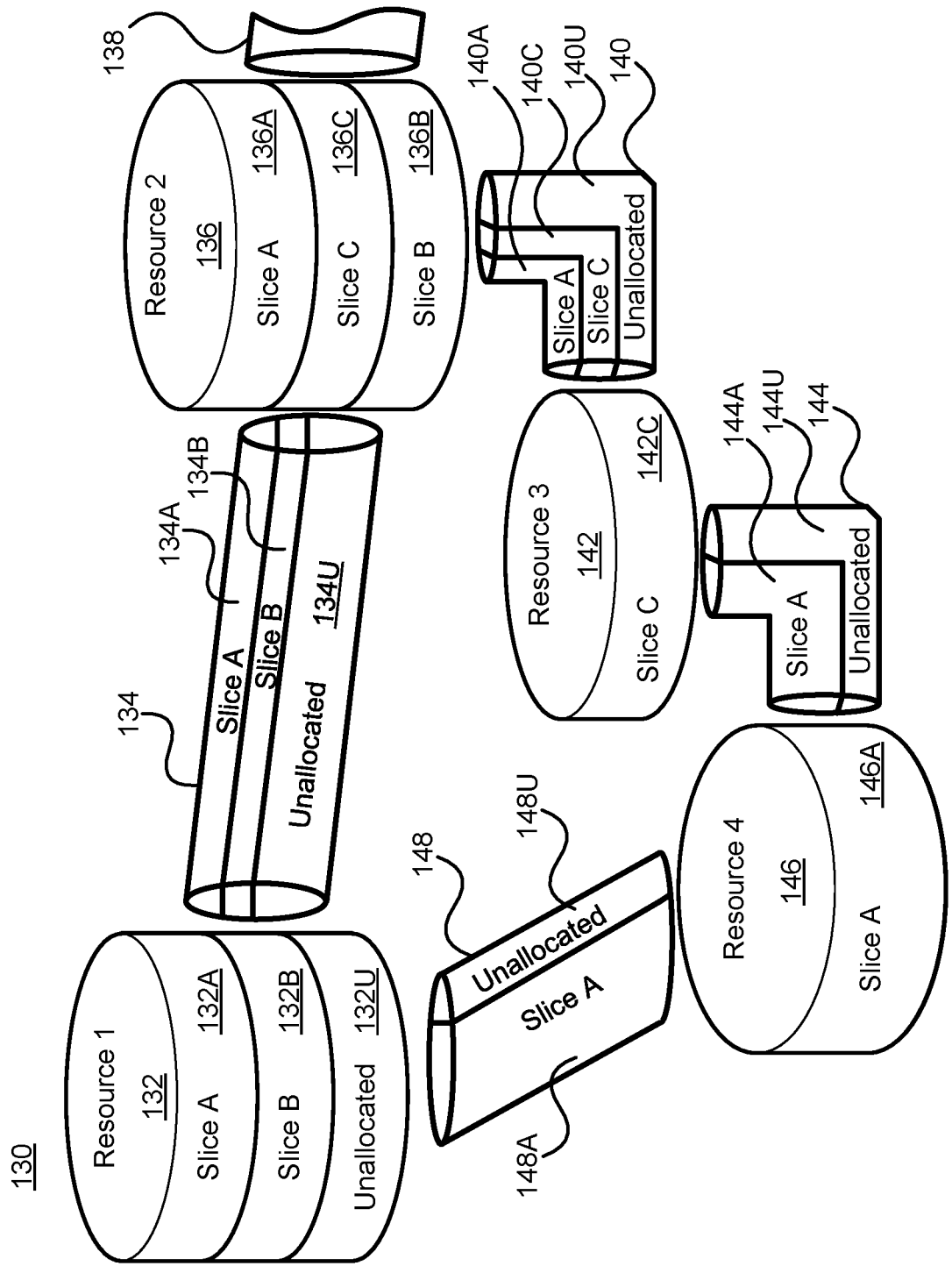
FIG. 5 is a block diagram schematically illustrating an architecture in which network slicing can be implemented.

FIG. 5 illustrates an architecture 130 that connects a plurality of connectivity, compute and storage resources, and supports network slicing. In the following, resources are connected to other discrete resources through Connectivity Resources 134, 138, 140, 144 and 148. It will be understood that as NFs are instantiated within resources, they may be connected to each other by virtual connections that in some embodiments do not rely upon the physical connectivity resources illustrated, but instead may be connected to each other by virtual connections, which will also be considered as connectivity resources. Resource 1 132 is connected to Resource 2 136 by Connectivity Resource 134. Resource 2 136 is connected to unillustrated resources through Connectivity Resource 138, and is also connected to Resource 3 142 by Connectivity Resource 140, and Resource 1 132 is connected to Resource 4 146 by Connectivity Resource 148. Resource 1 132, Resource 2 136, Resource 3 142 and Resource 4 146 should be understood as representing both compute and storage resources, although specialized functions may also be included. In some embodiments, a specialized NF may be represented by any or all of Resource 1 132, Resource 2 136, Resource 3 142 and Resource 4 146, in which case, it may be the capability or capacity of the NF that is being sliced. Connectivity Resources 134, 138, 140, 144 and 148 may be considered, for the following discussions, as logical links between two points (e.g. between two data centers) and may be based on a set of physical connections.

Resource 1 132 is partitioned to allocate resources to Slice A 132A, and Slice B 132B. A portion 132U of the resources available to Resource 1 132 remains unallocated. Those skilled in the art will appreciate that upon allocation of the network resources to different slices, the allocated resources are isolated from each other. This isolation, both in the compute and storage resources, ensures that processes in one slice do not interact or interfere with the processes and functions of the other slices. This isolation can be extended to the connectivity resources as well. Connectivity Resource 134 is partitioned to provide connectivity to Slice A 134A and Slice B 134B, and also retains some unallocated bandwidth 134U. it should be understood that in any resource that either has unallocated resources or that has been partitioned to support a plurality of resources, the amount of the resource (e.g. the allocated bandwidth, memory, or number of processor cycles) can be varied or adjusted to allow changes to the capacity of each slice. In some embodiments, slices are able to support "breathing", which allows the resources allocated to the slice to increase and decrease along with any of the available resources, the required resources, anticipated resource need, or other such factors, alone or in combination with each other. In some embodiments, the allocation of resources may be in the form of soft slices in which a fixed allocation is not committed and instead the amount of the resource provided may be flexible. In some embodiments, a soft allocation may allocate a percentage of the resource to be provided over a given time window, for example 50% of the bandwidth of a connection over a time window. This may be accompanied by a minimum guaranteed allocation. Receiving a guarantee of 50% of the capacity of a connectivity resource at all times may provide very different service characteristics than receiving 50% of the capacity of the connectivity resource over a ten second window.

Resource 2 136 is partitioned to support allocations of the available compute and storage resources to Slice A 136A, Slice C 136C and Slice B 136B. Because there is no allocation of resources in connectivity resource 134 to Slice C, Resource 2 136 may, in some embodiments, not provide a network interface to Slice C 136C to interact with connectivity resource 134. Resource 2 136 can provide an interface to different slices to Connectivity Resource 138 in accordance with the slices supported by Connectivity Resource 138. Connectivity Resource 140 is allocated to Slice A 140A and Slice C 140C with some unallocated capacity 140U. Connectivity Resource 140 connects Resource 2 136 with Resource 3 142.

Resource 3 142 provides compute and storage resources that are allocated exclusively to Slice C 142C, and is also connected to Connectivity Resource 144 which in addition to the unallocated portion 144U includes an allocation of Connectivity Resource 144A to slice A. it should be noted that from the perspective of functions or processes within Slice A, Resource 3 142 may not be visible. Connectivity Resource 144 provides a connection between Resource 3 142 and Resource 4 146, whose resources are allocated entirely to Slice A 146.

Resource 4 146 is connected to Resource 1 132 by Connectivity Resource 148, which has a portion of the connection allocated to Slice A 148, while the balance of the resources 148U are unallocated.

Figure 6:
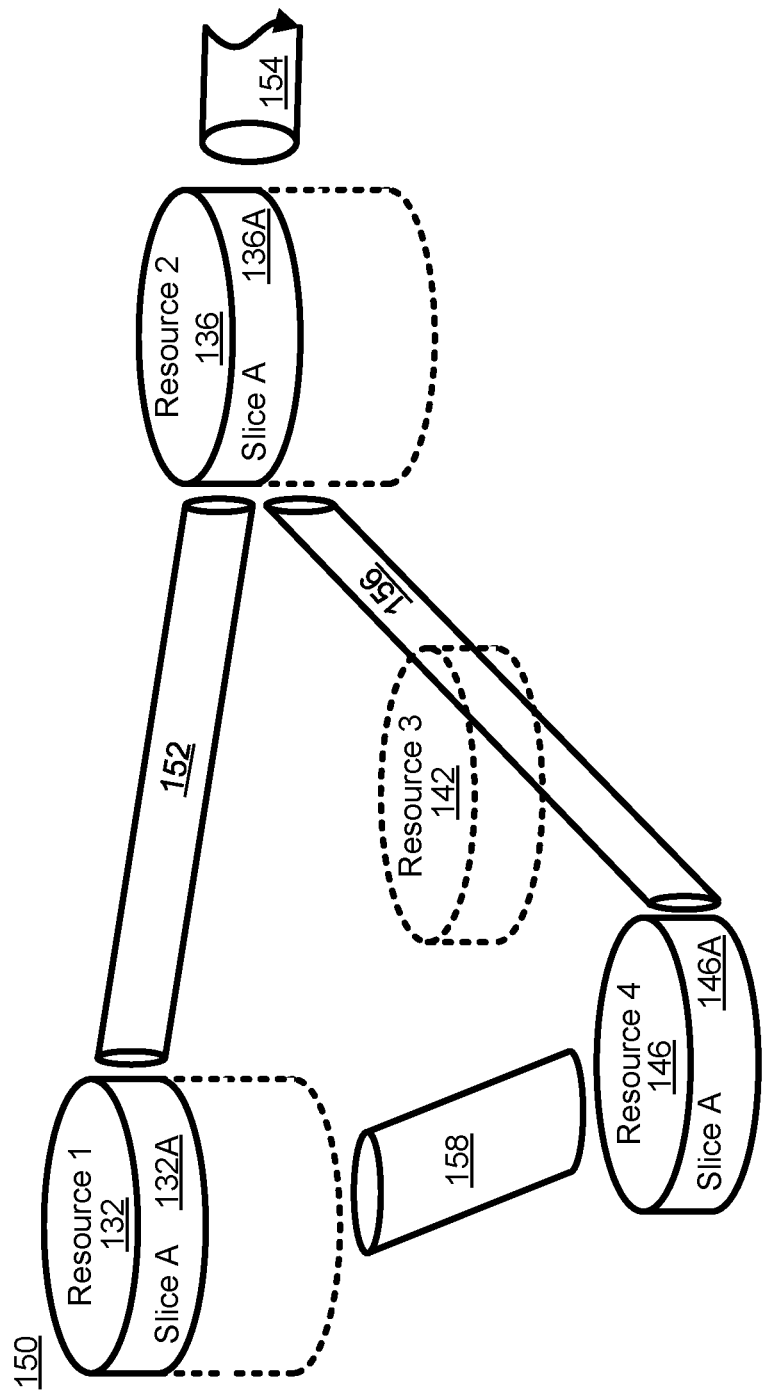
FIG. 6 is a block diagram illustrating the architecture discussed in FIG. 5 from the perspective of a single slice.

FIG. 6 illustrates the view of the architecture 136 of FIG. 5 as would be seen from the perspective of Slice A. This may be understood as a view of the resources allocated to Slice A 150 across the illustrated network segment. From within Slice A 150, only the portions of the resources that have been allocated to Slice A 150 are visible. Thus, instead of being able to see the full capacity and capability of Resource 1 132, the capabilities and capacity of the portion allocated to Slice A 132A is available. Similarly, instead of being able to see the capacity and capabilities of Resource 2 136, only the capabilities and capacity of the portion allocated to Slice A 136A are available. Because nothing from Resource 3 142 had been allocated to Slice A 150, Resource 3 142 is not present within the topology of Slice A 150. All of the capacity and capability of Resource 4 146 was allocated to Slice A 146, and as such is present within Slice A 150. Slice A 132A of Resource 1 132 is connected to Slice A 136A of Resource 2 136 by logical link 152. Logical Link 152 may correspond to the portion of connectivity resource 134 allocated to Slice A 134A. Slice A 136A is connected to logical link 154 (representative of the portion of connectivity resource 138 allocated to Slice A 150), and is connected to Slice A 146A by logical link 156. Logical link 156 is representative of the portions of connectivity resource 140 and connectivity resource 144 that have been allocated to Slice A (portions 140A and 144A respectively). It should be understood that due to the absence of Resource 3 142 from Slice A 150, any traffic transmitted by Slice A 136A onto Connectivity Resource 140A will be delivered to Resource 4 146, and similarly any traffic transmitted from Slice 146A into Connectivity Resource 144A will be delivered to Slice A 136A. As such, within Slice A 150 Connectivity Resources 140A and 144A can be modelled as a single logical link 156. Logical link 158 is representative of the portion of Connectivity Resource 148 allocated to slice A 148A.

It should be understood that within the storage and computer resources illustrated in FIGS. 5 and 6, NFs can be instantiated using any of a number of known techniques, including network function virtualization (NFV), to create Virtual Network Functions (VNFs). While conventional telecommunications networks, including so-called Third Generation and Fourth Generation (3G/4G) networks, can be implemented using virtualized functions in their CNs, next generation networks, including so-called Fifth Generation (5G) networks, are expected to use NFV and other related technologies as fundamental building blocks in the design of a new CN and RAN. By using NFV, and technologies such as Software-Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful, and may combined with a sense of topological closeness to select a logical location at which to instantiate a function so that it is geographically or topologically close to a selected physical or network location.

Figure 7:
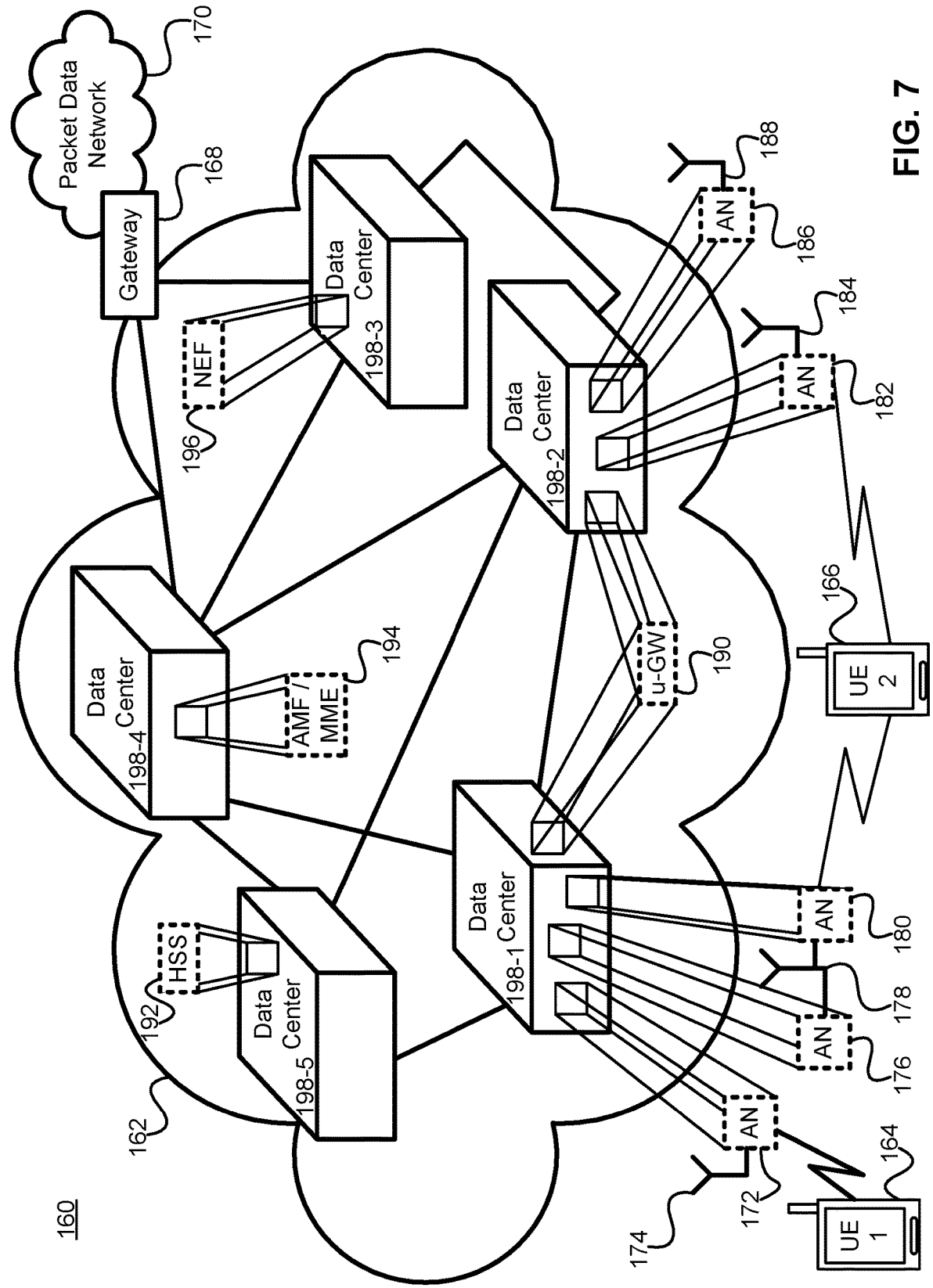
FIG. 7 is a diagram illustrating a cloud-based implementation of a Core Network and Radio Access Network using virtualized functions.

FIG. 7 illustrates a system 160 in which a core/RAN network 162 provides radio access and CN services to EDs 52 such as UE1 164 and UE2 166. In this figure, NFs are instantiated upon the underlying resources of a data center. The functions are shown as being exploded out of the pool of resources upon which they are instantiated. This is done to indicate that the functions act as independent entities and from a logical perspective they are indistinguishable from a physical node carrying out the same function. It should also be understood that in a sliced network where data centers provide the underlying resources upon which the slices are created, it is possible for a single network to have slices that support different versions of networks, so for example, in addition to having a virtualized network to support 5G traffic, a separate network slice can be created to support 4G networks. Traffic from EDs 52 can be routed through NFs, to a GW 168 that provide access to a packet data network 170 such as the Internet. Radio access services are typically provided by a RAN, which in this illustration is provided as a Cloud-RAN (C-RAN). Where a conventional RAN architecture was designed to be composed of discrete elements such as eNBs that were connected to the CN through a backhaul network, a C-RAN takes advantage of function virtualization to virtualize the Access Nodes (ANs) of the network. Much as a physical AN, such as an eNB, was connected to an antenna by a front haul link, in the illustrated embodiment of a C-RAN, ANs, such as a gNB are connected to an antenna (or to a remote radio head (RRH)) through a front haul connection, but are functions that are instantiated upon computer resources in network 162. If a gNB is divided into a CU and a plurality DUs, the virtualized DUs may in some embodiments be instantiated at or near the location of the antenna or RRH, while a CU may be instantiated at a data center to connect and serve a plurality of geographically dispersed DUs. For example UE1 164 is connected to the network through AN 172, which can provide radio access services through antenna 174. AN 172 is instantiated upon the compute and storage resources provided by a data center, in this case data center 198-1. Similarly AN 176 and AN 180, which are connected to the same set of antennae 178, are also instantiated upon the resources of data center 198-1. AN 180 provides radio access services to UE2 166, which also makes use of the access services provided by AN 182. AN 182 is connected to antenna 184, and is instantiated upon the resources of data center 198-2. AN 186 is connected to antenna 188, and is also instantiated upon the resources of data center 198-2. It should be understood that the front haul connections linking the virtualized ANs to the antennas or RRHs, may be direct connections, or they may form a front haul network. The integration of a C-RAN into a CN may obviate or reduce the concerns associated with backhaul connections as the AN functions may be co-located with CN functions. As such, data center 198-1 also serves as a location at which a user-specific GW function (u-GW) 190 is instantiated. This function is also instantiated in data center 198-2. Having a function instantiated at more than one data center may be part of a function migration processing which the function is moved through the network 162, or one of the instantiations may be an intentionally redundant instantiation. Both functions can be instantiated and configured, with only one of them active at a time, or they may both be active, but only one of them may be transmitting data to the UE. In other embodiments, such as those focussed on Ultra-Reliable connections, such as Ultra-Reliable Low Latency Communications (URLLC), both functions may be active and transmitting data to (or receiving data from) an ED such as UE2 166. NFs such as a HSS 192, an AMF 194, or its predecessor Mobility Management Entity (MME), and a NEF 196 are shown as being instantiated on the resources of data center 198-5, 198-4 and 198-3 respectively.

The virtualization of the NFs allows a function to be located in the network 162 at a location topologically close to the demand for the service provided by the function. Thus, AN 172, which is associated with antenna 174, can be instantiated upon data center resources at the data center closest to the antenna 174, in this case data center 198-1. Functions such as an NEF 196, which may not need to be close to ANs, may be instantiated further away (in either or both of a topological or physical sense). Thus, NEF 196 is instantiated at data center 198-3, and the HSS 192 and AMF 194 are instantiated at data centers 198-5 and 198-4 respectively, which are topologically closer to the radio edge of the network 162. In some network implementations, data centers can be arranged hierarchically and different functions can be placed a different levels in the hierarchy.

Figure 8:
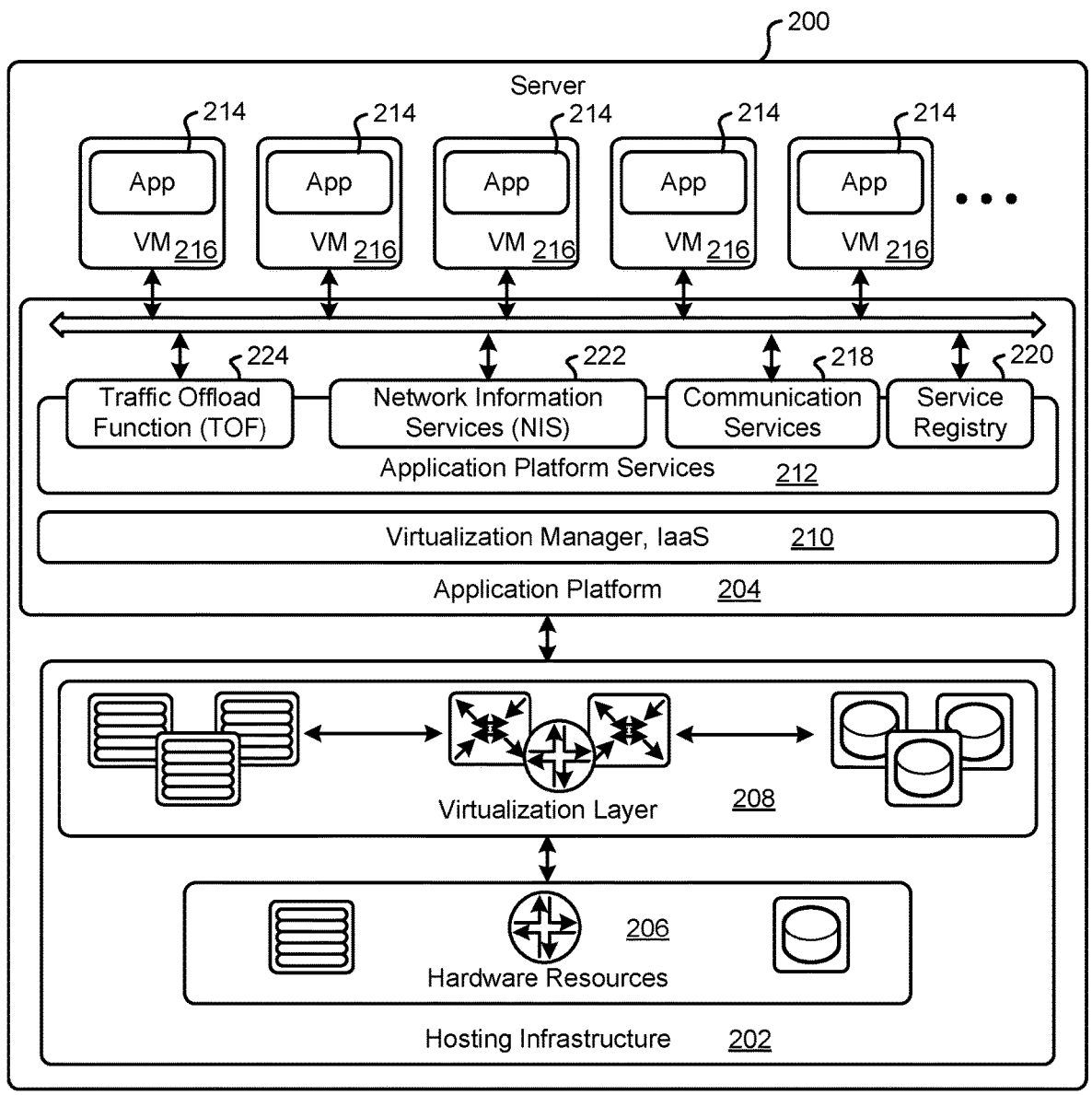
FIG. 8 is a block diagram illustrating a logical platform under which an ED can provide virtualization services.

FIG. 8 is a block diagram schematically illustrating an architecture of a representative server 200 useable in embodiments of the present disclosure. It is contemplated that the server 200 may be physically implemented as one or more computers, storage devices and routers (any or all of which may be constructed in accordance with the system 50 described above with reference to FIG. 1) interconnected together to form a local network or cluster, and executing suitable software to perform its intended functions. Those of ordinary skill will recognize that there are many suitable combinations of hardware and software that may be used for the purposes of the present disclosure, which are either known in the art or may be developed in the future. For this reason, a figure showing the physical server hardware is not included in this specification. Rather, the block diagram of FIG. 8 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 8, the illustrated server 200 generally comprises a hosting infrastructure 202 and an application platform 204. The hosting infrastructure 202 comprises the physical hardware resources 206, such as, for example, information processing, traffic forwarding and data storage resources) of the server 200, and virtualization layer 208 that presents an abstraction of the hardware resources 206 to the application platform 204. The specific details of this abstraction will depend on the requirements of the applications being hosted by the application layer (described below). Thus, for example, an application that provides traffic forwarding functions may be presented with an abstraction of the hardware resources 206 that simplifies the implementation of traffic forwarding policies in one or more routers. Similarly, an application that provides data stage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application 214 being hosted by the platform 204. Each "sandbox" may be implemented as a Virtual Machine (VM) image 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed with a respective VM 216. For example, MANagement and Orchestration (MANO) functions and Service Oriented Network Auto-Creation (SONAC) functions (or any of SDN, Software-Defined Topology (SDT), Software-Defined Protocol (SDP) and Software-Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications 214 to use.

Mobile-edge Computing allows cloud application services to be hosted alongside virtualized mobile network elements in data centers that are used for supporting the processing requirements of the C-RAN. Network Information Services (NIS) 222 may provide applications 214 with low-level network information. For example, the information provided by NIS 222 may be used by an application 214 to calculate and present high-level and meaningful data such as: cell-ID, location of the subscriber, cell load and throughput guidance.

A Traffic Off-Load function (TOF) service 224 may prioritize traffic, and route selected, policy-based, user-data streams to and from applications 214. The TOF service 224 may be supplied to applications 214 in various ways, including: a pass-through mode where (either or both of uplink and downlink) traffic is passed to an application 214, which can monitor, modify or shape it and then send it back to the original Packet Data Network (PDN) connection (e.g. a 3GPP bearer); and an End-point mode where the traffic is terminated by the application 214 that acts as a server.

The virtualization of NFs is considered to be a foundational technology for the architecture of flexible 5G networks. Function virtualization is a technology that allows for the creation of virtual functions on a base of compute, memory (which may include both executable memory and general storage) and connectivity or network resources. In many cases, these resources will exist within a data center. It should be understood that this discussion refers to resources instead of actual hardware because it is possible for virtualized resources to serve as the underlying resources for a next level of virtualization.

Virtualization may take the form of instantiating a virtual machine (VM) 216 that, to another entity on a network and to software executed on the VM 216, is no different than a physical node in the network. A VM 216 has its own set of compute, memory and network resources, upon which an operating system can be executed. The VM 216 can have a virtual network interface that can be assigned a network address. Between the underlying resources and the VM 216, there is typically a hypervisor that manages the resource isolation and network interactions. One of the purposes of a VM 216 is to provide isolation from other processes run on the system. When initially developed, a VM 216 was a mechanism to allow different network processors to operate without concern that a single errant process would be able to cause a complete system crash. Instead, an errant process would be contained to its own VM 216. This isolation allows for each VM 216 to have its own set of network interfaces. Typically, a single underlying resource can support a plurality of virtualized entities.

A more recent development has been the use of containers in place of VMs 216. Each VM 216 typically includes its own operating system which typically increases redundant resource usage. Containers allow a single OS kernel to support a number of isolated virtual functions. In place of a hypervisor that allows each VM 216 to run its own OS, a single OS hosts containers that are responsible for enforcing the resource isolation that would otherwise be provided by the VM 216. Each virtualized function within in its own container can be provided a virtualized network interface so that it appears as its own network entity.

Figure 9:
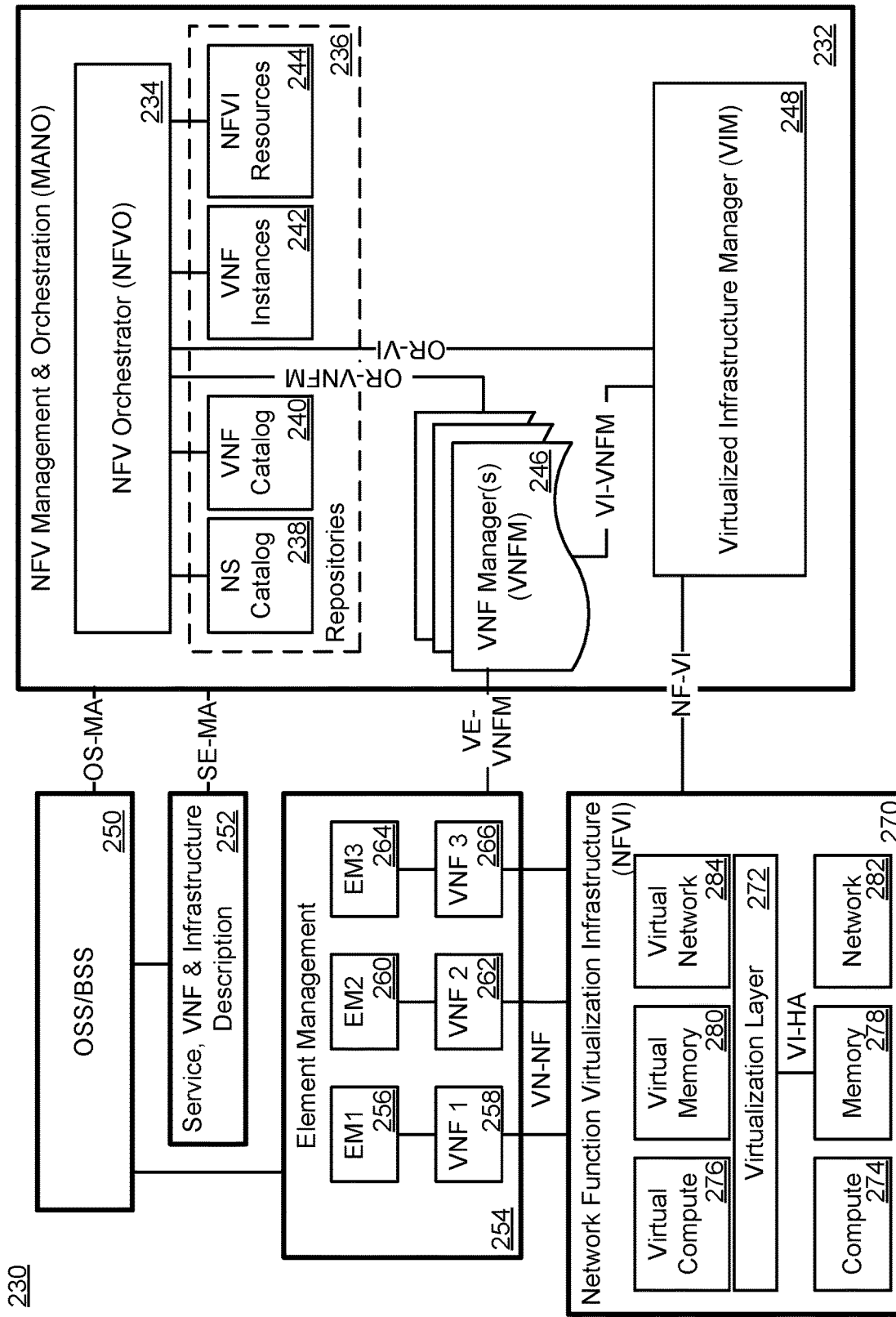
FIG. 9 is a block diagram illustrating an ETSI NFV MANO-compliant management and orchestration service.

With virtualization used in a networked environment, a question arises as to how the management of the instantiation, modification, and tear-down of virtualized functions is managed or orchestrated. To address this concern, the European Telecommunications Standards Institute (ETSI) has developed a set of standards for Network Function Virtualization (NFV) MANagement and Orchestration (MANO). As illustrated in FIG. 9, the NFV-MANO system allows for the management of NFV instantiation and modification. As illustrated, there can be interfaces to existing systems such as the Operation Support System (OSS)/Business Support Subsystem (BSS) 250. In network architecture 230, an NFV-MANO system 232 includes an orchestrator 234 which can access libraries 236 such as Network Service catalog 238, VNF Catalog 240, VNF Instances repository 242 and NFVI resources repository 244. The NS Catalog 238 may include templates that can be used as the basis for supporting network services. VNF catalog 240 may contain templates for the instantiation of different classes of VNFs. A particular VNF, after being instantiated, may be referred to as a VNF instance, and its attributes may be stored in VNF instances repository 242. NFVI resources 244 may be used to track the availability of resources, including both virtual resources and the physical infrastructure upon which they are instantiated. The NFVI 244 can be connected to a number of VNF Managers 246 through an OR-VNFM interface, and to a Virtualized Infrastructure Manager (VIM) 248 through an OR-VI interface. The VNFM 246 and VIM 248 can be connected to each other through a VI-VNFM interface.

The NFV MANO 232 can communicate with an OSS/BSS system 250 through OS-MA interface, and to a Service, VNF & Infrastructure description database 252 through an SE-MA interface. The Service, VNF & Infrastructure description database 252 can contain operator information about the services, VNFs and infrastructure deployed in the network. Service, VNF & Infrastructure description database 252 and OSS/BSS 250 can be connected to each other so that the OSS/BSS 250 can update and maintain the Service, VNF & Infrastructure description database 252 as needed.

NFVI 270 interacts with the VIM 28 through the NF-VI interface. Underlying resources can often be classified as compute resources 274, memory resources 278 and network resources 282. Memory resources 278 may also be referred to as storage resources, while network resources 282 may also be referred to as connectivity resources. A virtualization layer 272 allows for the abstraction of the underlying resources that it is connected to through a VI-HA interface. It should be understood that the underlying resources may be either physical or virtual resources. The Virtualization layer 272 allows for the abstraction of the underlying resources into virtual compute resources 276, virtual memory resources 280 and virtual network resources 284. These virtualized resources can be provided to the element management system 254 through the VN-NF interface so that they can be used as the resources upon which the VNFs (shown as VNF1 258, VNF2 262 and VNF3 266) can be instantiated. An element manager (EM) 254 can be connected to the VNFM 246 within NFV MANO 232 through interface VE-VNFM, and to the OSS/BSS 250 through another interface. Each VNF instantiated upon the virtual resources provided by NFVI 270 can be associated with an EM (EM1 256, EM2 260 and EM3 264). The use of an EM allows the OSS/BSS 250 to have two paths through which the VNFs can be managed. A VNF can be managed through the VNFM 246, or through the EM associated with the VNF. Each EM can provide the same management controls that it would otherwise provide for a physical network element. Thus, the OSS/BSS 250 can treat each VNF as a conventional NF. Modification to the resource allocation associated with a VNF can be requested by an EM through the VNFM 246, or through a request from the OSS/BSS 250 over the OS-MA interface.

The virtualization of NFs allows functions to be deployed with the resources that are required and not with an intentional over provisioning. In conjunction with the above-described slicing and data center utilization, flexible networks can be deployed in a manner that allows an operator to dynamically modify the connectivity between functions (thus changing the logical topology of the network) and to dynamically modify the resources and location of the NFs (thus changing the physical topology of the underlying network). Additional resources can be allocated to existing functions to allow for scaling-up of an existing function, and resources can be removed from an allocation to allow for a scaling-down of a function. Resources from more than one resource pool or data center can be allocated to a function so that it can be scaled-out, and resources from different pools can be removed to allow a function to be scaled-in. Functions can be moved by transferring their state information to another NF, and in some instances, a function can be moved through a combination of scaling-out and scaling-in functions.

In the present disclosure, the term "provisioning" is understood to encompass the combination of the preparation and commissioning phases. It is also understood that provisioning may be defined as "allocating".

Figure 10:
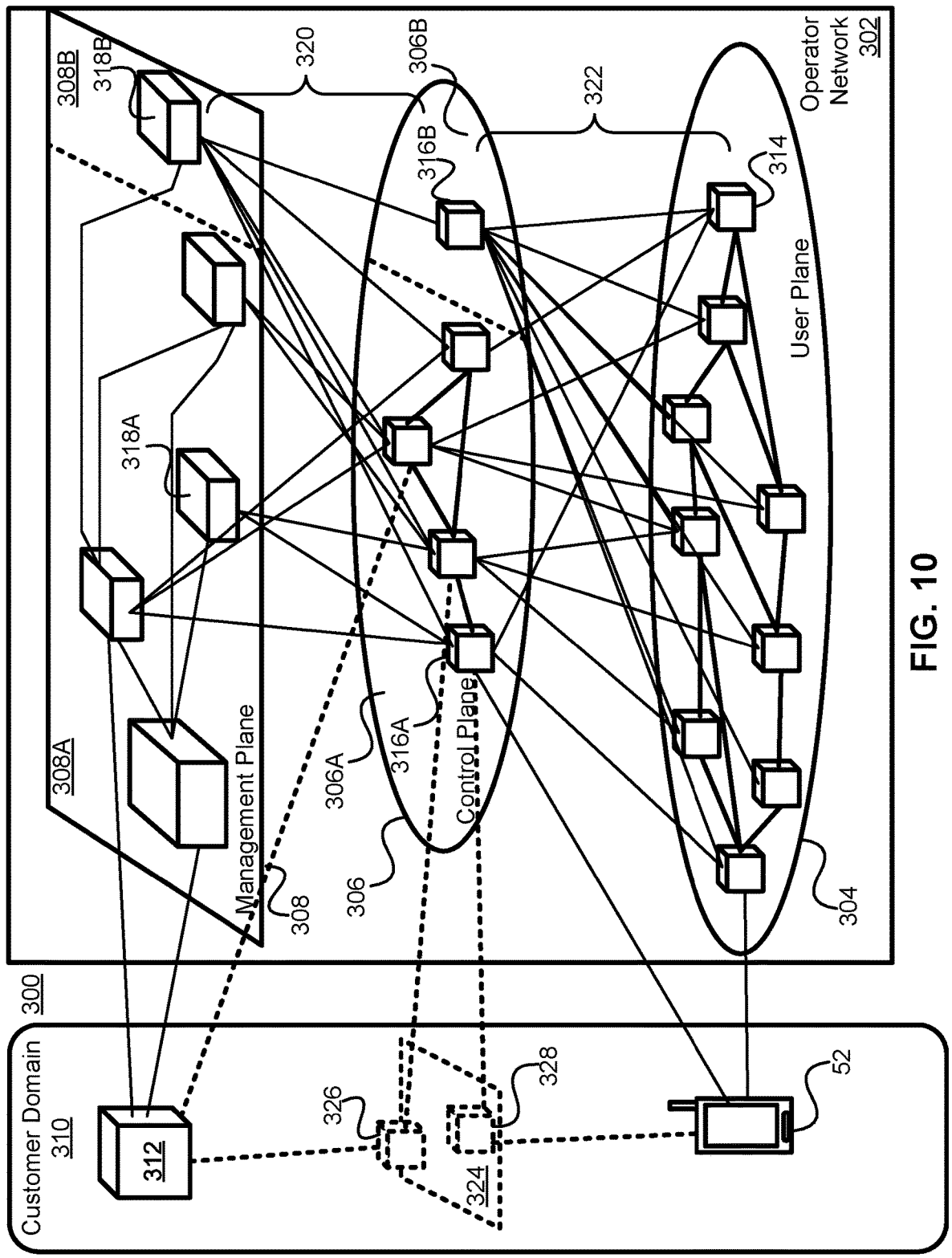
FIG. 10 is a diagram illustrating an embodiment of interactions between the Management Plane, Control Plane and User Plane of a network.

FIG. 10 illustrates a network architecture 300 in which the resources of the operator network 302 are divided into a set of logical planes, a UP 304, a CP 360 and a Management Plane (MP) 308. The UP 304 is typically focussed on packet transport, but certain functions including packet filtering and traffic shaping can be performed in the UP 304, although this is typically performed based on instructions from a NF in the CP 306. Functions in the MP 308 receive input from NFs within the customer domain 310 about the policies that should be enforced by the network control functions in the CP 306. If Operator Network 302 supports network slicing, functions within MP 308 may be responsible for slice design and creation. It should be understood that a single MP 308 may be used to provide management functionality for a plurality of network slices that each have different control and user planes. Functions within the MP 308 can communicate with each other to ensure that the differing policies for a possible plurality of customers are fitted together in a suitable set of instructions.

UP 304 may also be referred to as a data plane (DP). It carries the traffic between an ED 52 and other external data networks (not shown) or functions within the operator network 302. UP 304 is typically composed of UP Functions (UPFs) 314. In some instances, a UPF 314 may be specific to a particular UE, it may be specific to a particular service (in some embodiments, it may be both user and service specific), and in other instances it may be a generic function serving a plurality of users and services. UPFs 314 are connected to each other to allow for DP traffic to be transmitted.

The CP 306 may be composed of CP Functions (CPFs) 316. In a 3GPP compliant network, some CPFs 316A have functions defined by standards, while other CPFS 316B may be outside the specification of the relevant standards. This may effectively result in the CP 306 being divided into a standards-compliant CP segment 306A and a non-standards compliant CP segment 306B. In a 3GPP-compliant CP segment 306A, NFs 316A such as an AMF, SMF, NEF, AUSF, etc. may be present, and in some embodiments more than one instance of any or all of the functions may be present. In a non-standards compliant CP segment 308B, a NF 316B such as an SDN Controller, or other such controllers including a SONAC-OPS controller, may be connected to other CPFs, as shown by functions 316A, but this is not necessarily required as may be seen by CPF 316B. ED 52 may also communicate with CPFs.

The Management Plane 308 can be divided between a standards-compliant section 308A and a non-standards compliant section 308B, much as CP 306 is divided. Within MP 308, NFs and nodes 318 can communicate with each other, and with a NF or node 312 within the customer domain 310. MP entities 318A (within the standardized section 308A) and 318B (within the non-standards compliant section 308B) can be used to establish policy, and the mechanisms by which policy is to be enforced, based on the resources available and requirements received from the customer 312 (and possibly a plurality of different customers). Network Management Functions (NMFs) 318 may be responsible for accounting and billing functions for element management, they may provide the services required for an OSS and a BSS. Outside the standardized functions, non-standardized NFs 318B may include an NFV-MANO system and a SONAC-Com controller.

NMFs 318 can receive external input from a customer node 312, and can communicate with each other. NMFs 318 can also communicate, over any of the MP-CP connections 320, with CPFs 316 to provide instructions about the policies to be enforced by CPFs 316. Changes in the resources underlying the network 302 are also communicated by an NMF 318 to CPFs 316. In CP 306, CPFs communicate with each other, and with ED 52. CPFs 316 are also in communication with UPFs 314, and through this communication they can receive information such as traffic loads on links and processing loads at NFs. In conjunction with policy information received from NMFs 318, a CPF 316 can transmit instructions to the UPFs 314, over the CP-UP (also referred to as UP-CP) connections 322, to govern the behaviour of the UPFs 314. A UPF 314 receives configuration information from a CPF 318, and handles UP traffic in accordance with the received configuration information. Loading information (which may include both processing and network connection (or link) loading) may be gathered by a UPF 314 and provided to a CPF 316.

In some embodiments, the customer NF 312 may have a connection to a CPF 316. This CPF 316 with which customer NF 312 communicates, may be either a 3GPP-compliant CPF 316A or a non-3GPP compliant CPF 316B. In alternate embodiments, the customer NF 312 may make use of a function within MP 308 to relay messages to functions in CP 306. Within the customer domain 310, there may be an optional CP 324, with customer CPFs 326 and 328. When such a customer CP 324 is present, functions 326 and 328 may have logical communications links with either or both of ED 52 and the customer NF 312. Customer CP functions 326 and 328 may have connections to functions within CP 306 (either 3GPP-compliant functions 316A or non-3GPP compliant functions 316B).

Provisioning and Operating a Network Slice Instance

The present disclosure describes provisioning for NS(S)Is at both a generic (high) level and at a example detailed level. Such detailed procedures may in some examples describe steps to be taken in each lifecycle phase of an NS(S)I, the relationship between the NS(S)I and any one or more of a communication service instance lifecycle, specific interface descriptions, related management entities and their respective tasks. The procedure(s) may change based on data and/or management exposure, service type and/or any other related details.

3GPP recognizes certain management entities in the network that may be involved in provisioning of an NS(S)I. These include a communication service management function (CSMF) that converts customer service requirements to network slice requirements, a network slice management function (NSMF) that breaks down network slice requirements into individual sub-slice requirements and a network slice subnet management function (NSSMF) that manages the subnet slices and creates subnets using VNFs and physical NFs (PNFs) using the MANO and/or one or more domain manager(s) (DM)/element manager(s) (EM).

In some examples, one or more of the functions described herein as being provided by the CSMF may be provided as a discrete or atomic function. These functions include, without limitation, performing a feasibility check on communication service(s) and for preparation of network slice requirements; exposing communication service-related data, management functions (MFs) and/or capabilities, subject to agreement of the network operator; lifecycle management (LCM), fault management (FM), performance management (PM) and/or configuration management (CM) of one or more communication service(s).

In some examples, one or more of the functions described herein as being provided by the NSMF may be provided as an atomic function. These functions include, without limitation, network resource discovery; performing a feasibility check on the network slice; determining the network slice subnet-related requirements; exposing network slice capabilities, subject to agreement of the network operator; exposing network slice management functions and/or data, subject to agreement of the network operator, self-optimization, self-configuration and/or self-healing of one or more network slice(s); and/or LCM, FM, PM and/or CM of one or more network slice(s).

In some examples, one or more of the functions described herein as being provided by the NSSMF may be provided as an atomic function. These functions include, without limitation, network resource discovery; performing a feasibility check on the network slice subnet; managing the network slice subnet-related polic(ies); exposing network slice subnet capabilities, subject to agreement of the network operator; exposing network slice subnet management functions and/or data, subject to agreement of the network operator; self-optimization, self-configuration and/or self-healing of one or more network slice subnet(s); LCM, FM, PM and/or CM of one or more network slice subnet(s).

In some examples, one or more 5G NF management functions may be provided as an atomic function. These functions include, without limitation, trace management, minimization of driver tests (MDT), self-organizing networks (SON), (which may comprise any one or more of self-configuration, self-healing, automatic neighbour relation (ANR), maintenance, reliability and operations (MRO), enrolment systems (ES), and/or single wire multiswitch (SWM), entry point management (EPM), FM, PM and/or CM of one or more 5G NFs.

In addition, the provisioning of an NS(S)I may involve network management entities such as a service manager (SM) that is involved with all types of services to negotiate with the customer, admit the service, establish a service level agreement (SLA) and prepare internal service requirements for processing by the CSMF, a slice operations manager (SOM) that manages and optimizes a slice during run-time after it has been instantiated onto a PoP and an infrastructure management function (InMF) that manages the infrastructure and allocates it to different slice subnets.

The various management entities may manage, in the context of 5G network management, any one or more of 5G services, 5G slice instances, 5G NFs and/or other resources, including without limitation, virtual and/or non-virtual resources that support the 5G network.

The disclosed provisioning procedures take into account a number of scenarios, that encompass various combinations of one or more of the following:

exposure (none, data, management and/or between network entities (openness);

service type (infrastructure as a service (IaaS), network slice as a service (NSaaS), network slice subnet as a service (NSSaaS) and/or communications as a service (CaaS));

slice deliverable type (Type1 (fully configured and managed slice without exposure), Type2 (fully configured and managed slice to provide specific services via certain data and management exposure), Type3 (configured and managed slice that can be configured to provide specific services via certain data and management exposure) and/or Type4 (management interfaces are exposed and resources are provided to configure slices));

effective life cycle actions (design, on-boarding, network environment preparation and/or creation); and shareable and/or non-shareable slices.

The various procedures for provisioning of a NSSI will be described first, followed by the various procedures for provisioning of an NSI.

Provisioning a Network Slice Subnet

Figure 11:
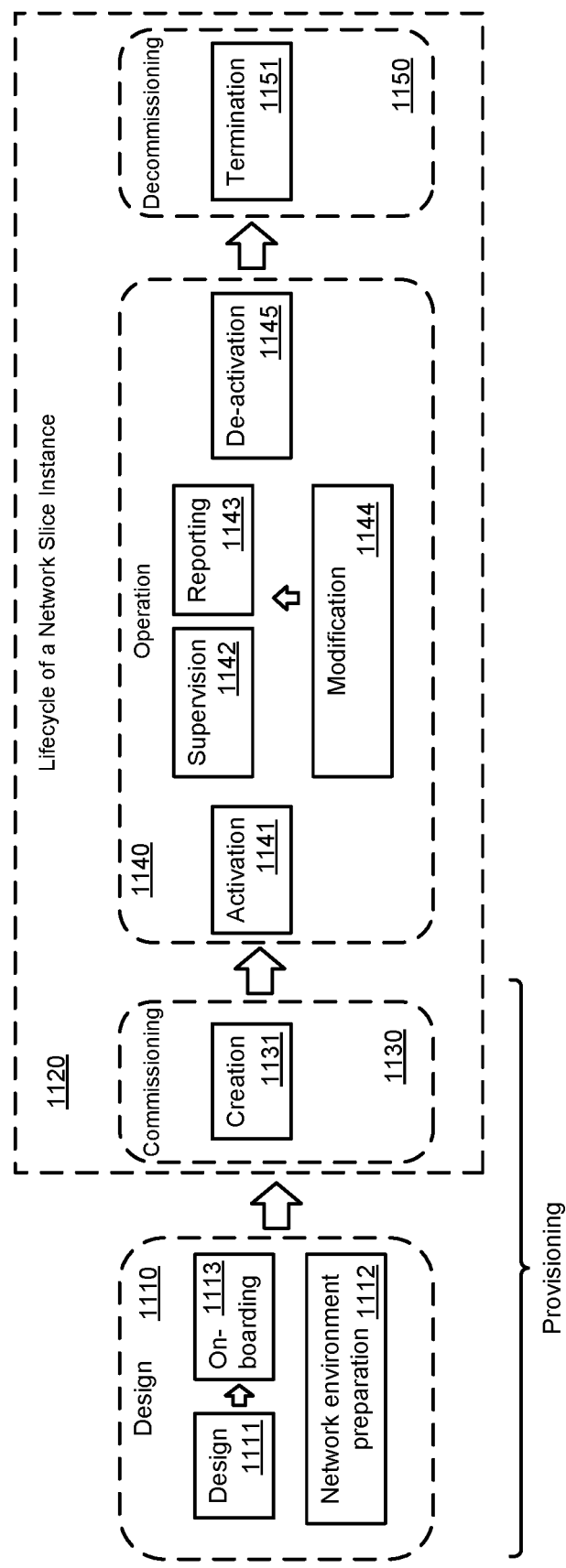
FIG. 11 is a diagram showing examples of the lifecycle of an NS(S)I.
Figure 12:
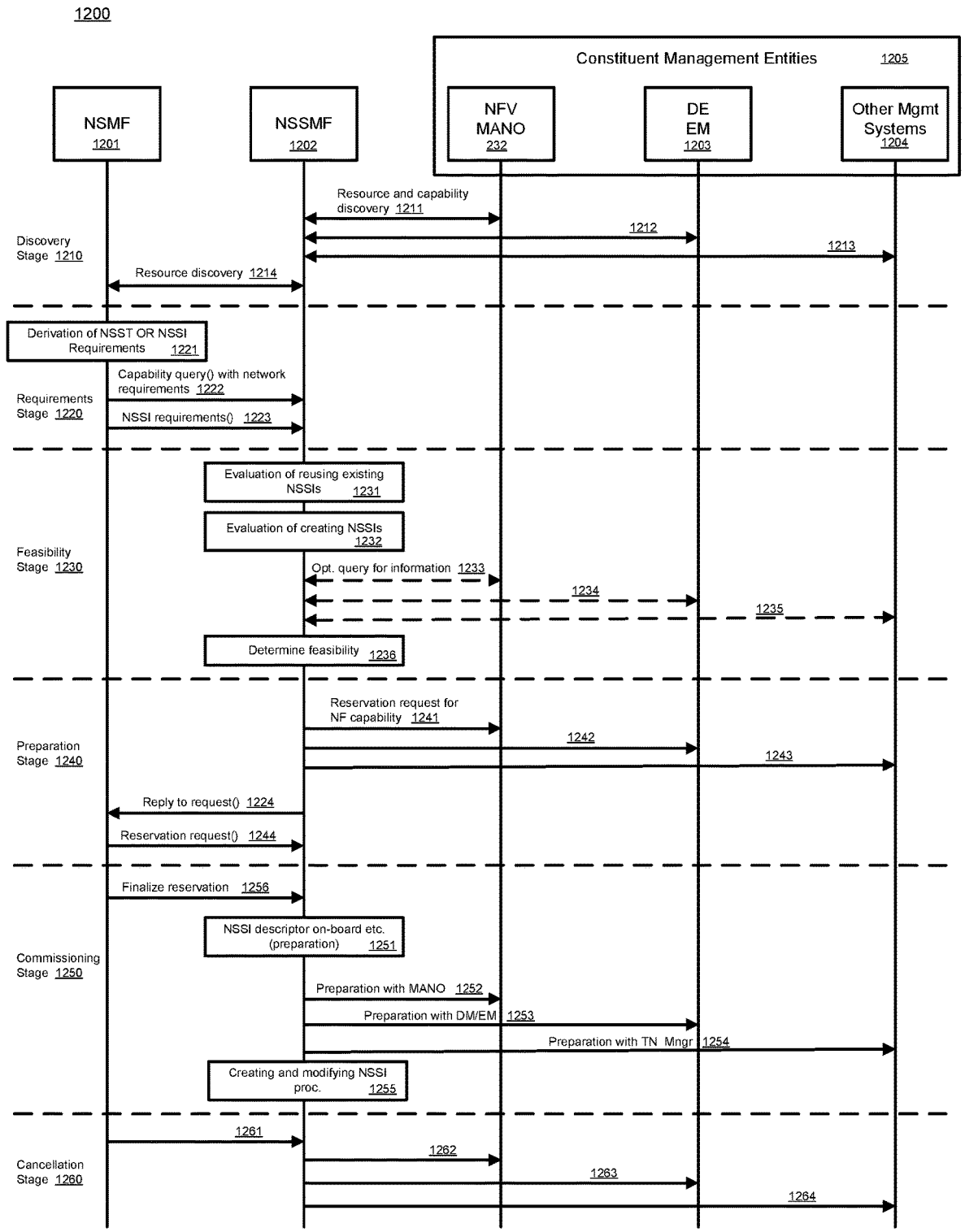
FIG. 12 is a signal flow diagram showing example signal flows to provision an NSSI according to an example.

FIG. 12 is a signal flow diagram showing example signal flows to provision an NSSI in a generic procedure shown generally at 1200. With reference to FIG. 11, it may be understood that in the present disclosure, the term "provisioning" refers to the preparation phase 1110 and the commissioning phase 1130 collectively.

The figure shows communications between the NSMF 1201, NSSMF 1202, NFV MANO 232, the DM/EM 1203 and other management systems 1204, which may comprise 3GPP and/or non-3GPP management entities, including without limitation, the transport network (TN) and/or Wi-Fi systems. Those skilled in the relevant art will appreciate that the NFV MANO 232, DM/EM 1203 and the other management systems 1204 are management entities that are constituents (collectively 1205) of the NSSMF 1202 and with which the NSSMF 1201 may communicate.

It is assumed that network slice subnet template(s) (NSSTs) are already on-boarded.

In the present disclosure, a dashed line or box indicates an optional flow and/or action.

The generic procedure 1200 comprises the NSSMF 1202 proceeding through stages, which may comprise discovery of resources and/or abstractions of resources in the form of capabilities 1210, derivation of requirements 1220, checking of feasibility 1230, preparation of the network environment 1240 and commissioning of the NSSI 1250. In some examples, the NSMF 1201 requests that the commissioned NSSI be cancelled, whereupon a cancellation phase 1260 is entered. These stages are shown by dashed horizontal lines on the figure for description purposes only. While there may be similarities to elements of FIG. 11, there is not necessarily a relationship between the stages identified herein and those elements of FIG. 11 that may bear similar names.

With reference to FIG. 11, the discovery stage 1210, the requirements stage 1220 and the feasibility stage 1230 correspond collectively to the design 1111 of the NSSI, while the preparation stage 1240 corresponds to the network environment preparation 1112. The commissioning stage 1250 corresponds to at least the commissioning phase 1130 and may include on-boarding 1113 during the preparation phase 1110. In some examples, the on-boarding 1113 may be understood to take place during the preparation stage 1240.

In the discovery stage 1210, the NSSMF 1202 obtains information 1211, 1212, 1213 from its constituent management entities 1205. The discovery of resources can be used to derive network capabilities, abstractions and to prepare a catalogue of services. Such a catalogue may comprise, without limitation, available subnet slice types, network slice subnet templates (NSSTs) and/or existing NSSIs. In some example, the catalogue may contain capability information, including, without limitation, remaining capacity in the network, in terms of network resources and/or services that can be provided. In some examples, resource discovery may encompass review of an initially-prepared service catalogue prior to or during the feasibility stage 1230.

The discovery of capabilities may be obtained from the constituent management entities 1205. The timing and/or frequency of the discovery of capabilities may depend upon the governing openness policy. In this regard, the openness of the constituent management entities 1205 may depend upon whether the NSSMF 1202 is in a trusted state. At some trust levels, and subject to mutual agreement, only a limited subset of capabilities is disclosed. In some examples, the amount of information available from the constituent management entities 1205 may exceed what is being sought by the NSSMF 1202. In such examples, the NSSMF 1202 may make specific inquiries to limit the disclosure of information.

Figure 21:
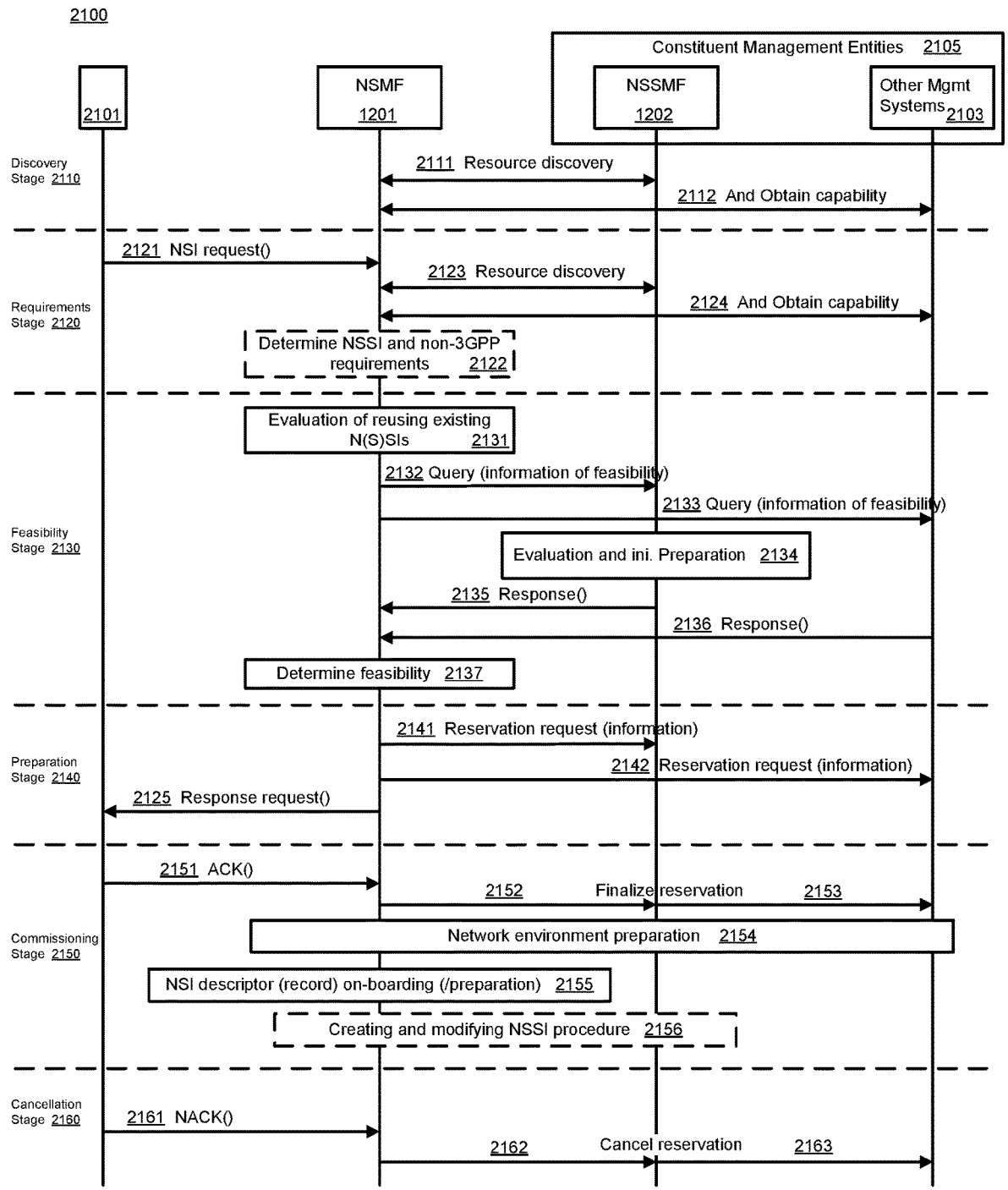
FIG. 21 is a signal flow diagram showing example signal flows to provision an NSI according to an example.

In some examples, the NSSMF 1202 may itself receive a request 1214 from the NSMF 1201 to provide it capability information, by way of non-limiting example, in the context of a discovery phase of provisioning an NSI (FIG. 21). The NSSMF 1202 provides information in accordance with its exposure policy. In some examples, if the NSSMF 1202 maintains a service catalogue, including without limitation, a NSST repository, the NSSMF 1202 may provide access to such catalogue in response to the request 1214. The information obtained by the NSSMF 1202 from its constituent management entities 1205 may be provided to the NSMF 1201 or other 3GPP management entit(ies). Such information may be used by the NSMF 1201 to derive network slice subnet requirements by the network slice subnet customer that may be conveyed in request 1223.

In the requirements stage 1220, the NSMF 1201 derives 1221 requirements for the NSSI. These requirements may include one or more NSST(s), network slice subnet characteristics, network topology, specific resource requirements, latency, bandwidth, NF-related requirements, such as, without limitation, placement, NF-related capabilities and/or network knowledge performance indicators (KPIs), such as, without limitation, network outage and/or specific link requirements. Such requirements may be derived by the NSMF 1201 as a result of its resource discovery process (including without limitation signal flow 1214) and/or a check of the service catalogue. In some examples, the resource discovery process does not provide sufficient information and one or more targeted capability quer(ies) may be made 1222 by the NSMF 1201 to the NSSMF 1202.

In some examples, the requirements may be prepared by another actor, including without limitation, a customer, and provided (not shown) to the NSMF 1201.

However obtained, the NSMF 1201 conveys 1223 a request with the requirements to the NSSMF 1202. Eventually, the NSSMF 1202 conveys 1224 a response to the request 1223 to the NSMF 1201, as discussed below.

In the feasibility stage 1230, the NSSMF 1202 performs a feasibility check to obtain an initial indication as to whether the request is viable. In so doing, the NSSMF 1202 may evaluate 1231 the possibility of re-using, whether or not with modification, an existing NSSI. Such evaluation may consider existing NSSIs and/or NSSTs and the remaining capacity of the network subnet.

If this is not considered likely, the NSSMF 1202 may evaluate 1232 the possibility of creating a new NSSI to support the request.

In the course of such evaluation(s), the NSSMF 1202 may determine that more information is called for and it may query 1233, 1234, 1235 its constituent management entities 1205 for additional capability information. Such queries may be based on the requirements obtained from the NSMF 1201, or may comprise a general request for capability information for further discovery of resources. The nature of the query and the response obtained may in some examples depend upon the level of openness of the constituent management entities 1205.

The NSSMF 1202 thereupon makes a formal determination 1236 of feasibility. If the request 1223 is feasible, the NSSMF 1202 proceeds to the stage of preparing the network environment 1240, accepts the request 1223 from the NSMF 1201 and prepares a reply 1224 thereto. In some examples, certain information exposure is permitted between the NSSMF 1202 and the NSMF 1201 and the reply 1224 may disclose information about the constituent management entities 1205 of the NSSMF 1202, including, without limitation, their remaining capacity, NSST(s) and/or NSST attributes.

If the request 1223 is not feasible, the NSSMF 1202 rejects the request 1223 from the NSMF 1201 and prepares a reply 1224 thereto. In some examples, certain information exposure is permitted between the NSSMF 1202 and the NSMF 1201 and the reply 1224 may disclose information about the constituent management entities 1205 of the NSSMF 1202, including, without limitation, their remaining network capability. Such information may permit the NSMF 1201 to update and re-send its request 1223.

In some examples (not shown but discussed in connection with FIG. 15, the NSMF 1201 and NSSMF 1202 may negotiate for other feasible provisioning options. If not successful, the cancellation stage 1260 is entered.

In the preparation stage 1240, the NSSMF 1202 makes preparations that may include, without limitation, reserving resources by sending 1241, 1242, 1243 reservation requests to the constituent management entities 1205 for establishing connectivity of NFs (in the case of the NFV MANO 232 and/or DM/EM 1203) or of TNs (in the case of the other management systems 1204).

In some examples, the NSSMF 1202 may itself receive a request 1244 to reserve resources for use by the NSMF 1201, by way of non-limiting example, in the context of a preparing network environment phase of provisioning an NSI (FIG. 21). In the course of responding to such request 1244, the NSSMF 1202 makes preparations that may include, without limitation, reserving resources by sending 1241, 1242, 1243 reservation requests to the constituent management entities 1205.

In the commissioning stage 1250, the NSSMF 1202 on-boards 1251 a suitable selected NSSI descriptor as identified in actions 1231 and/or 1232. The on-boarding process 1251 may include messages 1252, 1253, 1254 to its constituent management entities 1205 to make preparations to configure its NF(s) and/or TN(s). When the NSSI descriptor has been on-boarded 1251 have been completed, the NSSMF 1202 creates (and/or modifies) the NSSI process to create 1255 the NSSI.

In some examples, the NSSMF 1202 may itself receive a request 1251 to finalize a reservation for use by the NSMF 1201, by way of non-limiting example, in the course of creating an NSI (FIG. 21). In the course of responding to such request 1251, the NSSMF 1202 on-boards an NSSI descriptor 1251, makes preparations 1252, 1253, 1254 and creates the NSSI 1255.

Once the NSSI has been created or modified 1255, the NSSMF 1202 sends 1257 an acknowledgement of successful on-boarding to the NSMF 1201. The acknowledgement 1257 may in some examples include information about the NSSI(s), including without limitation, the ID(s), service access point information and/or external connection point information of the NSSI(s).

In some examples (not shown), the NSMF 1201 may respond to the acknowledgement 1257 with a reply that provide association information with the corresponding NSI for the NSSI(s) that the NSSMF 1202 may use to differentiate traffic.

In some examples, the cancellation stage 1260 is entered if the feasibility check fails. In some examples, the cancellation stage 1260 is initiated by a request 1261 from the NSMF 1201 to the NSSMF 1202 to cancel the created NSSI. In response to such request, the NSSMF 1202 cancels the created NSSI (not shown) and in the course of so doing, may issue requests 1262, 1263, 1264 to its constituent management entities 1205 to cancel reserved resources.

Figure 13:
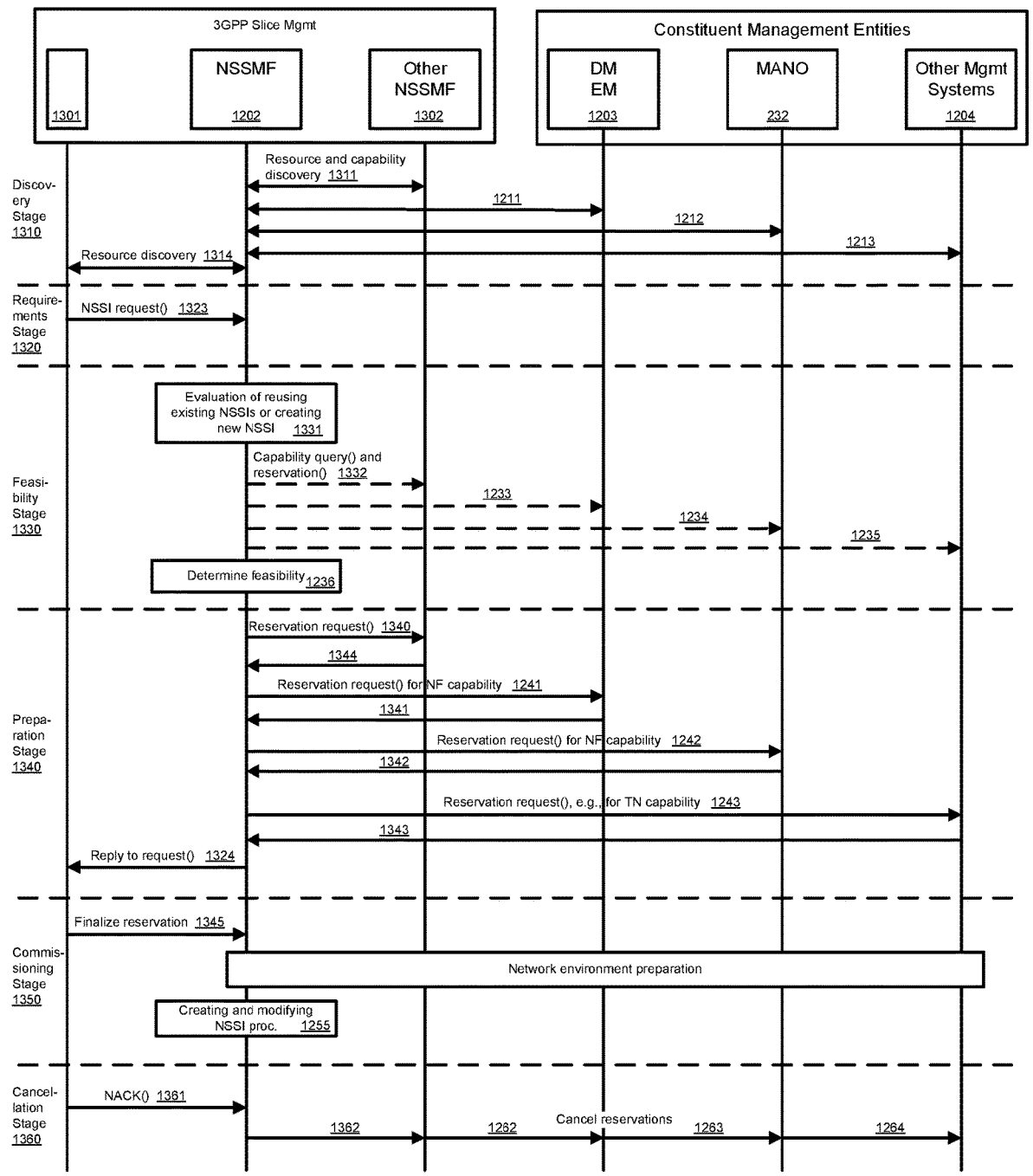
FIG. 13 is a signal flow diagram showing example flows to provision an NSSI according to an example.

FIG. 13 is a signal flow diagram showing example signal flows to provision an NSSI in a procedure shown generally at 1300. The figure shows communications between a 3GPP entity 1301, which may be a customer (not shown) and/or the NSMF 1201, NSSMF 1202, NFV MANO 232, the DM/EM 1203 and other management systems 1204 and additionally one or more other NSSMF(s) 1302.

While similar to FIG. 12, FIG. 13 may be seen to be an alternative example showing the presence of another NSSMF 1302. Nevertheless, the NSSMF 1202 again proceeds through stages, which may comprise discovery 1310, requirements 1320, feasibility 1330, preparation 1340 and commissioning of the NSSI 1350. In some examples, the NSMF 1201 requests that the created NSSI be cancelled, whereupon a cancellation stage 1360 is entered.

In the discovery stage 1310, the NSSMF 1202 obtains information 1211, 1212, 1213 from its constituent management entities 1205 in a similar manner to the discovery stage 1210 of FIG. 12. Additionally, the NSSMF 1202 obtains information 1311 from the other NSSMF(s) 1302. In some examples, the NSSMF 1202 may itself receive a request 1314 from the 3GPP entity 1301 to provide it capability information, by way of non-limiting example, in the context of a discovery phase of provisioning an NSI (FIG. 21). Such request is handled by the NSSMF 1202 in a manner similar to that request 1214 of FIG. 12.

In the requirements stage 1320, the 3GPP entity 1301 conveys 1323 a request with specific slice subnet requirements to the NSSMF 1202 in a manner similar to that of request 1223 of FIG. 12. Eventually, the NSSMF 1202 conveys 1324 a response to the request 1323 to the 3GPP entity 1301, as discussed below.

In the feasibility stage 1330, the NSSMF 1202 evaluates 1331 the possibility of re-using or creating a new NSSI. Such evaluation may consider existing NSSIs and/or NSSTs and the remaining capacity of the network subnet.

In the course of such evaluation, the NSSMF 1202 may determine that more information is called for and it may query 1233, 1234, 1235 its constituent management entities 1205 for additional capability information in a manner similar to that of FIG. 12. Additionally, the NSSMF 1202 may query 1332 the other NSSMF(s) in a similar fashion.

The NSSMF 1202 thereupon makes a formal determination 1236 of feasibility in a manner similar to that of FIG. 12. If the request 1323 is feasible, the NSSMF 1202 proceeds to the stage of preparing the network environment 1340, access the request 1323 from the 3GPP entity 1301 and prepares a reply 1324 thereto in a manner similar to reply 1224 in FIG. 12.

If the request 1323 is not feasible, the NSSMF 1202 rejects the request 1323 from the 3GPP entity 1301 and prepares a reply 1324 thereto in a manner similar to reply 1224 in FIG. 12.

In the preparation stage 1340, the NSSMF 1202 reserves resources by sending 1241, 1242, 1243 reservation requests to the constituent management entities 1205 in a manner similar to that of FIG. 12, as well as sending 1340 reservation request(s) to the other NSSMF(s) 1302. Here, responses 1341, 1342, 1343 are shown from the constituent management entities 1205 as well as a response 1344 from the other NSSMF(s) 1302. Such responses may be inferred in FIG. 12.

In response to the reply 1324, the 3GPP entity 1301 confirms 1345 its request to the NSSMF 1202 to reserve resources for provisioning of the network slice subnet.

Accordingly, in some examples, the NSSMF 1202 makes any remaining preparations that were not completed in the preparation stage 1340, including without limitation, reserving resources of the constituent management entities 1205 and/or the other NSSMF(s) 1302, instantiation of VNFs and/or on-boarding of any NSSTs that are missing.

In the commissioning stage 1350, the NSSMF 1202 creates (and/or modifies) 1255 the NSSI process in a manner similar to that of FIG. 12. Certain of the flows shown in the creation stage 1250 of FIG. 12 but not shown in FIG. 13 may be inferred.

The cancellation stage 1360 is initiated by a request 1361 from the 3GPP entity 1301 to the NSSMF 1202 to cancel the created NSSI. In response to such request, the NSSMF 1202 cancels the created NSSI (not shown) and in the course of so doing, may issue requests 1262, 1263, 1264 to its constituent management entities 1205 to cancel reserved resources, as well as request 1362 to the other NSSMF(s) 1302.

Figure 14:
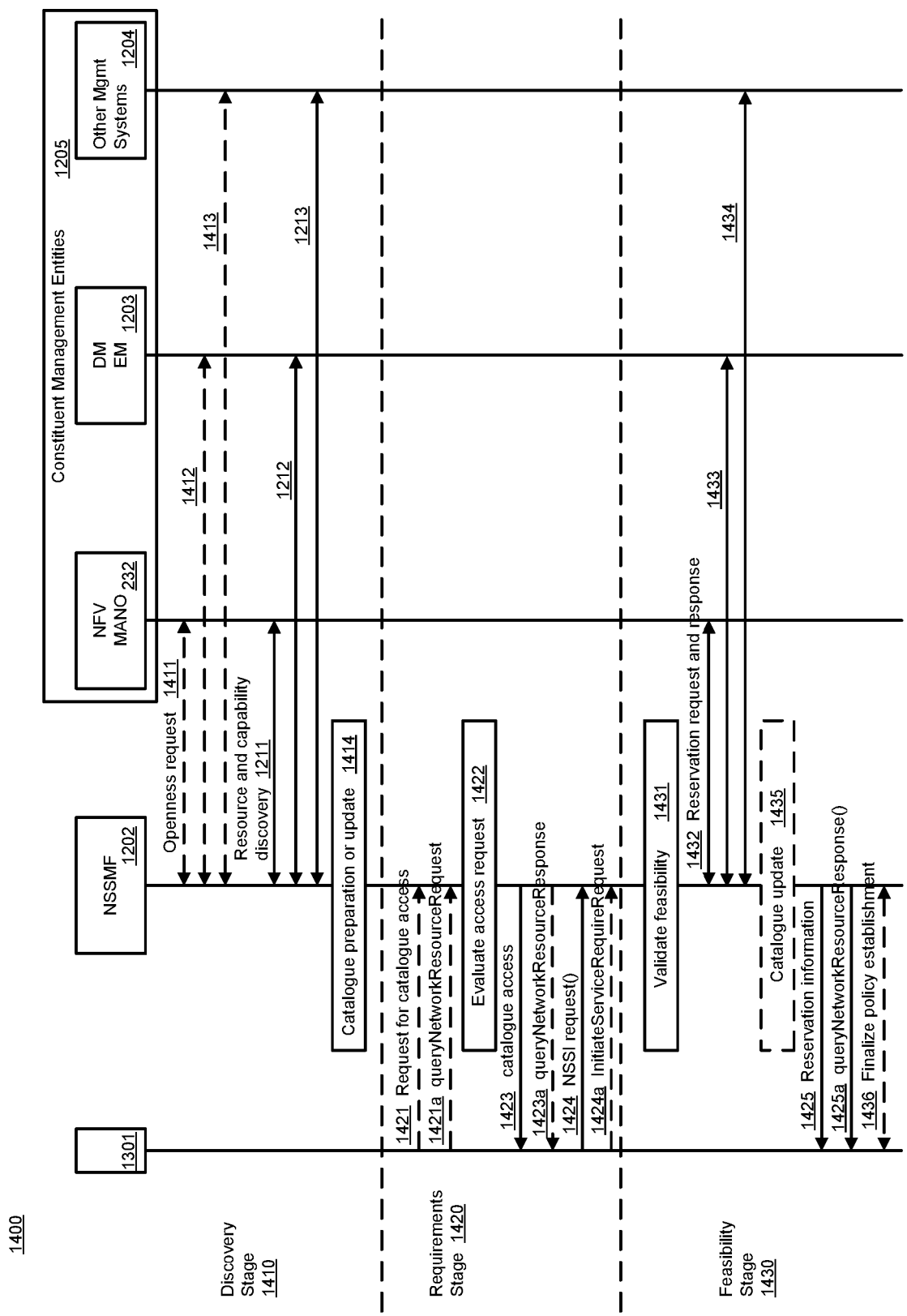
FIG. 14 is a signal flow diagram showing example flows to prepare an NSSI with catalogue and capability exposure according to an example.

FIG. 14 is a signal flow diagram showing example flows to prepare an NSSI with catalogue and capability exposure shown generally at 1400. The figure shows communications between the 3GPP entity 1301, the NSSMF 1202, NFV MANO 232, the DM/EM 1203 and other management systems 1204.

In the scenario of FIG. 14, the service catalogue and capabilities is exposed to the 3GPP entity 1301. This allows the NSSMF 1202 to establish openness with the its constituent management entities 1205, such as, by way of non-limiting example, to subscribe to updates on remaining capacity and/or obtaining interfaces for access to information. Such exposure also allows the 3GPP entity 1301 to, without limitation, check for the feasibility of the requests and/or design NSSIs, which may facilitate the provisioning in that the amount of negotiations may be reduced. The scenario of FIG. 14 is well suited to Type2 slice deliverable types as described above, but may be applicable to any slice deliverable types.

In the discovery stage 1410, the NSSMF 1202 requests 1411, 1412, 1413 openness from its constituent management entities 1205, to facilitate resource and capability discovery.

Thereafter, the NSSMF 1202 obtains information, 1211, 1212, 1213 from its constituent management entities 1205 in a manner similar to that of FIG. 12. However, if, without limitation, certain interfaces, access to databases and/or monitoring capabilities are provided to the NSSMF 1202 as a result of the openness requests 1411, 1412, 1413, the NSSMF 1202 does not send inquiries related to these.

The NSSMF 1202 may create, update and/or maintain 1414 a service catalogue, database and/or similar repository based on the information it has collected about its capabilities, including without limitation, the NSSTs and/or types thereof.

In the requirements stage 1420, the NSSMF 1202 may receive a request 1421 from the 3GPP entity 1301 to provide information on the network, that is, to expose its service catalogue. In some examples, the request 1421 is a message 1421*a* similar to queryNetworkResourceRequest with filter( ) and attributeSelector( ) parameters. In some examples, the request 1421 is a different message and may include parameters for, without limitation, capacity exposure, capability exposure and/or openness. In some examples, the request 1421 may be a Service CapabilityRequest message from the 3GPP entity 1301, which may in some examples be, without limitation, the NSMF 1201, another NSSMF 1302 and/or the CSMF, to the NSSMF 1202. In some examples, an input parameter of the Service CapabilityRequest message may be a serviceCapabilityRequest identifier that asks for a service that can be provided and an output parameter may be a serviceCapability that lists possible services with capability, including without limitation, capacity exposure, capability exposure and/or openness. In some examples, the request 1421 may be a ServiceOpennessRequest message from the NSSMF 1202 to one of the constituent management entities 1205, which may be, without limitation, the NFV MANO 232, a DM/EM 1203 or other management system 1204. In some examples an input parameter of the ServiceOpenness-Request message may be a serviceOpennessRequest identifier that asks for openness that can be provided and an output parameter may be a serviceOpenness that lists possible openness with capability information.

The NSSMF 1202 evaluates the access request 1422 and provides access 1423 to the service catalogue to the 3GPP entity 1301, which may in some examples be, without limitation, the NSMF 1201, another NSSMF 1302 and/or the CSMF, in the form of capability and/or remaining capacity information. In some examples, if the attributeSelector( )is absent, the complete attributes of the network resource(s) are returned. In some examples, the response 1423 is a message 1423*a* similar to queryNetworkResourceResponse with networkResourceData as a parameter. In some examples, the response 1423 may be a Service CapabilityResponse message from the NSSMF 1202 to the 3GPP entity 1301, which may in some examples be, without limitation, the NSMF 1201, another NSSMF 1302 and/or the CSMF. In some examples, the response 1423 may be a ServiceOpennessResponse message from one of the constituent management entities 1205, which may be, without limitation, the NFV MANO 232, a DM/EM 1203 or other management system 1204 to the NSSMF 1202.

The NSSMF 1202 receives 1424 an NSSI provisioning request with NSSI requirements. In some examples, the request 1424 is a message 1424*a* similar to TemplateRequest with nsstData as a parameter. In some examples, the nsst-Data may be one or more NSST(s) selected from the service catalogue. In some examples, the nssstData may be one or more attributes with values.

In the feasibility stage 1430, the NSSMF 1202 validates 1431 the feasibility of the request 1424 using the most recent service catalogue information. In some examples, the validation 1431 is a command 1431*a* similar to InitiateService-RequireResponse.

In some examples, the 3GPP entity 1301 can perform its own feasibility check, in addition to and/or instead of the feasibility validation 1431, since the capability and/or remaining capacity information has been made available to it.

In some examples, the NSSMF 1202 sends queries 1432, 1433, 1434 to its constituent management entities 1205 to reserve resources and to prepare a suitable network environment. In some examples, the constituent management entities 1205 send an acknowledgment back to the NSSMF 1202 when the resources have been reserved. If one or more of the constituent management entities 1205 was unable to reserve the requested resources, the response to the query 1432, 1433, 1434 may indicate what issue(s) were encountered.

In some examples, the NSSMF 1202 updates its service catalogue accordingly.

The NSSMF 1202 replies 1425 to the NSSI provisioning request 1424 with information about the network resources reserved, including without limitation, the NSSI descriptor(s), NSST(s), NSSI attribute values and/or IDs of the shared NSSI(s). In some examples, the reply 1425 is a message 1425*a* similar to queryNetworkResourceResponse with networkResourceData as a parameter. In some examples, such message 1425*a* may send nsstID as a parameter for related templates, ServiceRequireID as a parameter for the admitted service and/or other parameters and/or messages.

In some examples, user plane and/or control plane policies, including without limitation, charging policies may be established. In some examples, the establishment of such policies may include negotiation. In some examples, a specific PCF 100 may establish such policies 1436. Such PCF 100 may receive an acknowledgment 1436 from the NSSMF 1202 or other management function to indicate that the service is ready to be admitted. If so, the PCF 100 may send 1436 a request to retrieve the policies of the 3GPP entity 1301. Such message 1436 may be sent to the NSMF 1201, the PCF 100 of the 3GPP entity 1301 or another related management function. The PCF 100 may evaluate the received messages to see if they are in agreement with existing policies. If the policy of the 3GPP entity 1301 agrees with the policies of the provider and other network policies, an acknowledgment may be sent to the 3GPP entity 1301. Thereafter, the policy-related configuration may be handled by the NSSMF 1202 or the PCF 100 or a specific policy configuration function throughout the network.

At this point, the NSSI is ready for a negotiation stage 1570 (FIG. 15) and/or the preparation stage 1550, discussed in connection with FIG. 15.

Figure 15:
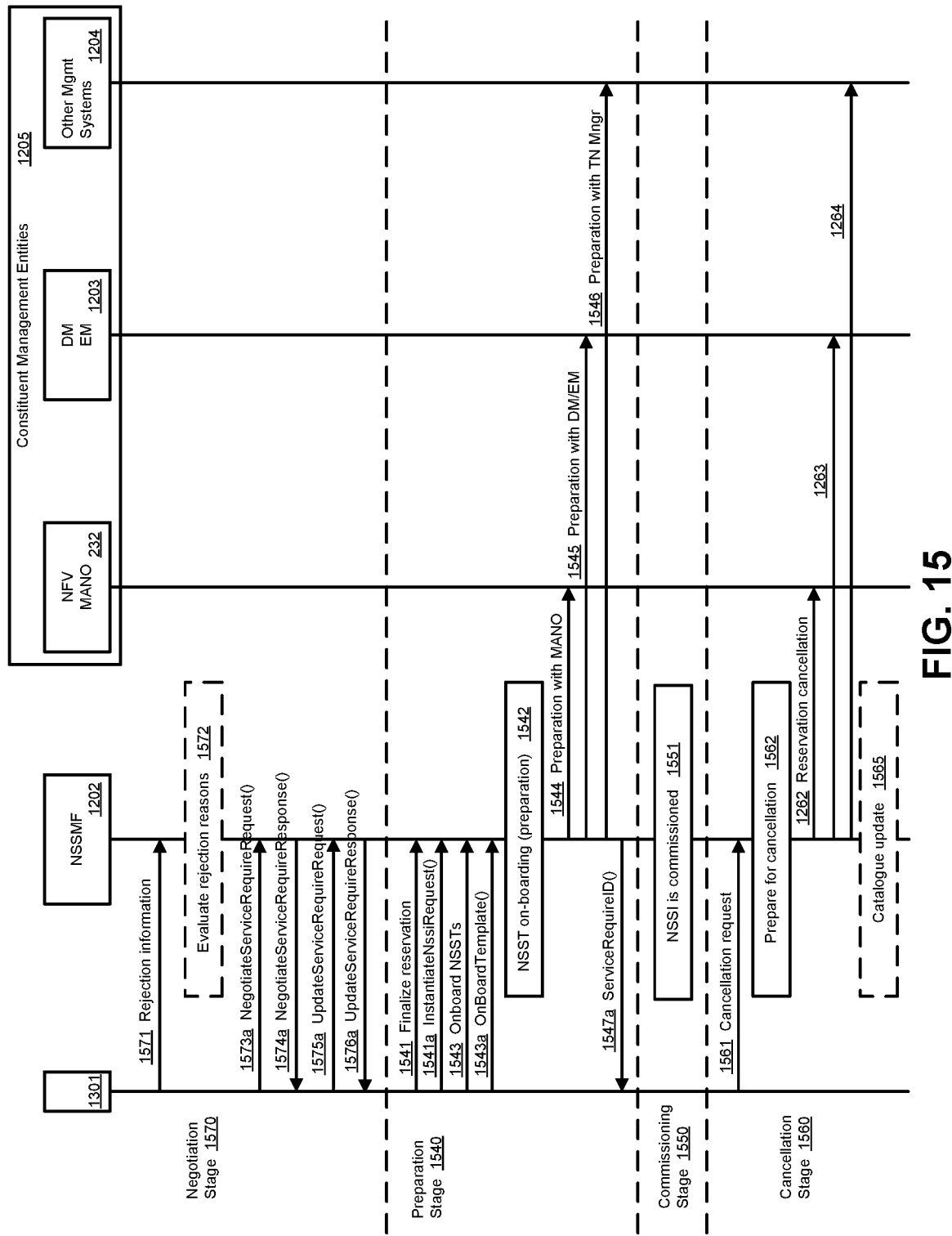
FIG. 15 is a signal flow diagram showing example flows to create an NSSI with catalogue and capability exposure according to an example.

FIG. 15 is a signal flow diagram showing example flows to create an NSSI with catalogue capability exposure shown generally at 1500. FIG. 15 follows on at the end of FIG. 14.

At the outset, the outcome of the establishment of policies 1426 is evaluated. If the 3GPP entity 1301 rejects the creation of the NSSI, a negotiation stage 1570 may be entered. Otherwise, the preparation stage 1540 is entered.

In the negotiation stage 1570, the rejection is signalled by the NSSMF 1202 receiving a message 1571 rejecting the NSSI. In some examples, such message may provide reasons for the rejection. In some examples, the NSSMF 1202 evaluates 1572 the reasons for the rejection and prepares a response.

In some examples, the NSSMF 1202 negotiates provision options, which may comprise, without limitation, redesign, modification options for existing NSSIs, and/or network resource allocation options. In some examples, the negotiations may be precipitated by the receipt by the NSSMF 1202 of a NegotiateServiceRequireRequest( ) message 1573*a*. In response, the NSSMF 1202 may send a NegotiateServiceRequireResponse( ) message 1574*a*.

If the 3GPP entity 1301 approves of the negotiated provisioning option(s), the NSSMF 1202 may receive an UpdateServiceRequireRequest( ) message 1575*a* and prepares an UpdateServiceRequireResponse( ) message 1576*a* in response. Thereafter, the feasibility stage 1430 is entered at 1425.

In the preparation stage 1540, the 3GPP entity 1301 approves and finalizes 1541 all resource reservations. In some examples, the approval 1541 is a message 1541*a* similar to InstantiateNssiRequest with nsstID and instantiateNssiTime as parameters. In some examples, the request 1541 is a different message and may include appropriate parameters. In some examples, the 3GPP entity 1301 only sends an acknowledgment with an ID that may be an NSST ID. In some examples, the approval 1541 may be a ServiceConfirmationRequest message from the 3GPP entity 1301, which may in some examples be, without limitation, the NSMF 1201, another NSSMF 1302 and/or the CSMF to the NSSMF 1202. In some examples, input parameter(s) of the ServiceConfirmationRequest message may include at least one of a serviceConfirmationRequest identifier that asks to confirm the service that has been requested and/or serviceConfirmationParameters that asks to confirm the service that has been requested with appropriate parameters and an output parameter may be a serviceCapability identifier that confirms (ACK) and/or rejects (NACK) an acknowledgment.

The NSSMF 1202 thereafter on-boards 1542 all appropriate NSSTs, with values and/or NSSI descriptors and/or their constituents. The on-boarding 1542 may in some examples be triggered by a signal flow 1543 from the 3GPP entity 1301. In some examples the signal flow 1543 is a message 1543*a* similar to OnBoardTemplate with an nsstID parameter. In some examples, the on-boarding 1542 may include preparations by the constituent management entities 1205 that are triggered by signal flows 1544, 1545, 1546 from the NSSMF 1202.

In some examples, the completion of the on-boarding 1542 may be signalled by the NSSMF 1202 by sending a ServiceRequireID( ) message 1547*a* to the 3GPP entity 1301.

In the commissioning stage 1550, creation and/or commissioning of the new NSSI and/or modification of existing NSSI(s) is completed 1551, whereupon the NSSI is ready for activation.

The cancellation stage 1560 may be initiated by a request 1561 from the 3GPP entity 1301 to the NSSMF 1202 to cancel the commissioned NSSI. In response to such a request, the NSSMF 1202 prepares to cancel 1562 the created NSSI and in the course of so doing, may issue requests 1262, 1263, 1264 to its constituent management entities 1205 to cancel reserved resources.

In some examples, the NSSMF 1202 updates 1565 its service catalogue accordingly to indicate freed up resources.

Figure 16:
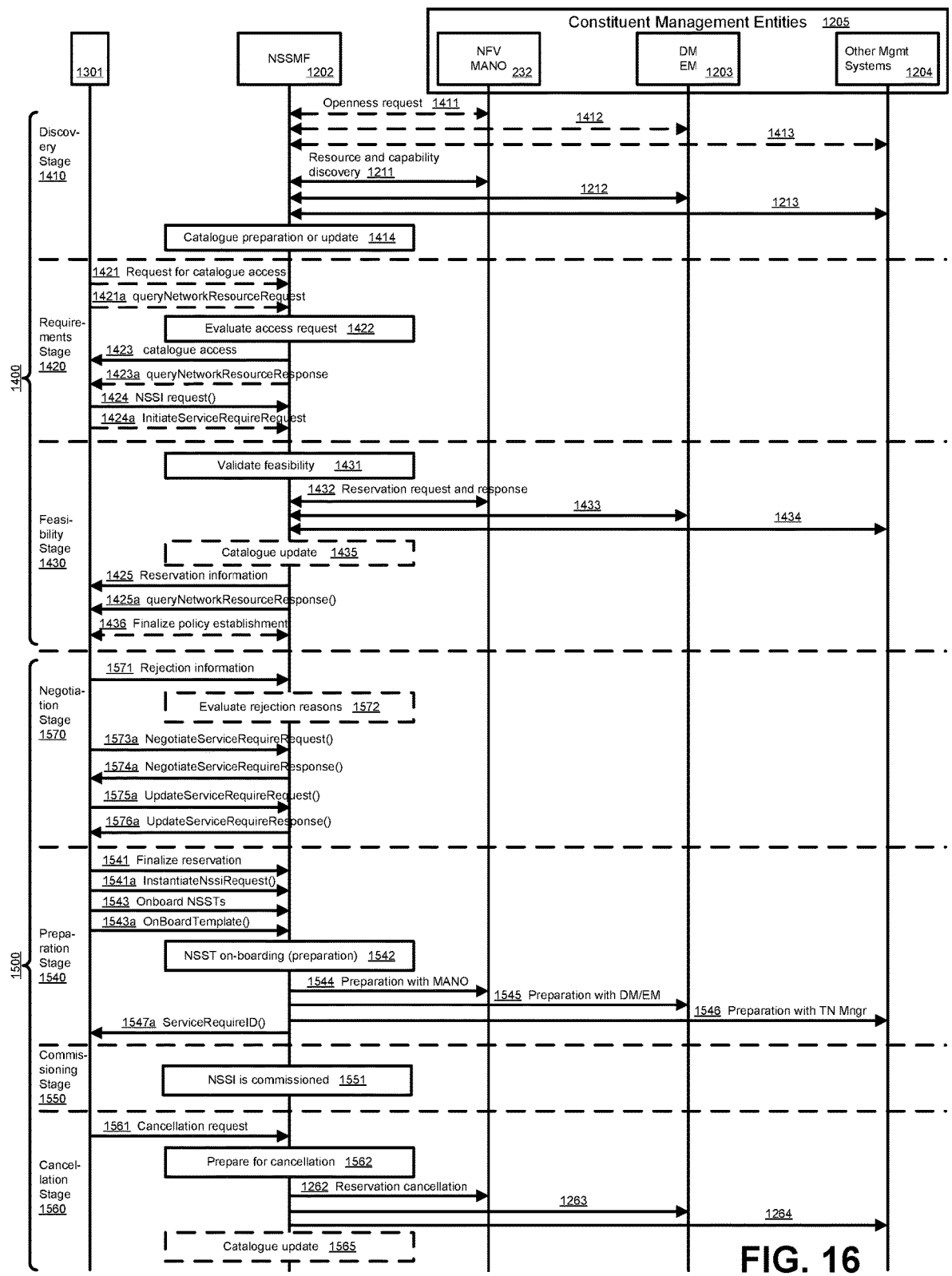
FIG. 16 is a signal flow diagram showing example flows to provision an NSSI with catalogue and capability exposure according to an example.

FIG. 16 is a signal flow diagram showing example flows to provision an NSSI with catalogue and capability exposure shown generally at 1600. Given that it is understood, with reference to FIG. 11, that provisioning comprises the preparation phase 1110 and the commissioning phase 1130, which incorporates creation 1131 (and/or modification as discussed in connection with FIG. 17), it follows that FIG. 16 may in some examples consist of the concatenation of FIG. 14 followed by FIG. 15 as shown (or of FIG. 14 followed by FIG. 15 with corresponding portions thereof replaced by those of FIG. 17 (not shown). Reference should thus be made to FIGS. 14, 15 and/or 17.

Figure 17:
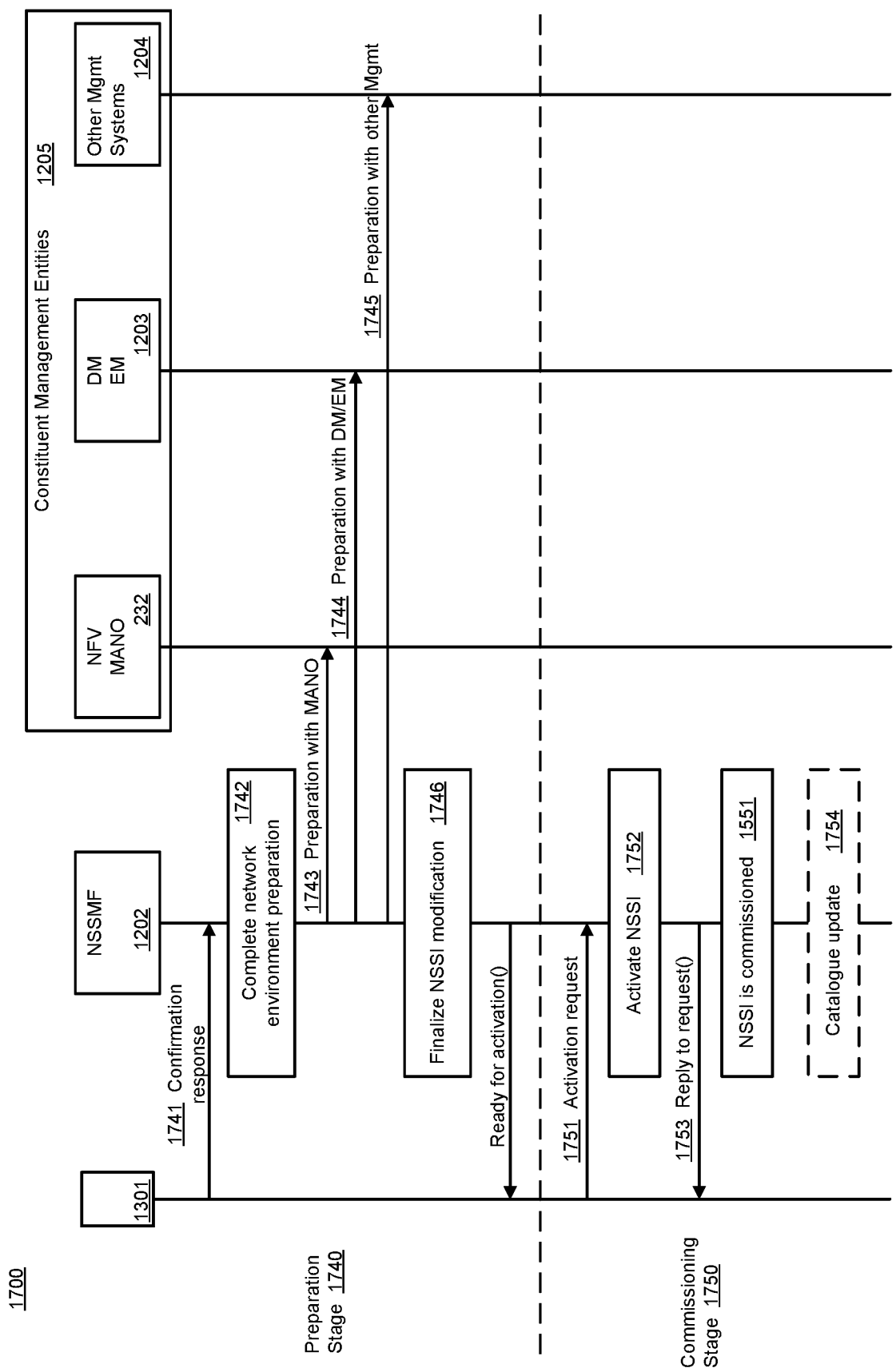
FIG. 17 is a signal flow diagram showing example flows to commission an NSSI by modifying an existing NSSI according to an example.

FIG. 17 is a signal flow diagram showing example flows to commission an NSSI by modifying an existing NSSI. The figure shows communication between the 3GPP entity 1301, the NSSMF 1202, NFV MANO 232, the DM/EM 1203 and other management systems 1204.

The procedure shown generally at 1700 on FIG. 17 should be understood to comprise an alternative example of the preparation stage and commissioning stage that could be substituted for the preparation stage 1540 and commissioning stage 1550 (corresponding to creation of a new NSSI) in FIGS. 15 and 16. It should thus be understood that the procedure 1700 would be preceded by the discovery stage 1410, the requirements stage 1420 and the feasibility stage 1430, and that in addition, there may be either or both of the cancellation stage 1560 and the negotiation stage 1570.

The procedure 1700 presupposes that the NSSI to be modified is already in existence. Such NSSI may or may not be shared. A shared NSSI refers to an NSSI for which there are other services deployed thereon. It is conceivable that a shared NSSI may be commissioned but not activated (see FIG. 18) in that a previous service has completed but has not been terminated (see FIG. 20).

At the outset, the outcome of the establishment of policies 1426 is evaluated. The procedure 1700 further presupposes that the 3GPP entity 1301 approves and finalizes 1741 all resource reservations in a confirmation response.

The NSSMF 1202 completes 1742 the preparation of the network environment by finalizing the reservations, updating policy, on-boarding any additional functions and/or any other configurations. In some examples, this may include preparations by the constituent management entities 1205 that are triggered by signal flows 1743, 1744, 1745 from the NSSMF 1202.

Thereafter, the NSSMF 1202 finalizes 1746 the modification of the NSSI.

The NSSMF 1202 sends a message 1747 to the 3GPP entity 1301 indicating that the NSSI is ready to be activated, if not already activated. In some examples, the NSSMF 1202 provides information, including without limitation, the NSSI ID, and tools, including without limitation, interfaces, for monitoring, reporting fault, performance and/or security management of the service being deployed on the NSSI. In some examples, the run-time (operational) monitoring and/or management capabilities provided to the 3GPP entity 1301 may depend upon agreement(s) in place between the 3GPP entity 1301 and the network provider.

In the commissioning stage 1750, the NSSMF 1202 receives 1751 an activation request from the 3GPP entity 1301. In response thereto, the NSSMF 1202 activates 1752 the NSSI (if not already active). In some examples, such activation may comprise tests to validate the NSSI. In some examples, such activation may comprise activation of the constituents of the NSSI, including without limitation, VNFs, NFs and/or NSSIs.

Once activated, the NSSMF 1202 sends a reply 1753 to the activation request 1751 that contains the commissioning information. The activation of the NSSI renders the NSSI operational.

In some examples, the NSSMF 1202 updates 1754 its service catalogue with the changes in the network environment and resources.

Figure 18:
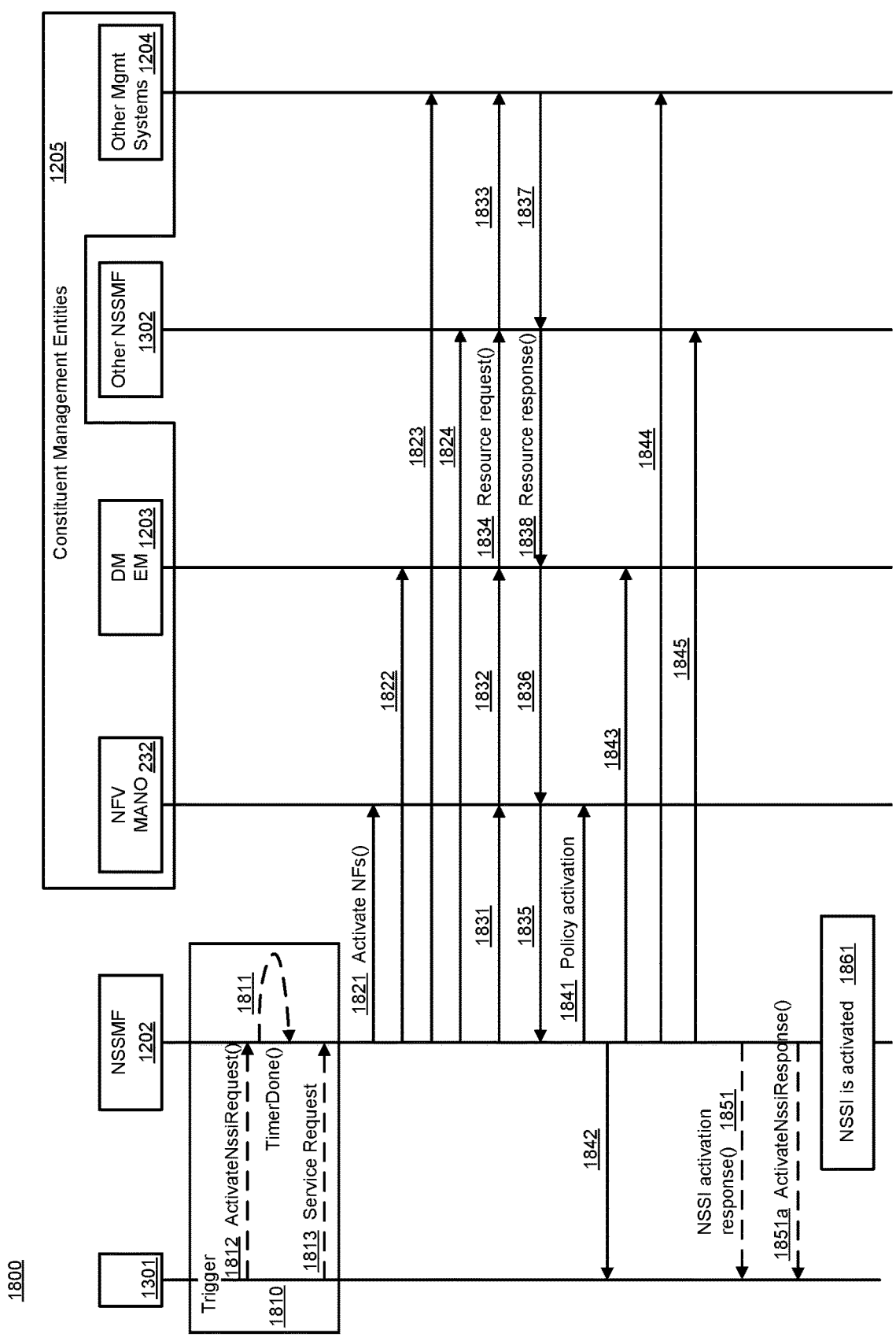
FIG. 18 is a signal flow diagram showing example flows to activate an NSSI according to an example.

FIG. 18 is a signal flow diagram showing example signal flows to activate an NSSI that has been provisioned in a procedure shown generally at 1800. The figure shows communications between a 3GPP entity 1301, the NSSMF 1202, NFV MANO 232, the DM/EM 1203, other NSSMF(s) 1302 and other management systems 1204.

With reference to FIG. 11, the procedure 1800 corresponds to activation 1141 during the operation phase 1140.

Activation 1141 is initiated by a trigger 1810 that is generated or received. Such triggers 1810 may include, without limitation, an internal and/or external timer alarm 1811 indicating that the NSSI is to be activated, which may in some examples, be an activateNssiTime( ) function and/or a TimerDone( ) function; a request 1812 from the 3GPP entity 1301 to activate the NSSI, which may in some examples, be an Activate NssiRequest( ) with an nssiID as a parameter; and/or a service 1813 being deployed on an existing NSSI such as is disclosed in FIG. 17. In some examples, if a new service is being deployed and the service catalogue information of the network provider is not provided to the 3GPP entity 1301, the NSSI will not receive the nssiID parameter. In some examples, if exposure is provided, the NSSMF 1202 can receive the nssiID parameter.

The NSSMF 1202 identifies any inactive NSSI constituents and sends messages 1821, 1822, 1823 to its constituent management entities 1205 to activate the inactive NFs. In some examples, if the NSSI constituents are managed by another NSSMF 1302, the NSSMF 1202 may send a request 1824 to such other NSSMF 1302 to activate those resources.

Additionally, the NSSMF 1202 sends a request 1831, 1832, 1833, 1834 to the constituent management entities 1205 and to the other NSSMF 1302 to obtain and/or configure resources that are used to activate the NSSI and receives a response 1835, 1836, 1837, 1838 therefrom.

Further, the NSSMF 1202 activates 1841, 1842, 1843, 1844, 1845 related inactive policies at the 3GPP entity 1301, other NSSMF(s) 1302 and constituent management entities 1205.

If an activation request 1812 was received, the NSSMF 1202 sends 1851 a response. In some examples, the response 1851 may be a response 1851*a* similar to an ActivateNssiResponse( ) with an NssLifecycleOperatIonOccurrenceId as a parameter that helps with traceability of the operation. Thereupon the NSSI is activated 1861.

Figure 19:
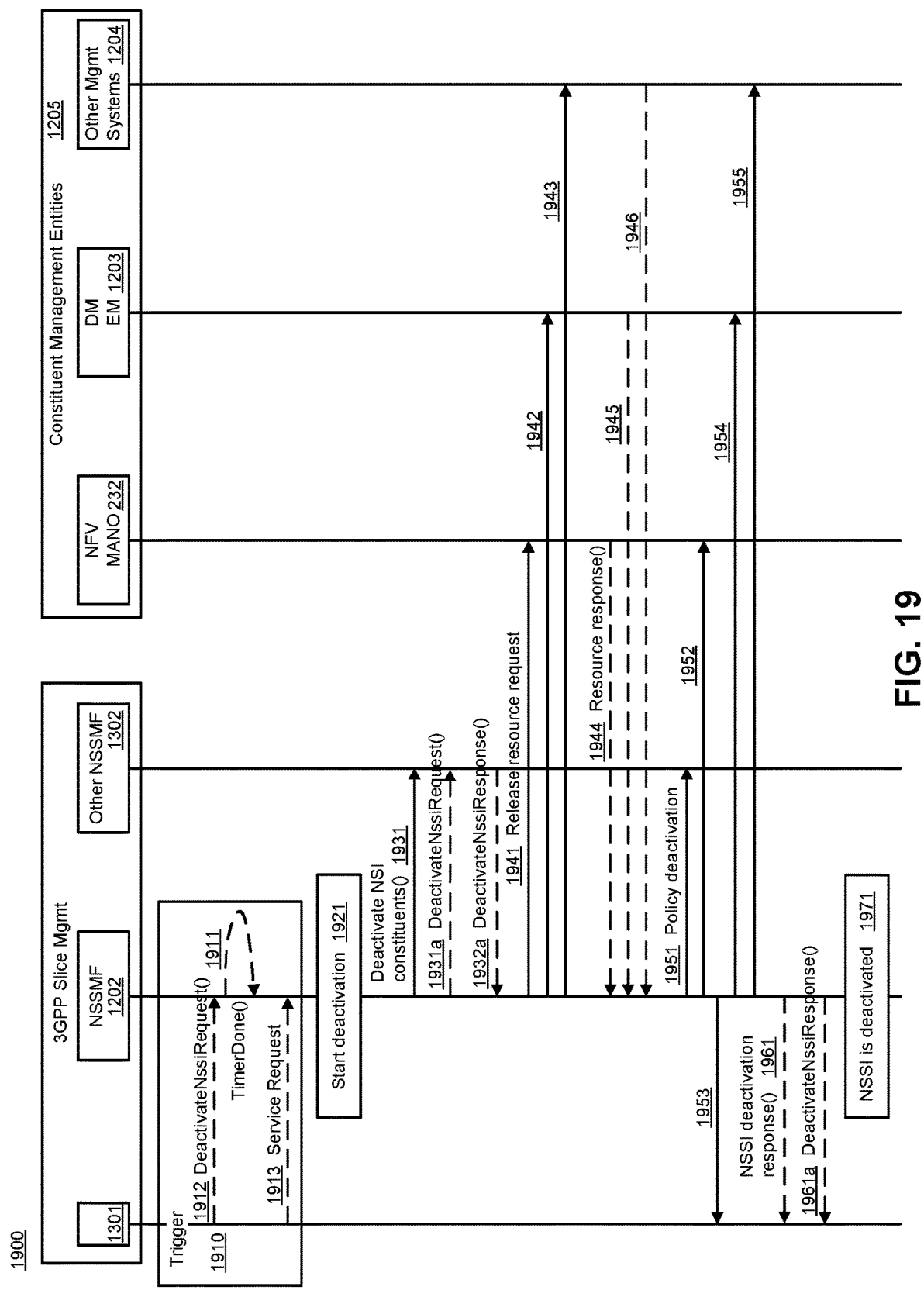
FIG. 19 is a signal flow diagram showing example flows to deactivate an NSSI according to an example.

FIG. 19 is a signal flow showing example signal flows to de-activate an NSSI that has been activated in a procedure shown generally at 1900. The figure shows communications between a 3GPP entity 1301, the NSSMF 1202, other NSSMF(s) 1302, NFV MANO 232, the DM/EM 1203 and other management systems 1204.

With reference to FIG. 11, the procedure 1900 corresponds to de-activation 1145 during the operation phase 1140.

De-activation 1145 is initiated by a trigger 1910 that is generated or received. Such triggers 1910 may include, without limitation, an internal and/or external timer alarm 1911 indicating that the NSSI is to be de-activated, which may in some examples may be an deactivateNssiTime( ) function and/or a TimerDone( ) function; a request 1912 from the 3GPP entity 1301 to de-activate the NSSI, which may in some examples, be a DeactivateNssiRequest( ) with an nssiID as a parameter, and/or a service 1913 being removed from the NSSI. In some examples, if the NSSI is being shared, the other service(s) on the NSSI will be deployed to other NSSI(s) without interruption. In some examples, if exposure is provided, the NSSMF 1202 can receive the nssiID parameter.

The NSSMF 1202 starts de-activation 1921 by identifying whether traffic should be re-routed, by way of non-limiting example, if there are other services using the slice, without disrupting ongoing services. This may trigger NSSI modification in accordance with FIG. 17 to direct existing service(s) to existing slices and/or NSSI creation in accordance with FIG. 15 to deploy existing service(s) on new NSSI(s).

The NSSMF 1202 identifies active NSSI(s) associated with the NSSI being de-activate and sends requests 1931 to other NSSMF(s) 1302 to deactivate the identified NSSI(s). In some examples, the request 1931 may be a response 1931*a* similar to a DeactivateNssiRequest( ) message with NssiLifecycleOperationOccurrenceId and/or nssiID parameters. In response, the NSSMF 1202 may receive a DeactivateNssiResponse( ) message 1932*a* with a NssiLifecycleOperationOccurrenceId parameter.

In some examples, the NSSMF 1202 may send notifications 1941, 1942, 1943 to its constituent management entities 1205 to prepare the network for de-activation of the NSSI. By way of non-limiting example, the other management system 1204 may be requested 1943 to have the TN manager release resources previously allocated to the NSSI. In some examples, the notifications 1941, 1942, 1943 may be accompanied by information. In some examples the notifications 1941, 1942, 1943 results in responses or acknowledgments 1944, 1945, 1946 from the constituent management entities 1205.

Further, the NSSMF 1202 de-activates 1951, 1952, 1953, 1954, 1955 related policies at the 3GPP entity 1301, other NSSMF(s) 1302 and constituent management entities 1205.

If a de-activation request 1912 was received, the NSSMF 1202 sends 1961 a response. In some examples, the response 1961 may be a respons 1961*a* similar to an DeactivateNssiResponse( ) message with an NssiLifecycleOperationOccurrenceId parameter that helps with traceability of the operation. Thereupon the NSSI is de-activated 1971.

Figure 20:
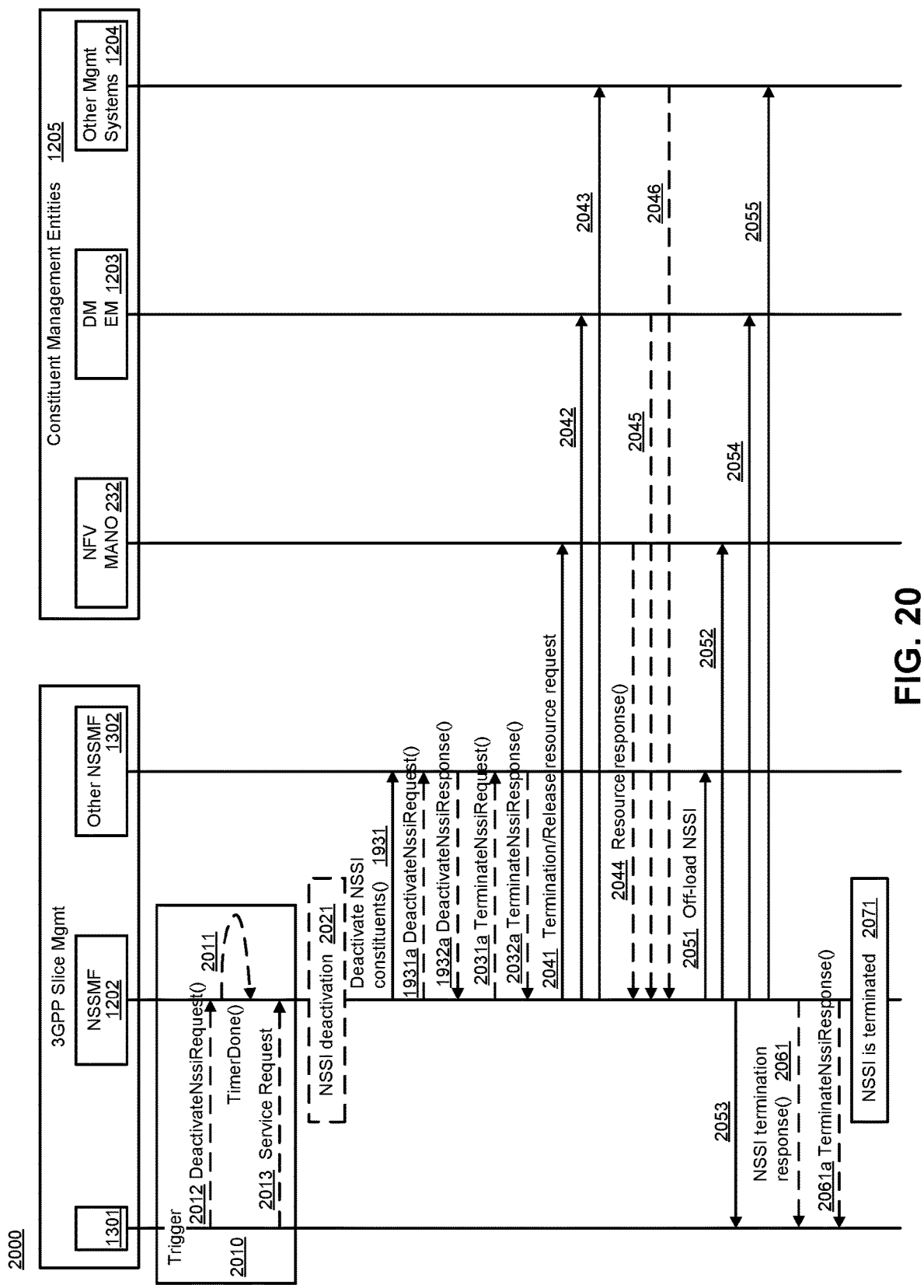
FIG. 20 is a signal flow diagram showing example flows to terminate an NSSI according to an example.

FIG. 20 is a signal flow diagram showing example signal flows to terminate an NSSI in a procedure shown generally at 2000. The figure shows communications between the 3GPP entity 1301, the NSSMF 1202, other NSSMF(s) 1302, NFV MANO 232, the DM/EM 1203 and other management systems 1204.

With reference to FIG. 11, the procedure 2000 corresponds to termination 1151 in the decommissioning phase 1150.

Termination 1151 is initiated by a trigger 2010 that is generated or received. Such triggers 2010 may include, without limitation, an internal timer alarm and/or policy 2011 indicating that the NSSI is to be terminated, which may in some examples be a TimerDone( ) function; a request 2012 from the 3GPP entity 1301, the NSMF 1201 and/or another NSMF (not shown) to terminate the NSSI, by way of non-limiting example, because it is no longer needed to support the particular service, which may in some examples, be a TerminateNssiRequest( ) with an nssiID as a parameter, and/or termination 2013 due to a malfunction that it is not feasible to repair. In some examples, if the trigger 2910 is a request 2912, the NSSMF 1202 may decide, rather than terminate the NSSI, simply to modify it in accordance with FIG. 17.

The NSSMF 1202 starts termination 2021 by identifying whether the NSSI and/or any related NSSI and/or NSI is active. If so, they are de-activated in accordance with FIG. 19 and/or FIG. 29. The NSSMF 1202 identifies active NSSI(s) associated with the NSSI being terminated and sends requests 1931 to other NSSMF(s) 1302 to de-activate the identified NSSI(s). In some examples, the request 1931 may be a request 1931a similar to a DeactivateNssiRequest( ) message with NssiLifecycleOperationOccurrenceId and/or nssiID parameters. In response, the NSSMF 1202 may receive a DeactivateNssiResponse( ) message 1932a with a NssiLifecycleOperationOccurrenceId parameter.

The NSSMF 1202 thereafter sends requests to other NSSMF(s) 1302 to terminate the identified NSSI(s). In some examples, the request may be a TerminateNssiRequest( ) message 2031a with NssiID parameter. In response, the NSSMF 1202 may receive 2032a a Terminate NssiResponse( ) message. It will be appreciated, that the level of openness may dictate whether the NSSMF 1202 may request de-activation and/or termination directly. In some examples, the NSSMF 1202 may send a Offloadservice( ) message with a serviceID parameter (not shown).

In some examples, the NSSMF 1202 may send notifications 2041, 2042, 2043 to its constituent management entities 1205 to release any resource allocations. In some examples, such notifications 2041, 2042, 2043 may occur within the context of FIG. 19. In some examples, a TN within the NSSI is to be terminated. The NSSMF 1201 sends the TN-related request to the other management system 1204 to indicate to the TN manager that the TN part is not necessary to support the NSSI being terminated.

In some examples, the NSSMF 1202 disassociates the NSI from the NSSI and may trigger a corresponding NSI-related request to the NFVO with an Os-Ma-nfvo interface and may trigger de-activation of the policies concerning the NSSI.

In some examples, the notifications 2041, 2042, 2043 results in responses or acknowledgments 2044, 2045, 2046 from the constituent management entities 1205.

Further, the on-boarded NSST may be off-loaded. In some examples, if there are NSST(s) on-boarded, the NSSMF 1202 sends 2051, 2052, 2053, 2054, 2055 offloading requests to the 3GPP entity 1301, other NSSMF(s) 1302 and constituent management entities 1205.

If a termination request 2012 was received, the NSSMF 1202 sends 2061 a response. In some examples, the response 2061 may be a respons 1961a similar to an TerminateNssiResponse( ) message with an NssiLifecycleOperationOccurrenceId parameter that helps with traceability of the operation. Thereupon the NSSI is terminated 2071.

The procedures described below is mostly compatible for NSI provision by creation of a new NSI, however, they can be applicable in cases where an existing NSI is used.

In this case, the NSMF 1201 may establish openness with other network management entities, such as subscribing to updates on remaining capacity and/or obtaining interfaces for access to information. The NSMF 1021 may receive the NSI or related request(s) from the CSMF or another NSMF 1201. The parameters here are given with respect to the CSMF.

FIG. 21 is a signal flow diagram showing example signal flows to provision an NSI in a generic procedure shown generally at 2100. The figure shows communications between a 3GPP entity 2101, which may be a customer (not shown), one or more NSMF(s) 1201, the NSSMF 1202 and other management systems 2103, which may comprise 3GPP and/or non-3GPP management entities, including without limitation, the TN and/or Wi-Fi systems. Those skilled in the relevant art will appreciate that the NSMF(s) 1201 and the other management systems 2103 are management entities that are constituents (collectively 2105) of the NSMF 1201 and with which the NSMF 1201 may communicate.

It is assumed that network slice template(s) (NSTs) and/or NSSTs of constituent NSSI(s) are already on-boarded.

The generic procedure 2100 comprises the NSMF 1201 proceeding through stages, which may comprise discovery 2110, requirements 2120, feasibility 2130, preparation 2140 and creation 2150. In some examples, the 3GPP entity 2101 requests that the created NSI be cancelled, whereupon a cancellation stage 2160 is entered.

In the discovery stage 2110, the NSMF 1201 obtains information 2111, 2112 from its constituent management entities 2105 in a manner similar to how the NSSMF 1202 obtains information 1211, 1212, 1213 from its constituent management entities 1205 in FIG. 12.

In the requirements stage 2120, the 3GPP entity 2101 conveys 2121 a request with network slice-related requirements to the NSMF 1201. Eventually, the NSMF 1201 conveys 2125 a response to the request 2121 to the 3GPP entity 2101, as discussed below.

The NSMF 1201 derives 2122 NSI, NSSI and/or non-3GPP requirements for the NSI. These requirements may include one or more NST(s), one or more NSST(s), network slice characteristics, network slice subnet characteristics, network topology, specific resource requirements, latency, bandwidth, NF-related requirements, such as, without limitation, placement, NF-related capabilities and/or network KPIs, such as, without limitation, network outage and/or specific ink requirements. Such requirements may be derived by the NSMF 1201 as a result of its resource discovery process and/or a check of the service catalogue. In some examples, the resource discovery process does not provide sufficient information and one or more targeted capability quer(ies) may be made 2123, 2124 by the NSMF 1201 to its constituent management entities 2105.

In some examples, the requirements may be prepared by another actor, including without limitation, a customer, a third party, or another 3GPP management entity, such as a CSMF, and provided (not shown) to the NSMF 1201.

In view of the foregoing, the detail of the requirements and who determines them is dependent upon the openness between management entities. As a result, the derivation of requirements 2122 is shown as being optional.

In the feasibility stage 2130, the NSMF 1201 performs a feasibility check to obtain an initial indication as to whether the request is viable. In so doing, the NSMF 1201 may evaluate 2131 the possibility of re-using, whether or not with modification, an existing NSI.

If an existing NSI can be used for the request 2121, and using the existing NSI does not violate its policies and services, the NSMF 1201 sends a response 2125 with the existing NSI.

If this is not considered likely, the NSMF 1201 evaluates the possibility of creating a new NSI to support the request. Such evaluation may consider existing NSIs and/or NSTs and the remaining capacity of the network and derives network subnet slice-related and TN-related requirements.

Upon such evaluation, the NSMF 1201 sends 2132 network slice subnet-related requirements to the NSSMF 1202. Additionally, such evaluation may determine that more information is called for and it may query 2132 the NSSMF 1202 for additional capability information. Such queries may be based on the requirements obtained from the 3GPP entity 2101, or may comprise a general request for capability information for further discovery of resources. The nature of the query and the response obtained may in some examples depend upon the level of openness of the NSSMF 1202.

The requirements request and/or query 2132 may trigger 2134 the preparation and creation of an NSSI such as is described in FIG. 12. The requirements request and/or query 2132 may be followed by a response 2135 from the NSSMF 1202 to the NSMF 1201.

Further, the NSMF 1201 sends 2133 TN-related requirements, including without limitation, external connection point, latency and/or bandwidth to the other management systems 2103 including, without limitation, the TN manager. Additionally, such evaluation may determine that more information is called for and it may query 2133 the other management systems 2103 for additional capability information. Such queries may be based on the requirements obtained from the 3GPP entity 2101, or may comprise a general request for capability information for further discovery of resources. The nature of the query and the response obtained may in some examples depend upon the level of openness of the other management systems 2103.

The requirements request and/or query 2133 may be followed by a response 2136 from the other management systems 2103 to the NSMF 1201.

The NSMF 1201 thereupon makes a formal determination 2137 of feasibility. If the request 2121 is feasible, the NSMF 1201 proceeds to the stage of preparing the network environment 2140, accesses the request 2121 from the 3GPP entity 1201 and prepares a reply 2125 thereto. In some examples, certain information exposure is permitted between the NSMF 1201 and the 3GPP entity 2101 and the reply 2125 may disclose information about the constituent management entities 2105 of the NSMF 1201, including, without limitation, their remaining capacity, NST(s) and/or NST attributes.

If the request 2121 is not feasible, the NSMF 1201 rejects the request 2121 from the 3GPP entity 2101 and prepares a reply 2125 thereto. In some examples, certain information exposure is permitted between the NSMF 1202 and the 3GPP entity 2101 and the reply 2125 may disclose information about the constituent management entities 2105 of the NSMF 1201, including, without limitation, their remaining network capability. Such information may permit the 3GPP entity 2101 to update and re-send its request 2121. If not successful, the cancellation stage 2160 is entered.

In some examples, the 3GPP entity 1301 and NSMF 1201 may negotiate for other feasible provisioning options.

In the preparation stage 2140, the NSMF 1201 makes preparations that may include, without limitation, reserving resources by sending 2141, 2142 reservation requests to the constituent management entities 2105 for establishing connectivity of NSSIs (in the case of the NSSMF 1202) or of TNs (in the case of the other management systems 2103).

In the creation stage 2150, the 3GPP entity 2101 sends 2151 the NSMF 1201 an acknowledgment of the reply 2125. The NSMF 1201 requests 2152, 2153 to its constituent management entities 2105 to make preparations to configure its NSSI(s) and/or TN(s) and otherwise completes network environment preparations 2154. The NSMF 1201 on-boards 2155 a suitable selected NSI descriptor as identified in actions 2131 and/or 2137. When the NSI descriptor has been on-boarded, the NSMF 1201 creates (and/or modifies) the NSSI process to create 2156 the NSI.

In some examples, the cancellation stage 2160 is entered if the feasibility stage 2130 fails. In some examples, the cancellation stage 2160 is initiated by a request 2161 from the 3GPP entity 2101 to the NSMF 1201 to cancel the created NSI. In response to such request, the NSMF 1201 cancels the created NSI (not shown) and in the course of so doing, may issue requests 2162, 2163 to its constituent management entities 2105 to cancel reserved resources.

Figure 22:
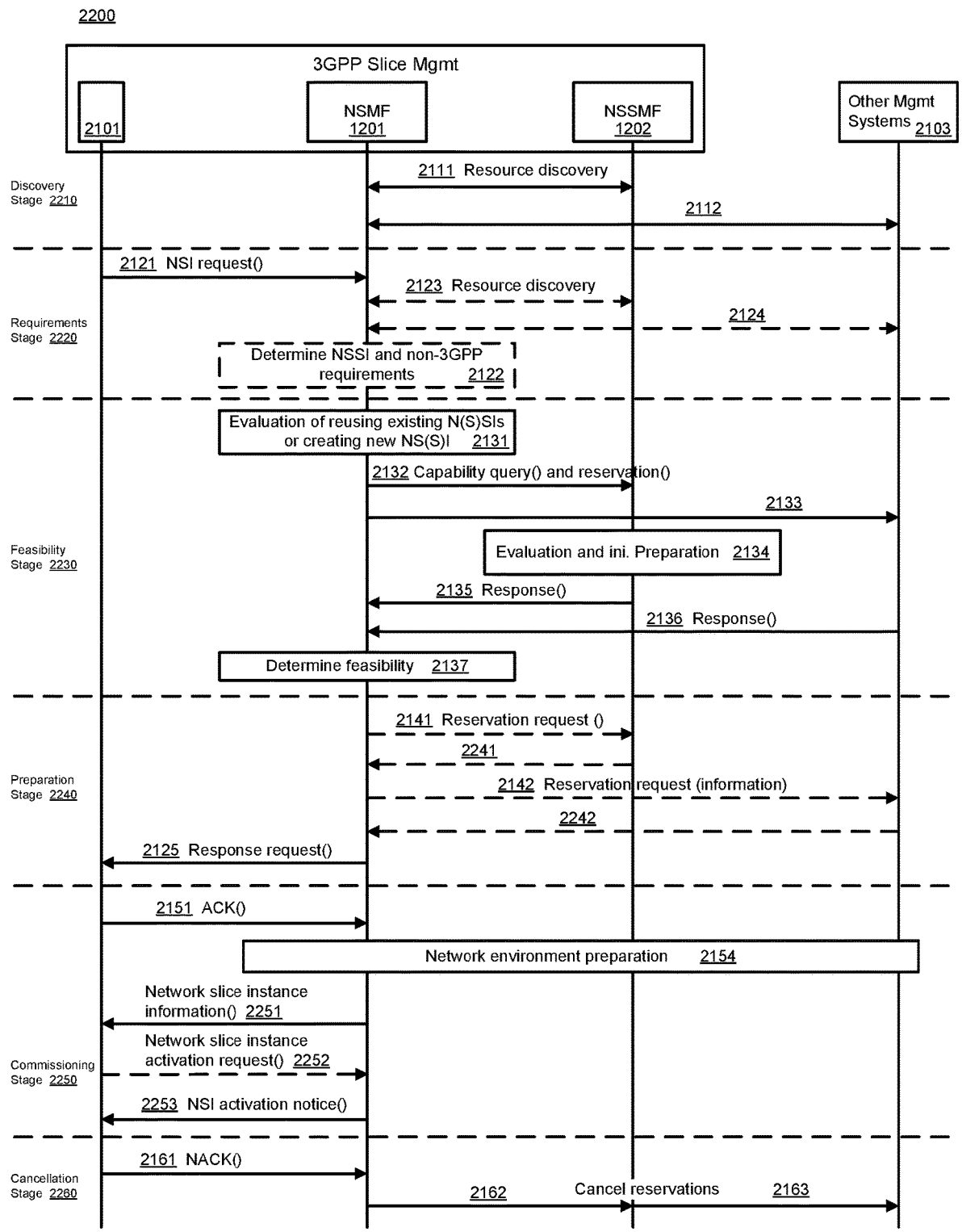
FIG. 22 is a signal flow diagram showing example flows to provision an NSI according to an example.

FIG. 22 is a signal flow diagram showing example signal flows to provision an NSSI in a procedure shown generally at 2200. The figure shows communications between the 3GPP entity 2101, NSMF 1201, NSSMF 1202 and other management systems 2103.

While similar to FIG. 21, FIG. 22 may be seen to be an alternative example showing, without limitation, NSI information message(s), activation request and/or constituents of the 3GPP slice management entities. Nevertheless, the NSMF 1201 again proceeds through stages, which may comprise discovery 2210, requirements 2220, feasibility 2230, preparation 2240 and creation of the NSI 2250. In some examples, the 3GPP entity 2101 requests that the created NSI be cancelled, whereupon a cancellation stage 2260 is entered.

In the discovery stage 2210, the NSMF 1201 obtains information 2111, 2112 from the NSSMF 1202 and the other management systems 2103 in a manner similar to that of the discovery stage 1210 of FIG. 21. In so doing, a catalogue may be prepared and/or existing catalogue(s) may be updated. Further, general policies and/or guidelines may be obtained that determine the services that can be offered by the network.

In the requirements stage 2220, the 3GPP entity 2101 conveys 2121 a request with specific slice requirements to the NSMF 1201 in a manner similar to that of request 2121 of FIG. 21. Eventually, the NSMF 1201 conveys 2125 a response to the request 2121 to the 3GPP entity 2101, as discussed below.

In some examples, the NSMF 1201 may derive 2122 NSI, NSSI and/or non-3GPP requirements for the NSI in a manner similar to the derivation 2122 of FIG. 22.

In some examples, the resource discovery process does not provide sufficient information and one or more targeted capability quer(ies) may be made 2123, 2124 by the NSMF 1201 to the NSSMF 1202 and the other management systems 2103 in a manner similar to that of the queries 2123, 2124 of FIG. 21.

In the feasibility stage 2230, the NSSMF 1202 evaluates 2131 the possibility of re-using or creating a new NSSI. Such evaluation may consider existing NSSIs and/or NSSTs and the remaining capacity of the network subnet.

In the course of such evaluation, the NSMF 1201 may determine that more information is called for and it may query 2132, 2133 the NSSMF 1202 and the other management systems 2103 for additional capability information in a manner similar to that of FIG. 21.

The requirements request and/or query 2132 may trigger 2134 the preparation and creation of an NSSI such as is described in FIG. 12 in a manner similar to that of FIG. 21. The requirements request and/or query 2132 may be followed by a response 2135 from the NSSMF 1202 to the NSMF 1201.

The requirements request and/or query 2133 may be followed by a response 2136 from the other management systems 2103 to the NSMF 1201 in a manner similar to that of FIG. 21.

The NSSMF 1202 thereupon makes a formal determination 2137 of feasibility in a manner similar to that of FIG. 21. If the request 2121 is feasible, the NSMF 1201 proceeds to the preparation stage 1340, accesses the request 2121 from the 3GPP entity 2101 and prepares a reply 2125 thereto in a manner similar to reply 2125 in FIG. 21.

If the request 2125 is not feasible, the NSMF 1201 rejects the request 2121 from the 3GPP entity 2101 and prepares a reply 2125 thereto in a manner similar to reply 2125 in FIG. 21.

In the preparation stage 2240, the NSMF 1201 reserves resources by sending 2141, 1242 reservation requests to the NSSMF 1202 and the other management systems 2103 in a manner similar to that of FIG. 21. Here, responses 2141, 2142 are shown from the NSSMF 1202 and the other management systems 2103. Such responses may be inferred in FIG. 21.

In response to the reply 2125, the 3GPP entity 2101 sends 2151 an acknowledgment of the reply 2125 in a manner similar to that of FIG. 21.

Accordingly, the NSSMF 1202 makes preparations 2154 that may include, without limitation, reserving resources of the constituent management entities 1205 and/or the NSSMF 1202 in a manner similar to that of FIG. 21.

In the commissioning stage 2250, the NSMF 1201 creates (and/or modifies) (not shown but similar to 2156 in FIG. 21) the NSI process. The NSMF 1201 sends 2251 information about the created (and/or modified) NSI to the 3GPP entity 2103.

In some examples, the 3GPP entity 2103 may send 2252 a request to the NSMF 1201 to activate the NSI. In some examples, the NSI is automatically activated. However caused, once the NSI has been activated, the NSMF 1201 sends 2253 a network slice activation notice to the 3GPP entity 2101, signifying completion of provisioning.

Certain of the flows shown in the creation stage 2150 of FIG. 21 but not shown in FIG. 22 and vice versa may be inferred.

The cancellation stage 2260 is initiated by a request 2161 from the 3GPP entity 2101 to the NSMF 1201 to cancel the created NSI. In response to such request, the NSMF 1201 cancels the created NSI (not shown) and in the course of so doing, may issue requests 2162, 2163 to the NSSMF 1202 and the other management systems 2103 to cancel reserved resources.

Figure 23:
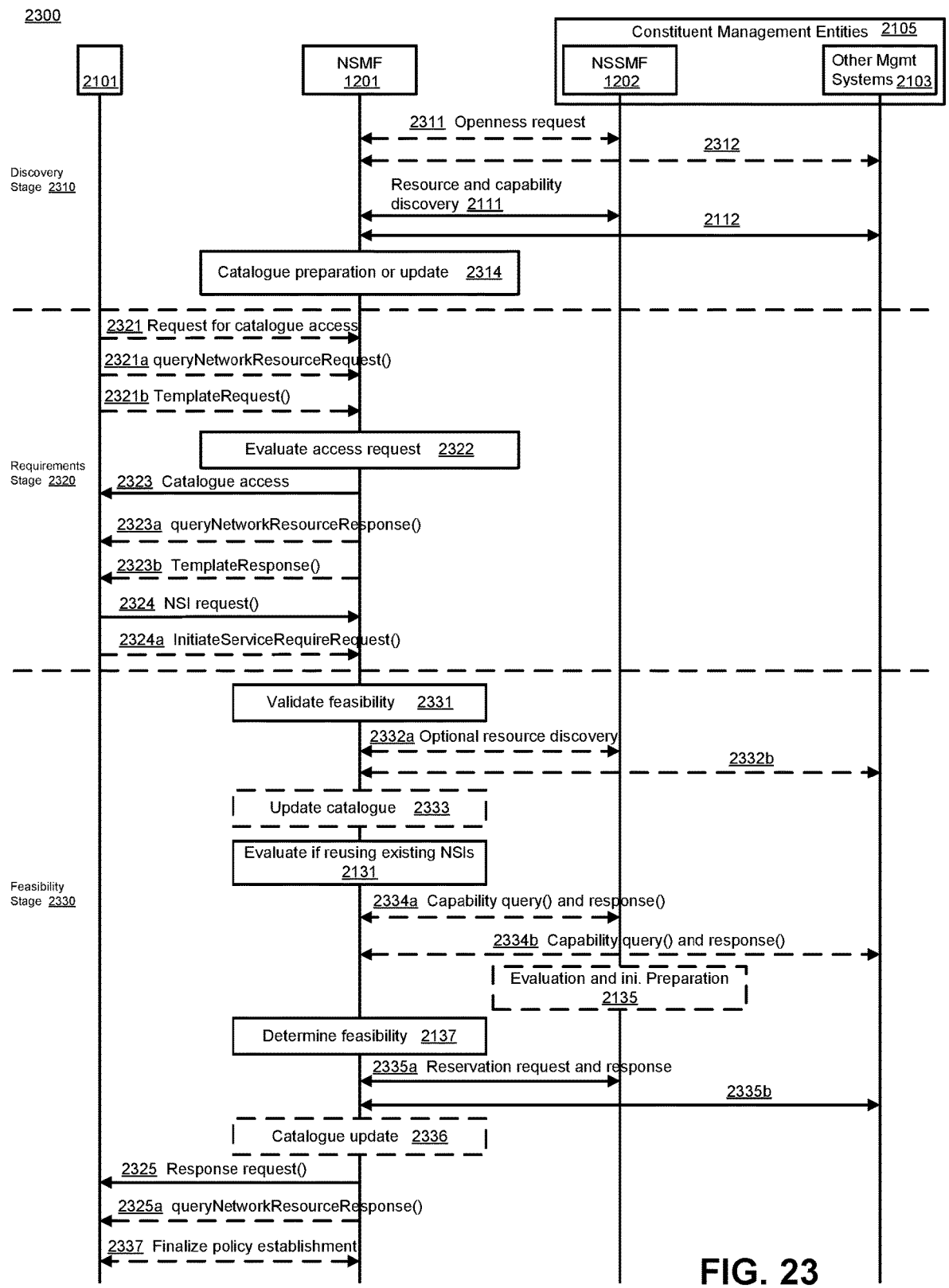
FIG. 23 is a signal flow diagram showing example flows to prepare an NSI with catalogue and capability exposure according to an example.

FIG. 23 is a signal flow diagram showing example flows to prepare an NSI with catalogue and capability exposure shown generally at 2300. The figure shows communications between the 3GPP entity 2101, the NSMF 1201, the NSSMF 1202 and other manage systems 2013.

As with the scenario of FIG. 14, in the scenario of FIG. 23, the service catalogue and capabilities is exposed to the 3GPP entity 2101. This allows the NSMF 1201 to establish openness with its constituent management entities 2105, such as, by way of non-limiting example, to subscribe to updates on remaining capacity and/or obtaining interfaces for access to information. Such exposure also allows the 3GPP entity 2101 to, without limitation, check for the feasibility of the requests and/or design NSIs, which may facilitate the provisioning in that the amount of negotiations may be reduced. The scenario of FIG. 23 is well suited to Type2 slice deliverable types as described above, but may be applicable to any slice deliverable types.

In the discovery stage 2310, the NSMF 1201 requests 2311, 2312 openness from its constituent management entities 2105, to facilitate resource and capability discovery. The NSMF 1201 only requests openness 2311 from the NSSMF(s) 1202. If appropriate, it is the NSSMF 1202 that requests openness 1411, 1412, 1413 from its constituent management entities 1205 to obtain capability information therefrom.

Thereafter, the NSMF 1201 obtains information, 2111, 2112 from its constituent management entities 2105 in a manner similar to that of FIG. 21. However, if, without limitation, certain interfaces, access to databases and/or monitoring capabilities are provided to the NSMF 1201 as a result of the openness requests 2311, 2312, the NSMF 1201 does not send inquiries related to these.

In some examples, a service catalogue prepared 1414 by an NSSMF 1202 may be provided to the NSMF 1201 for inclusion in the service catalogue to be prepared 2314 by the NSMF 1201 as described below. By way of non-limiting example, the NSST(s) identified in the service catalogue of the NSSMF 1202 may be incorporated into the NST(s) created by the NSMF 1201 for its service catalogue.

The NSMF 1201 may create, update and/or maintain 2314 a service catalogue, database and/or similar repository based on the information it has collected about its capabilities, including without limitation, the NSTs and/or types thereof.

In the requirements stage 2320, the NSMF 1201 may receive a request 2321 from the 3GPP entity 2101 to provide information on the network, that is, to expose its service catalogue. In some examples, the request 2321 is a message 2321a similar to queryNetworkResourceRequest with filter( ) and attributeSelector( ) parameters. In some examples, the request 2321 is a message 2321b similar to TemplateRequest( ) with templateType as a parameter. In some examples, the request 2321 is a different message and may include parameters for, without limitation, capacity exposure, capability exposure and/or openness. In some examples, the request 2321 may be a ServiceCapabilityRequest message from the CSMF and/or customer to the NSMF 1201. In some examples, an input parameter of the ServiceCapabilityRequest may be a serviceCapabilityRequest identifier that asks for a service that can be provided and an output parameter may be a serviceCapability that lists possible services with capability, including without limitation, capacity exposure, capability exposure and/or openness.

The NSSMF 1201 evaluates the access request 2322 and provides access 2323 to the service catalogue to the 3GPP entity 2101, which may in some examples be, without limitation, the customer and/or the CSMF, in the form of capability and/or remaining capacity information. In some examples, if the attributeSelector( ) is absent, the complete attributes of the network resource(s) are returned. In some examples, the response 2323 is a message 2323a similar to queryNetworkResourceResponse with networkResourceData as a parameter. In some examples, the response 2323 is a message 2323b similar to TemplateResponse( ). In some examples, the response 2323 may be a Service CapabilityResponse message from the NSMF 1201 to the CSMF and/or customer.

The NSMF 1201 receives 2324 an NSI provisioning request with NSI requirements. In some examples, if not provided previously, the request 2324 is a message 2324a similar to TemplateRequest with Template Type as a parameter. In some examples, the nstData may be one or more NST(s) selected from the service catalogue. In some examples, the nstData may be one or more attributes with values as well as NSST(s).

In the feasibility stage 2330, the NSMF 1201 validates 2331 the feasibility of the request 2324 using the most recent service catalogue information.

In some examples, the NSMF 120 sends queries 2332a, 2332b to its constituent management entities 2105 to ensure remaining capacity and to reserve resources and to prepare a suitable network environment. In some examples, the constituent management entities 2105 send an acknowledgment back to the NSMF 1201 when the resources have been reserved. If one or more of the constituent management entities 2105 was unable to reserve the requested resources, the response to the query 2132a, 2132b may indicate what issue(s) were encountered.

In some examples, the NSMF 1201 updates 2333 its service catalogue accordingly.

Figure 26:
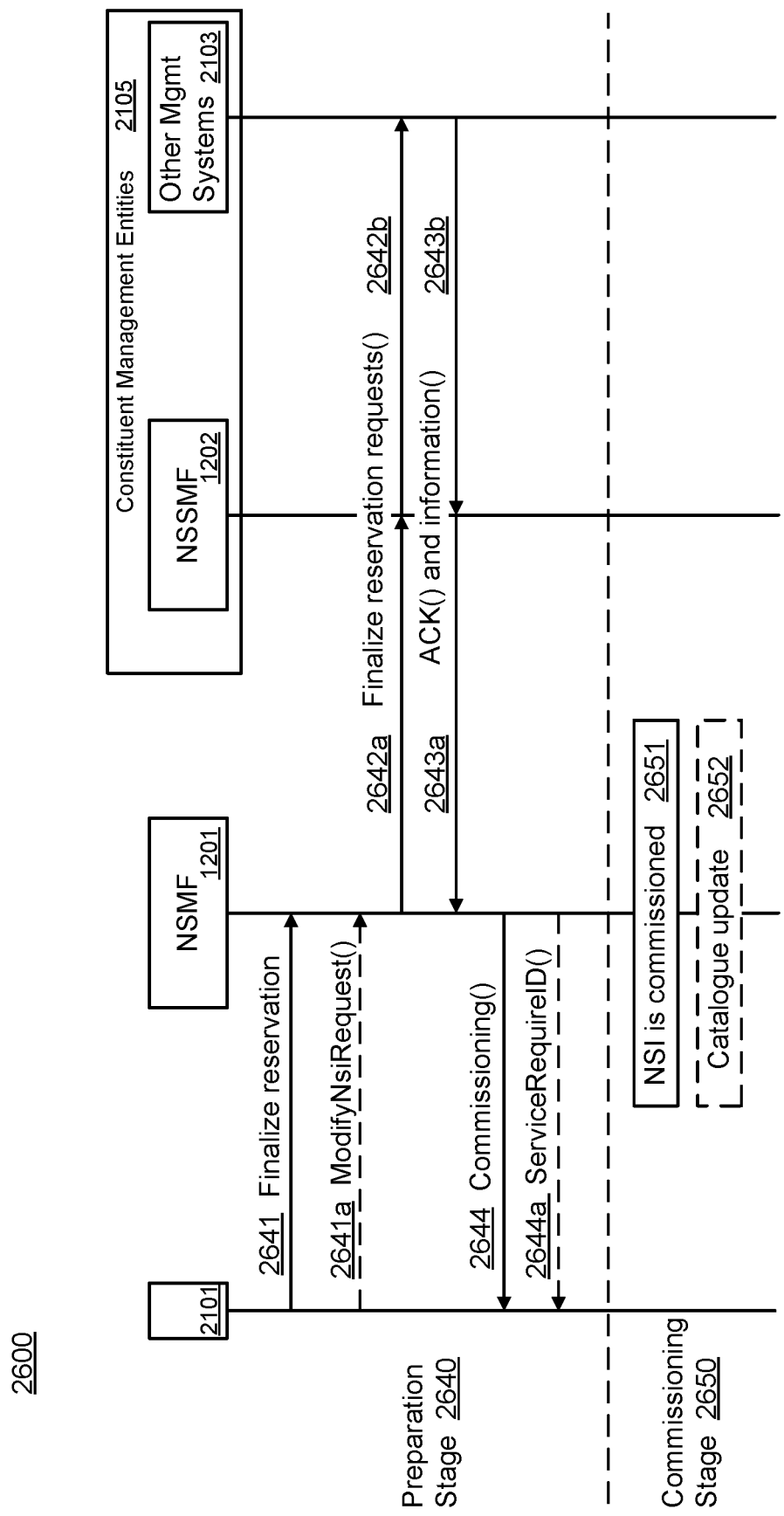
FIG. 26 is a signal flow diagram showing example flows to commission an NSI by modifying an existing NSI according to an example.

The NSMF 1201 may evaluate 2131 the possibility of re-using, whether or not with modification, an existing NSI for either or both of shared and non-shared services. In so doing, the NSMF 1201 obtains corresponding NSI ID and information which may include existing NSSI IDs. If feasible, the processing described in FIG. 26 is performed.

In some examples, by way of non-limiting example, if exposure is not sufficiently provided, the NSMF 1201 may determine NSI and non-3GPP requirements by querying 2332a and 2332b its constituent management entities 2105 (and to other NSMFs (not shown) about their capabilities. Further, if openness is provided with other network entities and/or functions, including, without limitation the NFV MANO 232 and/or TN manager (not shown), the NSMF 1201 can send queries to them as well. The NSMF 1201 receives responses back from such queries. It will be readily understood that the action of querying can include both the transmission of a query and the receiving of a response to said query.

In the case of the NSSMF 1202, the query 2334a may trigger the NSSMF 1202 to itself perform evaluation and initial network preparation, such as is shown in FIG. 14.

The NSMF 1201 thereupon makes a formal determination 2137 of feasibility. If the request 2324 is feasible, reservation requests 2335a, 2335b are sent to its constituent management entities 2105 with openness and responses obtained. If the responses are negative, additional queries may be sent.

The NSMF 1201 replies 2325 to the NSI provisioning request 2324 with information about the network resources reserved, including without limitation, the NSI descriptor(s), NST(s), NSI attribute values and/or IDs of the shared NSI(s). In some examples, the reply 2325 is a message 2325a similar to queryNetworkResourceResponse with networkResourceData as a parameter. In some examples, such message 2325a may send nsstID as a parameter for related templates, ServiceRequireID as a parameter for the admitted service and/or other parameters and/or messages.

In some examples, user plane and/or control plane policies, including without limitation, charging policies may be established. In some examples, the establishment of such policies may include negotiation. In some examples, a specific PCF 100 may establish such policies 2327. Such PCF 100 may receive an acknowledgment 2337 from the NSMF 1201 or other management function to indicate that the service is ready to be admitted. If so, the PCF 100 may send 2337 a request to retrieve the policies of the 3GPP entity 1301. Such message 2337 may be sent to the 3GPP entity 2101, the PCF 100 thereof or another related management function. The PCF 100 may evaluate the received messages to see if they are in agreement with existing policies. If the policy of the 3GPP entity 2101 agrees with the policies of the provider and other network policies, an acknowledgment may be sent to the 3GPP entity 2101. Thereafter, the policy-related configuration may be handled by the NSMF 1201 or the PCF 100 or a specific policy configuration function throughout the network.

At this point the NSI is ready for a negotiation stage 2470 (FIG. 24) and/or the preparation stage 2450, discussed in connection with FIG. 24.

Figure 24:
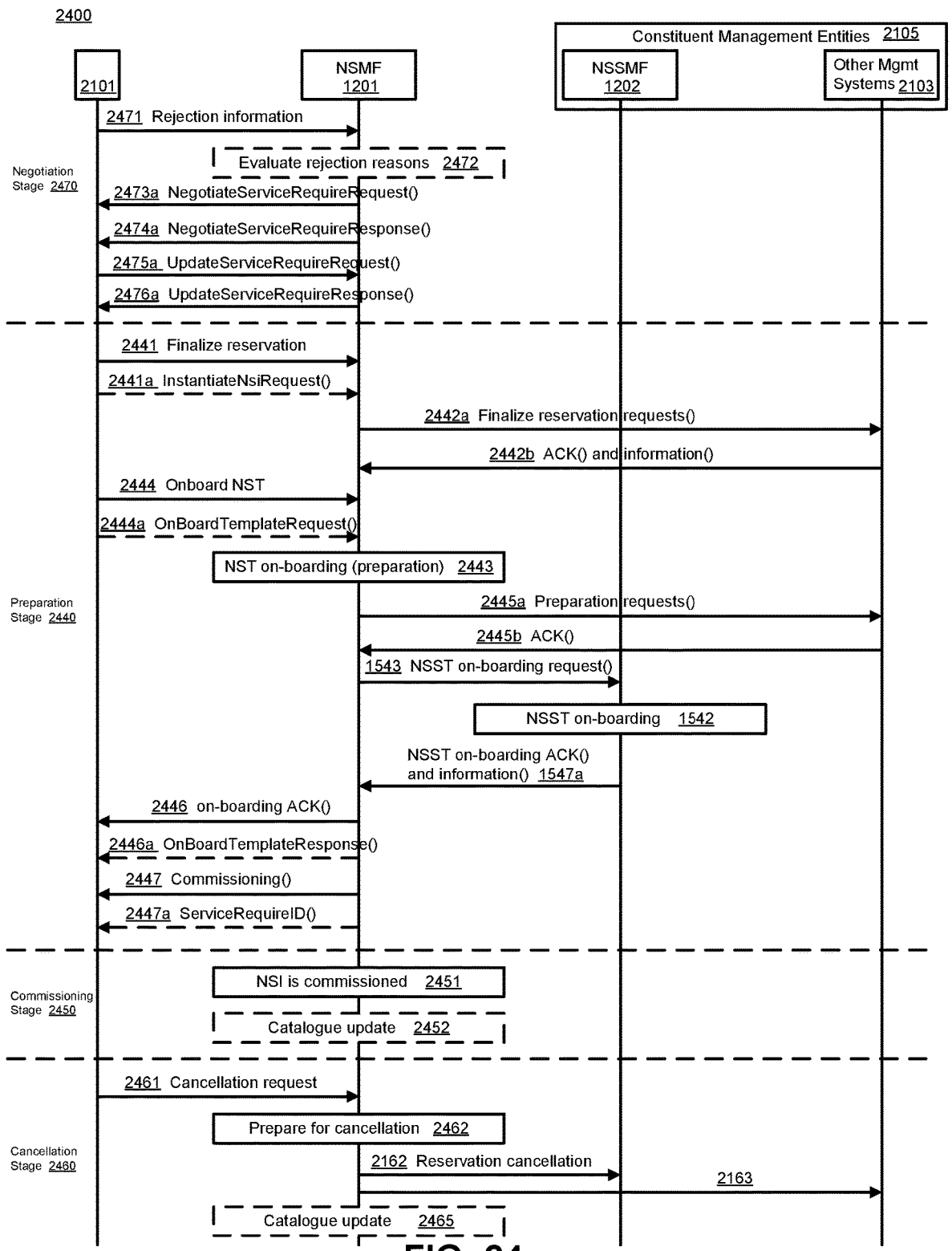
FIG. 24 is a signal flow diagram showing example flows to create an NSI with catalogue and capability exposure according to an example.

FIG. 24 is a signal flow diagram showing example flows to create an NSSI with catalogue capability exposure shown generally at 2400. FIG. 24 follows on at the end of FIG. 23.

At the outset, the outcome of the establishment of policies 2337 is evaluated. If the 3GPP entity 2101 rejects the creation of the NSI, a negotiation stage 2470 may be entered. Otherwise, the preparation stage 2440 is entered.

In the negotiation stage 2470, the rejection is signalled by the NSMF 1201 receiving a message 2471 rejecting the NSI. In some examples, such message may provide reasons for the rejection. In some examples, the NSMF 1201 evaluates 2472 the reasons for the rejection and prepares a response.

In some examples, the NSMF 1201 negotiates provision options, which may comprise, without limitation, redesign, modification options for existing NSIs, and/or network resource allocation options. In some examples, the negotiations may be precipitated by the receipt by the NSMF 1201 of a NegotiateServiceRequireRequest( ) message 2473a. In response, the NSMF 1201 may send a NegotiateServiceRequireResponse( ) message 2474a.

If the 3GPP entity 2101 approves of the negotiated provisioning option(s), the NSSMF 1202 may receive an UpdateServiceRequireRequest( ) message 2475a and prepares an UpdateServiceRequireResponse( ) message 2476a in response. Thereafter, the feasibility stage 2330 is entered at 2321.

In the preparation stage 2440, the 3GPP entity 2101 approves and finalizes 2441 all resource reservations. In some examples, the approval 2441 is a message 2441a similar to InstantiateNsiRequest with nstID and instantiateNsiTime as parameters. In some examples, the request 2441 is a different message and may include appropriate parameters. In some examples, the 3GPP entity 2101 only sends an acknowledgment with an ID that may be an NST ID. In some examples, the approval 2441 may be a Service ConfirmationRequest message from the CSMF and/or customer to the NSMF 1201. In some examples, input parameter(s) of the ServiceConfirmationRequest message may include at least one of a serviceConfirmationRequest identifier that asks to confirm the service that has been requested and/or serviceConfirmationParameters that asks to confirm the service that has been requested with appropriate parameters and an output parameter may be a serviceCapability identifier that confirms (ACK) and/or rejects (NACK) an acknowledgment.

The NSMF 1201 thereafter finalizes 2442a reservations with its constituent management entities 2105 and receives an acknowledgment 2442b indicating the success of the reservations. In some examples, the NSMF 1201 also receives 2442b information about the reserved entities, including without limitation, their ID and/or topology.

The NSMF 1201 thereafter on-boards 2443 all appropriate NSTs, with values and/or NSI descriptors and/or their constituents. The on-boarding 2443 may in some examples be triggered by a signal flow 2444 from the 3GPP entity 2101. In some examples the signal flow 2444 is a message 2444a similar to OnBoardTemplateRequest with an TemplateData parameter. In some examples, the TemplateData may include, without limitation, NSST data. If the NSMF 1201 did not expose the NSTs to the 3GPP entity 2101, the NSMF 1201 can decide which NST to on-board. If the NSMF 1201 exposed the NSTs to the 3GPP entity 2101, the 3GPP entity 2101 may specify the NST to be on-boarded directly, by specifying the templateID.

In some examples, the on-boarding 2443 may include preparations by the constituent management entities 2105 that are triggered by signal flows 2445a from the NSMF 1201. In some examples, the NSMF 1201 may receive an acknowledgment 2445b therefrom.

In some examples, the NSMF 1201 may request 1543 the NSSMF 1202 to on-board its NSST(s), whereupon the NSSMF 1202 does so 2446 and provides an acknowledgment 1547a thereof that may contain information regarding the on-boarded NSST(s).

The NSMF 1201 signals 2446 completion of the on-boarding of the NST(s) and its constituents by an acknowledgment. In some examples, the completion of the on-boarding 2466 may be signalled by the NSMF 1201 by sending a OnBoardTemplateResponse( ) message 2446a with templateID and/or templateInfo parameters.

The NSMF 1201 signals 2447 that the NSI is ready for commissioning. In some examples, the signal may be a ServiceRequireID( ) message 2447a to the 3GPP entity 2101.

In the commissioning stage 1550, creation and/or commissioning of the new NSSI and/or modification of existing NSSI(s) is completed 1551, whereupon the NSSI is ready for activation.

The cancellation stage 2460 may be initiated by a request 2461 from the 3GPP entity 2101 to the NSMF 1201 to cancel the commissioned NSI. In response to such a request, the NSMF 1201 prepares to cancel 2462 the created NSI and in the course of so doing, may issue requests 2162, 2163 to its constituent management entities 2105 to cancel reserved resources.

In some examples, the NSMF 1201 updates 2465 its service catalogue accordingly to indicate freed up resources.

Figure 25:
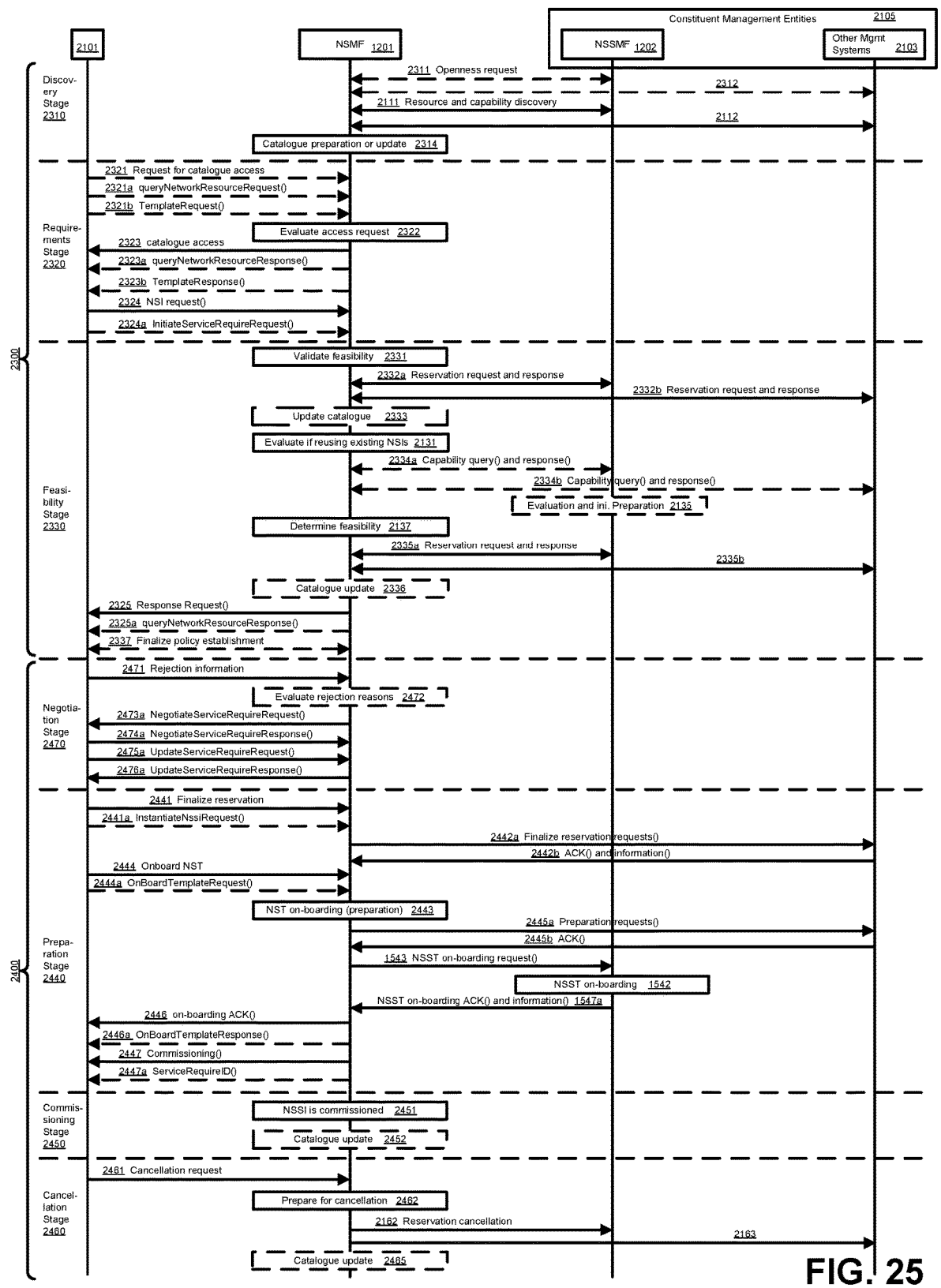
FIG. 25 is a signal flow diagram showing example flows to provision an NSI with catalogue and capability exposure according to an example.

FIG. 25 is a signal flow diagram showing example flows to provision an NSSI with catalogue and capability exposure shown generally at 2500. Given that it is understood, with reference to FIG. 11, that provisioning comprises the preparation phase 1110 and the commissioning phase 1130, which incorporates creation 1131 (and/or modification as discussed in connection with FIG. 26), it follows that FIG. 16 may in some examples consist of the concatenation of FIG. 23 followed by FIG. 24 as shown (or of FIG. 23 followed by FIG. 24 with corresponding portions thereof replaced by those of FIG. 26 (not shown). Reference should thus be made to FIGS. 23, 24 and/or 26.

FIG. 26 is a signal flow diagram showing example flows to commission an NSI by modifying an existing NSI. The figure shows communication between the 3GPP entity 2101, the NSMF 1201, NSSMF 1202 and other management systems 2103.

The procedure shown generally at 2600 on FIG. 26 should be understood to comprise an alternative example of the preparation stage and commissioning stage that could be substituted for the preparation stage 2440 and commissioning stage 2450 (corresponding to creation of a new NSI) in FIGS. 24 and 25. It should thus be understood that the procedure 2600 would be preceded by the discovery stage 2310, the requirements stage 2320 and the feasibility stage 2330, and that in addition, there may be either or both of the cancellation stage 2460 and the negotiation stage 2470.

The procedure 2600 presupposes that the NSI to be modified is already in existence. Such NSI may or may not be shared. A shared NSI refers to an NSI for which there are other services deployed thereon. It is conceivable that a shared NSI may be commissioned but not activated (see FIG. 27) in that a previous service has completed but has not been terminated (see FIG. 30).

At the outset, the outcome of the establishment of policies 2326 is evaluated. The procedure 2600 further presupposes that the 3GPP entity 2101 approves and finalizes 2641 all resource reservations. In some examples, the approval 2641 is a message 2641a similar to ModifyNsiRequest( ) with corresponding parameters.

The NSMF 1201 completes the preparation of the network environment by finalizing the reservations, updating policy, on-boarding any additional functions and/or any other configurations. In some examples, as finalizing all resource reservations comprises approving and finalizing reservations of constituents of the NSI, this may include preparations by the constituent management entities 2105 that are triggered by signal flows 2642a, 2642b from the NSMF 1201 and receiving acknowledgments and/or relevant information therefrom 2643a, 2643b.

Thereafter, the NSMF 1201 finalizes the modification of the NSI. The NSMF 1201 sends a message 2644 to the 3GPP entity 2101 indicating that the NSI is ready to be activated, if not already activated. In some examples, the message 2644 is a message 2644a similar to ServiceRequireID( ) with appropriate parameters. In some examples, the NSMF 1201 provides information, including without limitation, the NSI ID, and tools, including without limitation, interfaces, for monitoring, reporting fault, performance and/or security management of the service being deployed on the NSI.

In the commissioning stage 2650, the NSMF 1201 activates 2651 the NSI (if not already active). In some examples, such activation may comprise tests to validate the NSI. In some examples, such activation may comprise commissioning of the NSSIs. In some examples, such activation may comprise activation of the constituents of the NSI. In some examples, if the NSI was already active and being used by other services, the activation should not interrupt such services.

In some examples, the NSMF 1201 updates 2652 its service catalogue with the changes in the network environment and resources.

Figure 27:
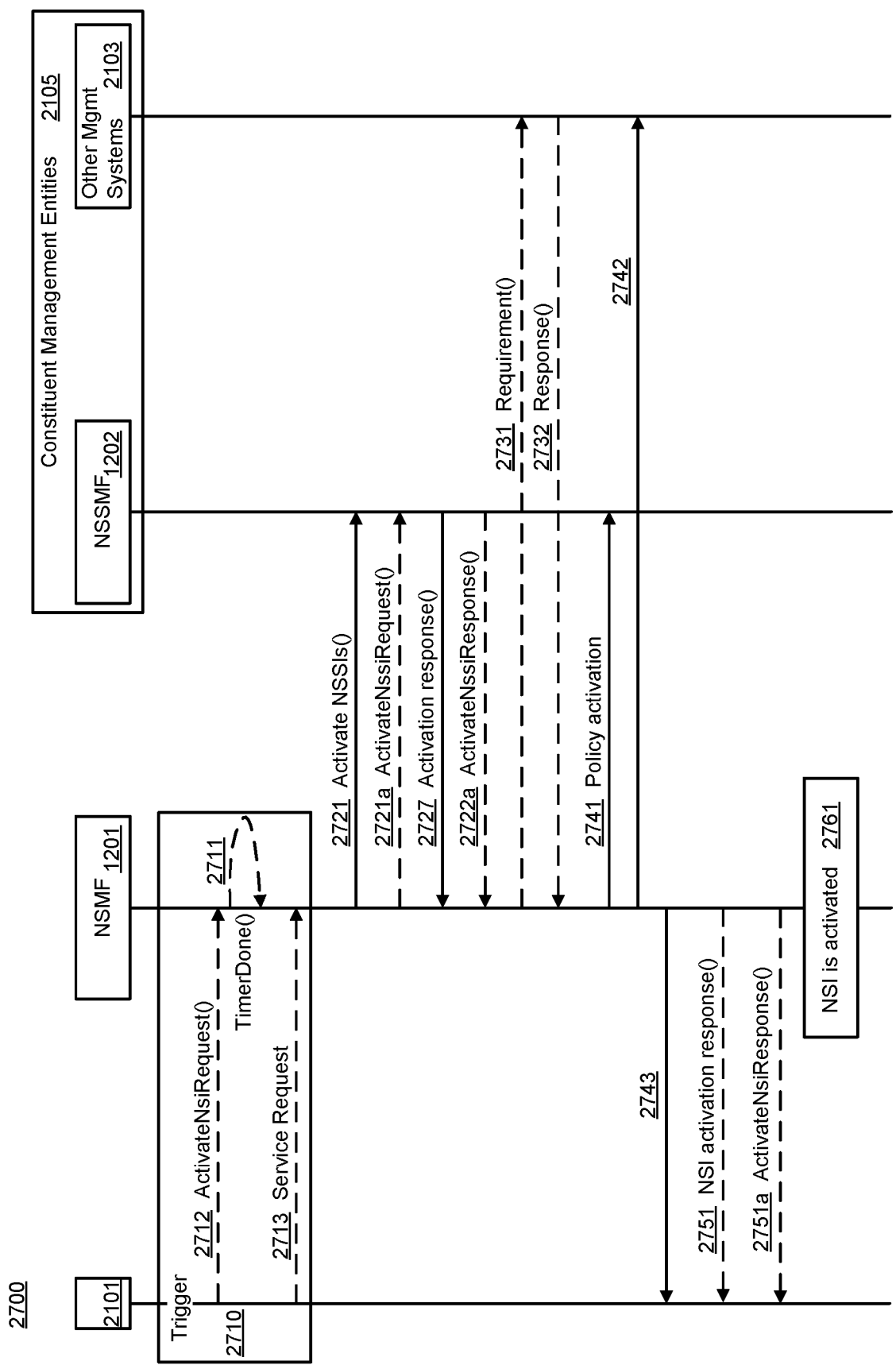
FIG. 27 is a signal flow diagram showing example flows to activate an NSI according to an example.

FIG. 27 is a signal flow diagram showing example signal flows to activate an NSI that has been provisioned in a procedure shown generally at 2700. The figure shows communications between a 3GPP entity 2101, the NSMF 1201, the NSSMF 1202 and other management systems 2103.

With reference to FIG. 11, the procedure 2700 corresponds to activation 1141 during the operation phase. In this context, NSI activation may include any actions that make the NSI active to provide communication services. NSI activation may trigger NSSI activation.

Activation 1141 is initiated by a trigger 2710 that is generated or received. Such triggers 2710 may include, without limitation, an internal and/or external time alarm 2711 indicating that the NSI is to be activated, which may in some examples, be an activateNsiTime( ) function and/or a TimerDone( ) function; a request 2712 from the 3GPP entity 2101 to activate the NSI, which may in some examples, be an ActivateNsiRequest( ) with an nsiID as a parameter; and/or a service 2713 being deployed on an existing NSi such as is disclosed in FIG. 26. In some examples, if a new service is being deployed and the service catalogue information of the network providere is not provided the 3GPP entity 2101, the NSI will not receive the nsiID parameter. In some examples, if exposure is provided, the NSMF 1201 can receive the nsiID parameter.

The NSMF 1201 identifies any inactive NSSIs associated with the NSI and sends messages 2721 to the NSSMF 1202 to have the NSSMF 1202 activate the NSSI. In some examples, assuming that there is sufficient openness, the message 2721 is a message 2721a similar to an ActivateNssiRequest( ) message with nssiID (if exposed) and/or activateNssiTime( ) as parameter(s).

The NSMF 1201 receives responses 2722 that indicate that the NSSI(s) ha(ve) been activate. In some examples, the response 2722 is a message 2722a similar to an ActivateNssiResponse( ) message with NssiLifecycleOperationOccurrenceId as a parameter.

In some examples, the NSMF 1201 sends a request 2731 to the other management systems to arrange resources that are used to activate the NSI and receives a response 2732 therefrom.

Further, the NSMF 1201 activates 2741, 2742, 2743 related inactive policies at the 3GPP entity 2101 and the constituent management entities 2105.

If an activation request 2712 was received, the NSMF 1201 sends 2751 a response. In some examples, the response 2751 may be a response 2751a similar to an ActivateNsiResponse( ) with an NsLifecycleOperationOccurrenceId as a parameter that helps with traceability of the operation. Thereupon, the NSI is activated 2761.

Figure 28:
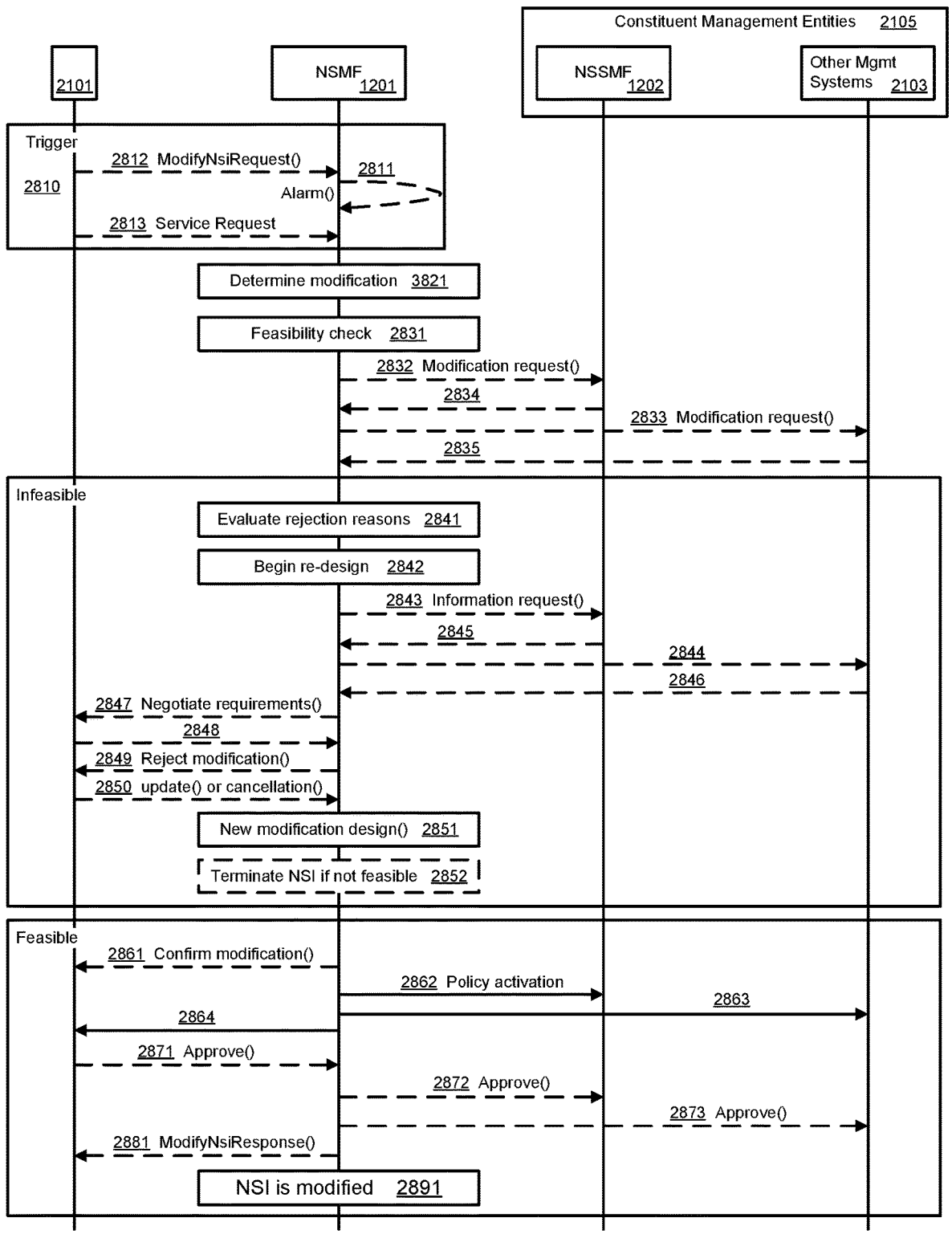
FIG. 28 is a signal flow diagram showing example flows to modify an operational NSI according to an example.

FIG. 28 is a signal flow diagram showing example flows to modify an operational NSI in a procedure shown generally at 2800. The figure shows communications between a 3GPP entity 2101, the NSMF 1201, the NSSMF 1202 and other management systems 2103.

With reference to FIG. 11, the procedure 2800 corresponds to modification 1144 during the operation phase 1140. In this context, NSI modification in the operation phase may include several work flows, including, without limitation, changes in NSI capacity, changes in NSI topology and/or NSI reconfiguration. NSI modification can be triggered, without limitation, by receiving new NSI-related requirements, by receiving new communication service requirements and/or automatically as a result of NSI supervision. NSI modification may trigger NSSI modification.

In some examples, the NSI de-activation procedure 2900 (FIG. 29) may precede the NSI modification procedure 2800. In some examples, the NSI activation procedure 2700 may follow the NSI modification procedure 2800.

Modification 1144 is initiated by a trigger 2810 that is generated or received. Such triggers 2810 may include, without limitation, an alarm regarding the performance of the NSI and/or its constituents, by way of non-limiting example, reaching a data storage capacity, achieving a maximum rate and/or malfunction of a network element; a request 2812 from the 3GPP entity 2101 to modify the service using the NSI and/or its constituents, which in some examples may be a ModifyNsiRequest( ) message with csiID, cstID, modifyNsiType, modifyNsiData, modifyNsiTime and/or similar parameters; and/or a specific modification request 2813, which may be in connection with an NST, an NSST and/or an attribute thereof. In some examples, if a new service is going to be deployed on an existing NSI, the procedure of FIG. 26 may be followed.

In some examples, if not previously specified, the NSMF 1201 starts modification by determining 2821 the modifications that are called for. This may comprise determining modifications for NSI constituents (assuming there is sufficient openness and/or exposure) and/or deriving requirements for the constituent management entities 2105 to request modifications. It will be understood that deriving requirements can be envisioned as one manner in which the requirements are obtained, while alternate or additional manners of obtaining the requirements can be from one or more of deriving the requirements and receiving the requirements.

Depending upon the openness and/or exposure and whether there is a service catalogue available, the NSMF 1201 may evaluate 2831 the feasibility of the modification. Otherwise, the NSMF 1201 may issue modification requests 2832, 2833 to the constituent management entities 2105 and receives responses 2834, 2835 therefrom.

If the proposed modification(s) is/are considered and/or the NSMF 1201 receives a response 2835, 2836 that indicates that they are not feasible, NSMF 1201 may evaluate the reasons for such a conclusion. In some examples, the NSMF 1201 may re-design the proposed modification 2842. In so doing, it may be determined that the openness was not sufficient, in which case the NSMF 1201 may request 2843, 2844 additional information from its constituent management entities 2105 and obtain responses 2845, 2846 therefrom. In some examples, if the NSMF 1201, in some examples, armed with the additional information, considers that there is no feasible modification, it may negotiate 2847, 2848 the modification requirements with the 3GPP entity 2101. If the negotiations 2847, 2848 do not result in a feasible solution, the NSMF 1201 may reject the requested modification 2849 and the 3GPP entity 2101 may respond 2850 with either a new proposed modification 2851 or a cancellation 2852 of the proposed modification. In the former situation, processing reverts to the feasibility check 2831.

Figure 30:
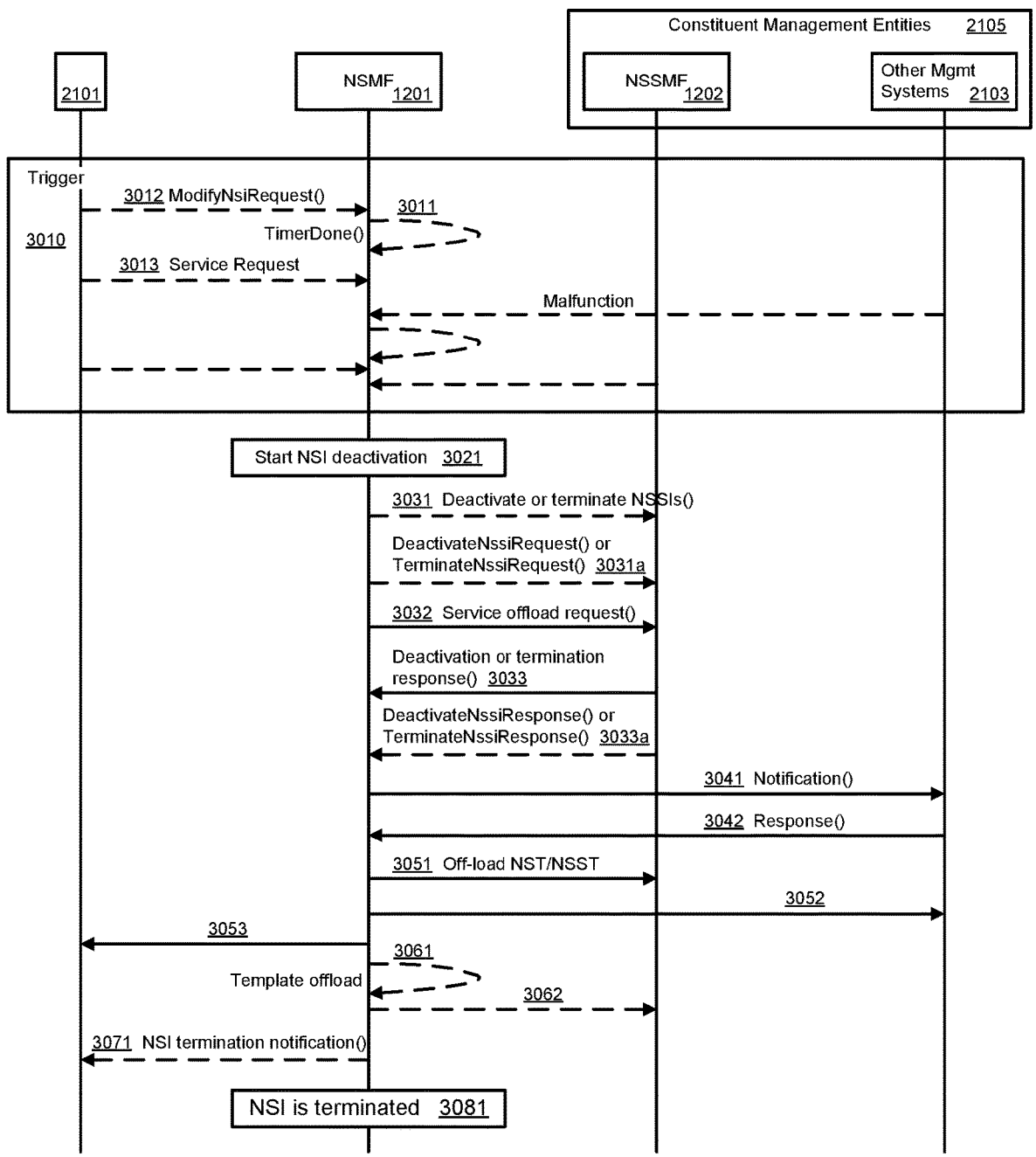
FIG. 30 is a signal flow diagram showing example flows to terminate an NSSI according to an example.

In some examples, if the modification was triggered 2811 by an alarm condition and there is no feasible modification possible, services on the NSI may be off-loaded to other NSI(s) and the NSI may eventually be terminated as shown in FIG. 30 and the modification is cancelled.

If the proposed modification(s) is/are considered feasible, the responses 2845, 2846 may in some examples include, without limitation, resource reservations, and/or information about NSI constituents, including without limitation NSSI IDs.

In some examples, if the modification was triggered 2812, 2813 by a request from the 3GPP entity 2101, the NSMF 1201 may send a response 2861 to the 3GPP entity 2101 to indicate that the proposed modification design is feasible.

The response 2861 may, in some examples, include detailed information about modified NSI constituents, including, without limitation, topology, NSSI ID and/or remaining capabilities of NFVs.

In some examples, if additional policies are to be established and/or activated, the NSMF 1201 sends messages 2862, 2863, 2864 to the 3GPP entity and the constituent management entities 2105.

In some examples, the 3GPP entity 2101 may send 2871 a message approving the modification to the NSMF 1201. In some examples, the NSMF 1201 sends a message 2872, 2873 to the constituent management entities 2105 to approve modification to be performed by them in consequence thereof.

In case a modification request was received, a response may be prepared. In some examples, the NSMF 1201 may send a ModifyNsiResponse( ) message with a parameter of lifecycleOperationOccurrenceCsId. This may help with traceability of the operation.

In some examples, if the modification was triggered 2812, 2813 by a request from the 3GPP entity 2101, the NSMF 1201 may send a response 2881 to the 3GPP entity 2101 to indicate that the modification has been completed. The NSI has been modified 2891.

Accordingly the NSI has been modified.

Those having ordinary skill in the relevant art will appreciate that similar processing may be performed, with appropriate changes that will be apparent to them from a consideration of the figures herein and discussion thereof, to effect a modification of an NSSI.

Figure 29:
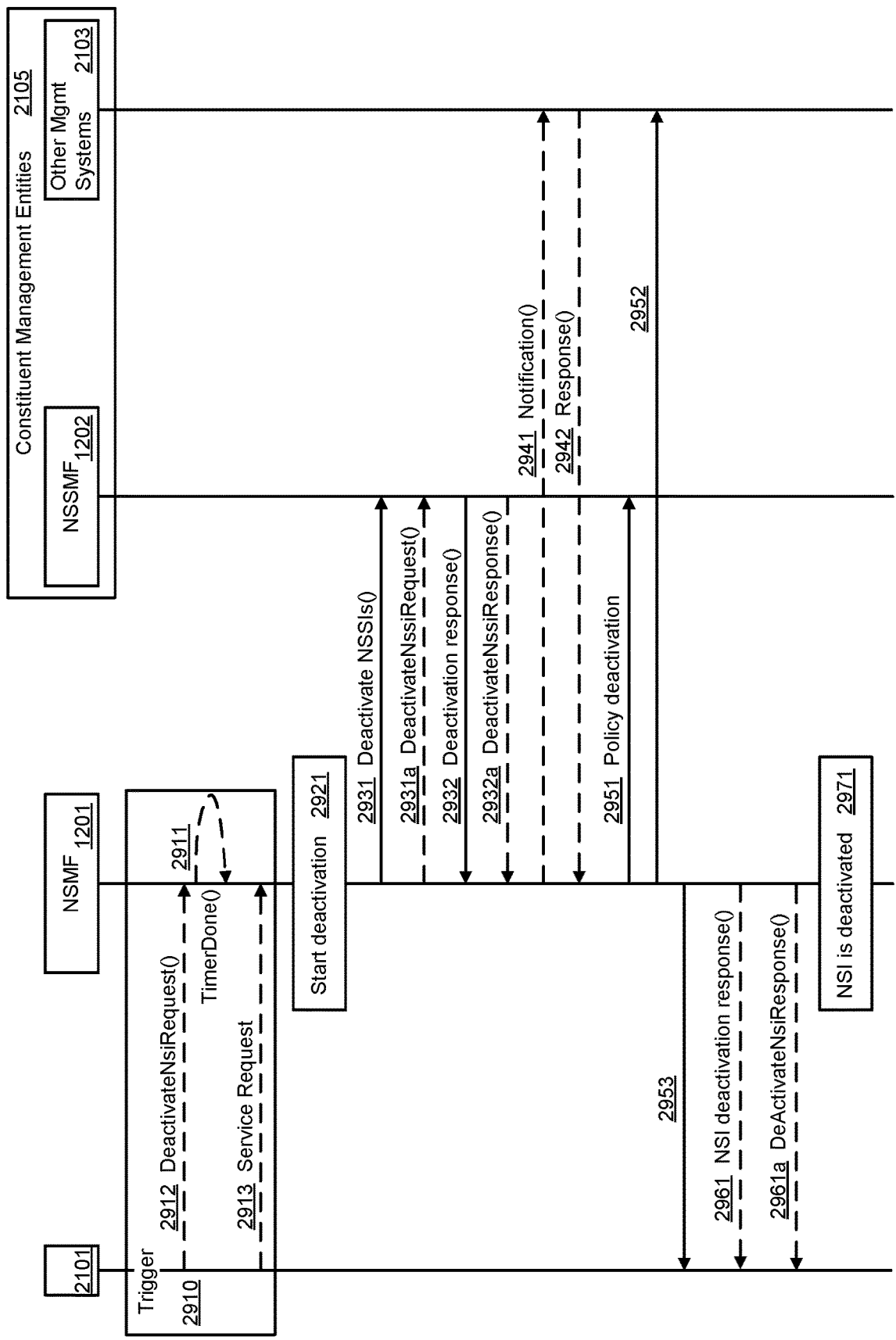
FIG. 29 is a signal flow diagram showing example flows to deactivate an NSSI according to an example.

FIG. 29 is a signal flow showing example signal flows to de-activate an NSI that has been activated in a procedure shown generally at 2900. The figure shows communications between a 3GPP entity 2101, the NSMF 1201, the NSSMF 1202 and other management systems 2103.

With reference to FIG. 11, the procedure 2900 corresponds to de-activation 1145 during the operation phase 1140. In this context, NSI de-activation includes any actions that make the NSI inactive and not providing any communication services. NSI de-activation may trigger NSSI de-activation to de-activate constituent NSSI(s) that are not used by other NSI(s). In some examples, it may be decided to keep the NSI (without termination) after de-activation and to re-activate it when a new communication service request is received.

De-activation 1145 is initiated by a trigger 2910 that is generated or received. Such triggers 2910 may include, without limitation, an internal and/or external timer alarm 2911 indicating that the NSI is to be de-activated, which may in some examples may be an deactivateNsiTime( ) function and/or a TimerDone( ) function; a request 2912 from the 3GPP entity 2101 to de-activate the NSI, which may in some examples, be a DeactivateNsiRequest( ) with an nsiID as a parameter, and/or a service 2913 being removed from the NSI. In some examples, if the NSSI is being shared, the other service(s) on the NSI will be deployed to other NSSI(s) without interruption.

The NSMF 1201 starts de-activation 2921 by identifying whether traffic should be re-routed, by way of non-limiting example, if there are other services using the slice, without disrupting ongoing services. This may trigger NSI modification in accordance with FIG. 26 to direct existing service(s) to existing slices and/or NSI creation in accordance with FIG. 24 to deploy existing service(s) on new NSI(s).

The NSMF 1201 identifies active NSI(s) associated with the NSI being de-activate and sends requests 2931 to the NSSMF 1202 to deactivate the identified NSI(s). In some examples, the request 2931 may be a response 2931a similar to a DeactivateNssiRequest( ) message with a nssiID (if exposed) parameter. In some examples, the request 2931 may be a request similar to a deactivate NssiTime( ) message (not shown). In response, the NSMF 1201 may receive a message 2932 confirming that the NSSI(s) ha(ve) been de-activated. In some examples, the response 2932 may be a message 2932a that is similar to a DeactivateNssiResponse( ) message with a NssiLifecycleOperationOccurrenceId parameter. If the NSSI(s) are shared, the other service(s) on the NSSI are deployed to other NSSI(s) without interruption, otherwise the procedure 2900 is rejected.

In some examples, the NSMF 1201 may send a notification 2941 to the other management system 2103 to prepare the network for de-activation of the NSI. By way of non-limiting example, the other management system 2103 may be requested to have the TN manager release resources previously allocated to the NSI. In some examples, the notification 2941 may be accompanied by information. In some examples the notification 1941 results in a response or acknowledgment 2944 from the other management system 2103.

FIG. 30 is a signal flow showing example signal flows to terminate an NSI that has been activated in a procedure shown generally at 3000. The figure shows communications between a 3GPP entity 2101, the NSMF 1201, the NSSMF 1202 and other management systems 2103.

With reference to FIG. 11, the procedure 3000 corresponds to termination 1151 during the decommissioning phase 1150.

Termination 1151 is initiated by a trigger 3010 that is generated or received. Such triggers 3010 may include, without limitation, an internal timer alarm and/or policy 3011 indicating that the NSI is to be terminated, which may in some examples may be a TimerDone( ) function; a request 3012 from the 3GPP entity 2101, another NSMF (not shown) or the CSMF (not shown) to terminate the NSI, by way of non-limiting example, because it is no longer needed to support the particular service, which may in some examples, be a TerminateNsiRequest( ) with an nsiID as a parameter, and/or a service 3013 being removed from the NSI. In some examples, if the trigger 3010 is a request 3012, the NSMF 1201 may decide, rather than terminate the NSI, simply to modify it in accordance with FIG. 26.

The NSMF 1201 starts termination 3021 by identifying whether the NSI or any related NSSI is active. If so, they are de-activated in accordance with FIG. 19 and/or FIG. 29. Otherwise they are terminated. The NSMF 1201 identifies active NSSI(s) associated with the NSI being terminated and sends requests 3031 to the NSSMF 1202 to de-activate and/or terminate the identified NSSI(s). In some examples, the request 3031 may be a request 3031a similar to a DeactivateNssiRequest( ) message and/or a TerminateNssiRequest( ) message with NssiLifecycleOperationOccurrenceId and/or nssiID parameters. In some examples, the NSMF may send an service off-load request 3032 to the NSSMF 1202. In some examples, the service off-load request 3032 may be a message similar to a Offload service( ) message with a serviceID parameter. In response, the NSMF 1201 may receive a response 3033. In some examples, the response 3033 may be a message 3033a similar to a DeactivateNssiResponse( ) message and/or a TerminateNssiResponse( ) message with a NssiLifecycleOperationOccurrenceId parameter.

In some examples, the NSMF 1201 may send a notification 3041 to the other management system 2103 to release any resource allocations. In some examples the notification 3041 results in a response or acknowledgment 344 from the other management system 2103.

Further, the on-boarded NST may be off-loaded. In some examples, if there are NST(s) and/or NSST(s) on-boarded, the NSMF 1201 sends 3051, 3052, 3053 off-loading requests to the NSSMF 1202, 3GPP entity 2101 and constituent management entities 2105.

In some examples, the NSMF 1201 may off-load NST templates that it has 3061 and/or send a message to the NSSMF 1202 to off-load NSST templates that it has 3062.

If a termination request 3012 was received, the NSMF 1201 sends 3071 a response. In some examples, the response 3061 may be a response 2961a similar to an TerminateNsiResponse( ) message with an NsiLifecycleOperationOccurrenceId parameter that helps with traceability of the operation. Thereupon the NSI is terminated 3071.

Further, the NSMF 1201 de-activates 2951, 2952, 2953 related policies at the NSSMF 1202, 3GPP entity 2101 and constituent management entities 2105.

If a de-activation request 2912 was received, the NSMF 1201 sends 2961 a response. In some examples, the response 2961 may be a response 2961a similar to an DeactivateNsiResponse( ) message with an NsiLifecycleOperationOccurrenceId parameter that helps with traceability of the operation. Thereupon the NSI is de-activated 2971.

Method Actions

Figure 31:
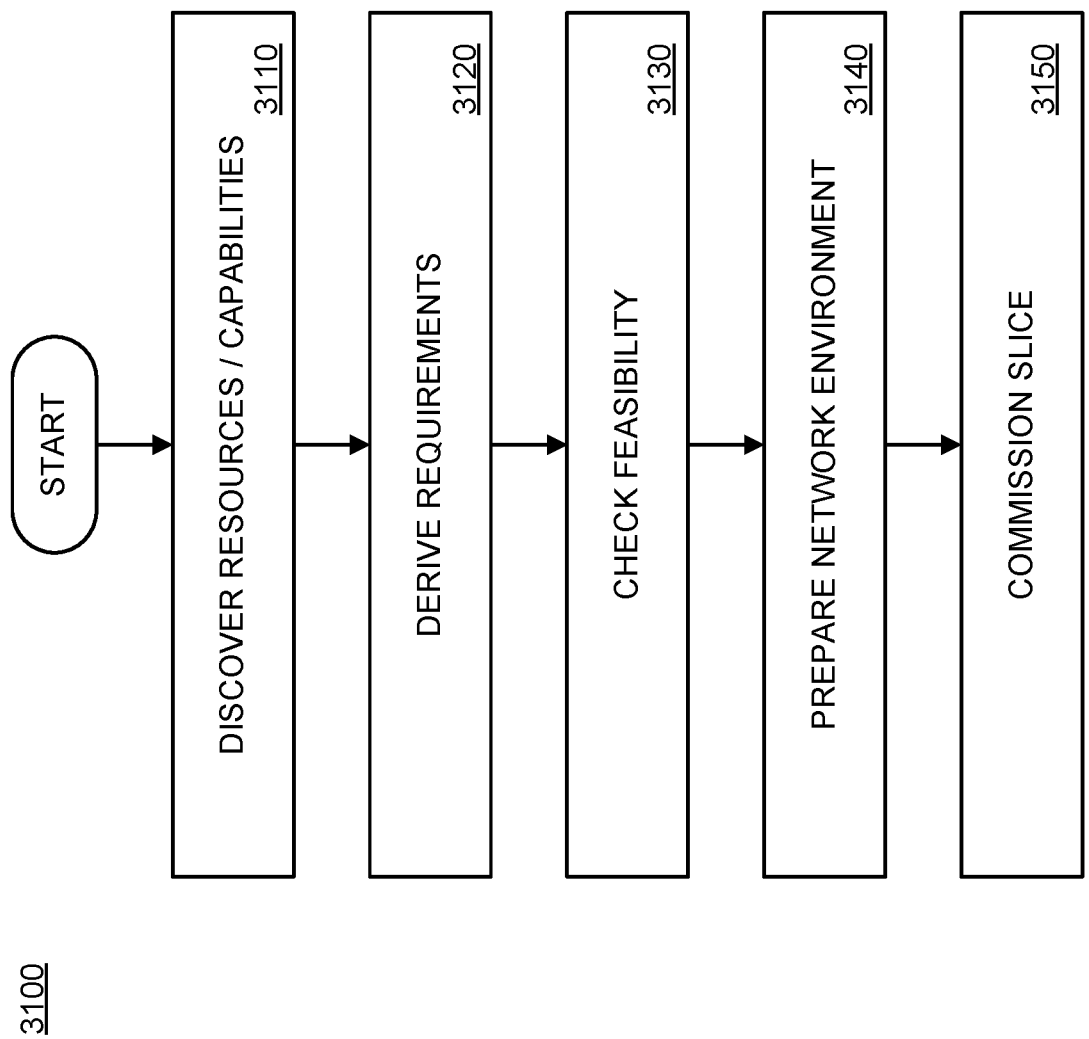

Turning now to FIG. 31, there is shown a flow chart, shown generally at 3100, of example actions taken to provision a network slice.

One example action 3110 is to discover resources and/or capabilities of the network.

One example action 3120 is to derive requirements for the slice.

One example action 3130 is to check the feasibility of the slice requirements.

One example action 3140 is to prepare the network environment for the slice.

One example action 3150 is to commission the slice.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether optically, electrically, mechanically, chemically, or otherwise.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which can be modified by omitting, adding or replacing elements with equivalent functional elements, provides many applicable inventive concepts that may be embodied in a wide variety of specific contexts. The specific embodiments discussed are merely illustrative of specific ways to make and use the concepts disclosed herein, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the embodiments disclosed herein, without departing from the present disclosure, as defined by the appended claims.

Accordingly the specification and the embodiments disclosed therein are to be considered examples only, with a true scope of the disclosure being disclosed by the following numbered claims:

What is claimed is:

1. A method for allocating a slice instance of a communications network, the method comprising:

transmitting, by a management function to a second management function among one or more constituent management entities, a request for requirements for the slice instance, wherein the slice instance is a network slice subnet instance (NSSI) of a network slice subnet (NSS) of the communications the network and the NSSI is based on a network slice subnet template (NSST), wherein the management function is one of a network slice management function (NSMF) and a network slice subnet management function (NSSMF) and the one or more constituent management entities are one or more of an NSMF, an NSSMF, an network function virtualization (NFV) management and operations (MANO) function, a domain manager (DM), an element manager (EM) and a transport network (TN) manager;

receiving, by the second management function, the request;

transmitting, by the second management function to the management function, the requirements for the slice instance;

receiving, by the management function, the requirements for the slice instance;

checking, by the management function, a feasibility of the slice instance requirements in view of one or more of network resources and network capabilities, wherein checking the feasibility includes determining feasibility of reusing an existing slice instance in consideration of remaining network capacity, wherein checking the feasibility of the slice instance requirements further includes determining whether the request is viable in terms of whether the request violates any of the policies and services of the existing slice instance;

checking, by the management function, further comprises one or more of:

a feasibility of creating a new NSSI for provisioning the slice instance; and a feasibility of decommissioning the existing NSSI for provisioning the slice instance;

obtaining, by the management function, additional capability information from the one or more constituent management entities and checking the feasibility of the slice instance requirements or the NSSI requirements based on the obtained additional capability information;

preparing, by the management function, a network environment for the slice instance in view of the slice instance requirements being feasible for re-using the existing slice instance, wherein preparing the network environment includes reserving resources to establish connectivity of the slice instance or network functions thereof by transmitting a resource reservation request to a constituent management entity of the one or more constituent management entities;

negotiating, by the management function, provisioning options for the existing NSSI with a Third Generation Partnership Project (3GPP) entity, wherein the provisioning options include redesign or modification of the existing NSSI, wherein the modification comprises changing one of a capacity, topology and configuration of the existing NSSI, and the redesign comprises changing a level of management exposure from the constituent management entity; and commissioning, by the management function, the slice instance.

2. The method according to claim 1, further comprises obtaining the requirements for the slice instance that includes deriving the requirements.

3. The method of claim 1, further comprises obtaining the requirements for the slice instance that includes receiving a request to allocate a slice instance from the 3GPP entity.

4. The method of claim 3, wherein the 3GPP entity is one or more of a customer, an NSMF, an NSSMF and a communication service management function (CSMF).

5. The method according to claim 1, further comprising discovering, by the management function, one or more of the network resources and the network capabilities.

6. The method of claim 5, wherein discovering comprises maintaining a service catalogue of capabilities.

7. The method of claim 5, wherein discovering includes querying the constituent management entity for one or more of the network resources and the network capabilities thereof.

8. The method of claim 5, wherein discovering includes subscribing to updates with the constituent management entity, wherein the updates are indicative of one or more of remaining network resources and remaining network capabilities.

9. The method according to claim 1, further comprising abstraction, by the management function, of one or more of the network resources and the network capabilities.

10. The method of claim 1, wherein the negotiation is performed when checking the feasibility results in a determination that the requirements for the slice instance are not feasible.

11. The method of claim 1, wherein the existing slice instance is a shared slice instance.

12. The method of claim 1, further comprising cancelling, by the management function, a commissioned slice instance.

13. The method of claim 1, further comprising one or more of configuration, establishing and updating a policy for the slice instance.

14. The method of claim 13, further comprising configuring or establishing a policy control function for implementing the policy for the slice instance.

15. The method of claim 1, further comprising validating the feasibility of the slice instance requirements using most recent service catalogue information.

16. The method of claim 1, wherein transmitting the resource reservation request is performed in response to receipt of a further resource reservation request from another entity.

17. A system comprising a network management function and a second network management function, each of the network management function and the second management function including a respective processor and a respective non-transient memory for storing machine-readable and machine-executable instructions, the instructions when executed by the respective processor cause the network management function or the second network management function to be configured to:

transmit, by the network management function to the second network management function among one or more constituent management entities, a request for requirements for the slice instance, wherein the slice instance is a network slice subnet instance (NSSI) of a network slice subnet (NSS) of a network and the NSSI is based on a network slice subnet template (NSST), wherein the management function is one of a network slice management function (NSMF) and a network slice subnet management function (NSSMF) and the one or more constituent management entities are one or more of an NSMF, a NSSMF, a network function virtualization (NFV) management and operations (MANO) function, a domain manager (DM), an element manager (EM) and a transport network (TN) manager;

receive, by the second network management function the request; transmit, by the second network management function to the network management function, the requirements for the slice instance;

receive, by the network management function, the requirements for the slice instance;

check, by the network management function, a feasibility of the slice instance requirements in view of one or more of network resources and network capabilities, wherein checking the feasibility includes determining feasibility of reusing an existing slice instance in consideration of remaining network capacity, wherein checking the feasibility of the slice instance requirements further includes determining whether the request is viable in terms of whether the request violates any policies or services of the existing slice instance;

check, by the management function, one or more of:
a feasibility of creating a new NSSI for provisioning the slice instance; and
a feasibility of decommissioning the existing NSSI for provisioning the slice instance;

obtain, by the network management function, additional capability information from the one or more constituent management entities and checking the feasibility of the slice instance requirements or the NSSI requirements based on the obtained additional capability information;

prepare, by the network management function, a network environment for the slice instance in view of the slice instance requirements being feasible for re-using the existing slice instance, wherein preparing the network environment includes reserving resources to establish connectivity of the slice instance or network functions thereof by transmitting a resource reservation request to a constituent management entity of the one or more constituent management entities;

negotiate, by the network management function, provisioning options for the existing NSSI with a Third Generation Partnership Project (3GPP) entity, wherein the provisioning options include redesign or modification of the existing NSSI, wherein the modification comprises changing one of a capacity, topology and configuration of the existing NSSI, and the redesign comprises changing a level of management exposure from the constituent management entity; and commission the slice instance.

* * * * *

UNITED STATES PATENT AND TRADEMARK OFFICE
CERTIFICATE OF CORRECTION

PATENT NO. : 10,986,540 B2  
APPLICATION NO. : 16/243771  
DATED : April 20, 2021  
INVENTOR(S) : Remziye Irem Bor Yaliniz, Chengchao Liang and Nimal Gamini Senarath It is certified that error appears in the above-identified patent and that said Letters Patent is hereby corrected as shown below:

In the Specification

Column 49, Line 18, "similar to TemplateRequest with Template Type as a param-" should be --similar to TemplateRequest with TemplateType as a param- --

In the Claims

Column 58, Line 38, Claim 1 "(NSS) of the communications the network and the" should be --(NSS) of the communications network and the--

Column 58, Line 44, Claim 1 "are one or more of an NSMF, an NSSMF, an network" should be --are one or more of an NSMF, an NSSMF, a network--

Column 60, Line 31, Claim 17 "more of an NSMF, a NSSMF, a network function" should be --more of an NSMF, an NSSMF, a network function--

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*